United States Patent
Tamoto et al.

(10) Patent No.: US 9,104,083 B2
(45) Date of Patent: Aug. 11, 2015

(54) RECORDING MEDIUM AND IMAGE RECORDING SET

(71) Applicants: Nozomu Tamoto, Shizuoka (JP); Daiki Yamashita, Kanagawa (JP)

(72) Inventors: Nozomu Tamoto, Shizuoka (JP); Daiki Yamashita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/250,683

(22) Filed: Apr. 11, 2014

(65) Prior Publication Data

US 2014/0307039 A1    Oct. 16, 2014

(30) Foreign Application Priority Data

Apr. 12, 2013  (JP) ................... 2013-084404
Jun. 11, 2013  (JP) ................... 2013-122745
Dec. 13, 2013  (JP) ................... 2013-258256

(51) Int. Cl.
*G02F 1/167* (2006.01)
*B41J 2/385* (2006.01)
*B41J 2/32* (2006.01)
*G02F 1/17* (2006.01)

(52) U.S. Cl.
CPC . *G02F 1/167* (2013.01); *B41J 2/32* (2013.01); *G02F 1/17* (2013.01)

(58) Field of Classification Search
CPC ................................. G02F 1/167; B41J 2/385
USPC .................... 347/221, 217, 215, 171
See application file for complete search history.

(56) References Cited

U.S. PATENT DOCUMENTS

| | | | |
|---|---|---|---|
| 5,366,837 A  * | 11/1994 | Sakai | 430/97 |
| 2011/0095298 A1* | 4/2011 | Oikawa et al. | 257/59 |
| 2012/0249711 A1* | 10/2012 | Tamoto | 347/111 |

FOREIGN PATENT DOCUMENTS

| | | |
|---|---|---|
| JP | 50-015115 | 6/1975 |
| JP | 64-086116 | 3/1989 |
| JP | 2-196227 | 8/1990 |
| JP | 4-110887 | 4/1992 |
| JP | 11-095692 | 4/1999 |
| JP | 2000-062316 | 2/2000 |
| JP | 2000-132122 | 5/2000 |
| JP | 2000-322005 | 11/2000 |
| JP | 2001-034199 | 2/2001 |
| JP | 21301-092387 | 4/2001 |
| JP | 2001-147451 | 5/2001 |
| JP | 2001-301325 | 10/2001 |
| JP | 2002-236300 | 8/2002 |
| JP | 2002-365670 | 12/2002 |
| JP | 2003-091022 | 3/2003 |
| JP | 2003-149691 | 5/2003 |
| JP | 2003-526817 | 9/2003 |
| JP | 2004-163568 | 6/2004 |
| JP | 2005-227795 | 8/2005 |
| JP | 2007-011342 | 1/2007 |
| JP | 2007-140367 | 6/2007 |

(Continued)

*Primary Examiner* — Sarah Al Hashimi
(74) *Attorney, Agent, or Firm* — Cooper & Dunham LLP

(57) ABSTRACT

A recording medium includes a first substrate; a second substrate; and an image recording layer provided between the first substrate and the second substrate, wherein the image recording layer has insulating properties and multiple cells or microcapsules, each of which encapsulates at least one of electrophoresis particles or magnetophoresis particles, a dispersion medium, and a thermoreversible gelling agent, wherein at least one of the first substrate or the second substrate contains fillers.

17 Claims, 16 Drawing Sheets

(56) References Cited

FOREIGN PATENT DOCUMENTS

| JP | 2007-286124 | 11/2007 |
| JP | 2008-139632 | 6/2008 |
| JP | 2010-022933 | 1/2010 |
| JP | 2012-083378 | 4/2012 |
| JP | 2012-215835 | 11/2012 |
| JP | 2013-015560 | 1/2013 |
| WO | WO01/67170 | 9/2001 |

* cited by examiner

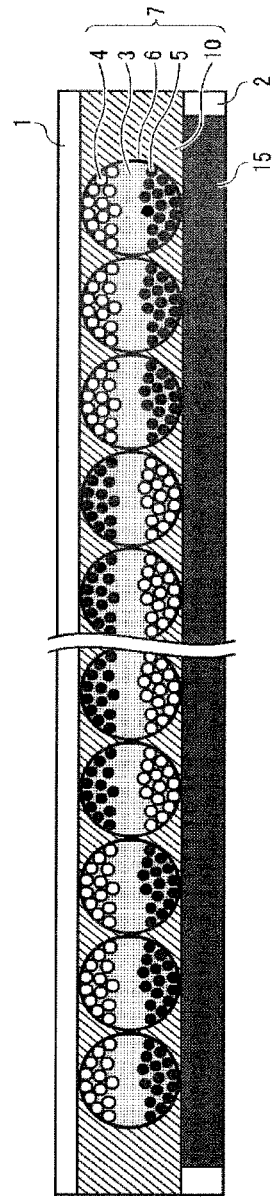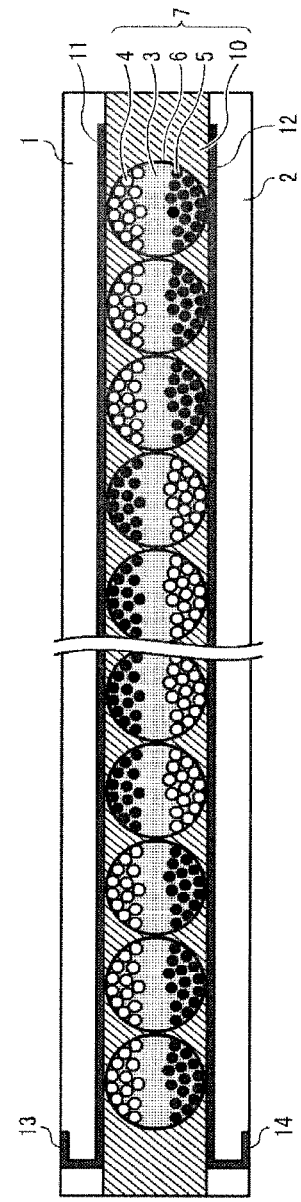

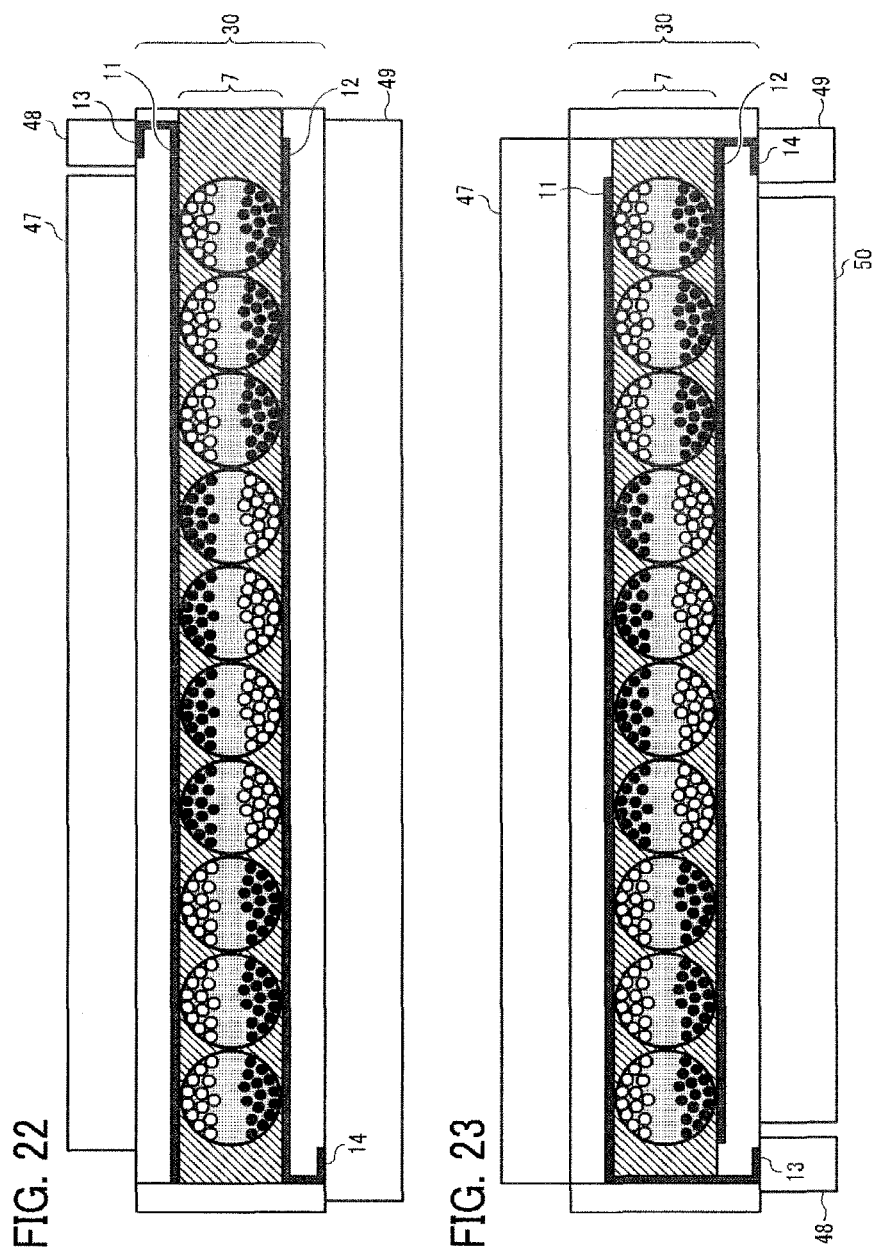

RECORDING MEDIUM AND IMAGE RECORDING SET

CROSS-REFERENCE TO RELATED APPLICATIONS

This patent application is based on and claims priority pursuant to 35 U.S.C. §119 to Japanese Patent Application Nos. 2013-122745, 2013-084404, and 2013-258256, on Jun. 11, 2013, and Apr. 12, 2013, and Dec. 13, 2013, respectively, in the Japan Patent Office, the entire disclosures of which are hereby incorporated by reference herein.

BACKGROUND

1. Technical Field

The present intention relates to a recording medium and an image recording set,

2. Background Art

In recent years, electronic paper has been put into practical use and gained attention because it is visible, portable, thin, and lightweight like paper material requiring no backlight and less power consumption.

Electronic paper is classified into internally-driven paper-like display (hereinafter referred to as PLD) that includes a drive element inside and can display images by itself and externally-driven rewritable paper using a recording medium on which writing is performed by a printer.

The rewritable paper includes all recording media such as paper and sheets on which rewriting can be repeatedly performed, and is synonymous with a rewritable recording medium included in the present invention.

Various systems of electronic paper have been proposed. Of these, as a PLD, an electrophoretic system, that performs display by changing an optical reflectance by causing white and/or colored particles charged in a liquid to migrate to the surface side or the opposite direction of a display medium by an electric field is known as the most practical system.

As an example of the electronic paper of such system. JP-S50-15115-B discloses a display or recording device, in which an electric field is applied to a mixed multi particle dispersion containing particles that migrate in opposite directions depending on the electric field, to optically shield certain particles, to thereby change optical reflection characteristics of the dispersion system.

In addition, JP-2551783-B1 (JP-H01-086116-A) discloses an electrophoretic display device, in which a large number of microcapsules each encapsulating a dispersion system obtained by dispersing electrophoretic particles in a colored dispersion medium is provided between a pair of counter electrode plates.

Furthermore, JP-4410135-B1 (JP-2005-227795-A) discloses an ink, in which an electric field is applied to microcapsules each containing first particles and second particles having reverse polarity to that of the first particles to thereby migrate either the first or second particles to the surface.

As described above, the electrophoretic system, particularly a microcapsule electrophoretic system, has been already been put into practical use as electronic paper, and has gained much attention.

Meanwhile, JP-3680996-B1 (JP-2003-526817-A) discloses a method, in which appropriately regulated cells, so-called micro cups, are provided on a film, and a dispersion system containing electrophoretic particles is encapsulated in each cell.

This method includes forming a layer of a precursor of a thermoplastic material or thermoset material, conducting an emboss process with embossing, and then curing. Since the production can be carried out with a roll-to-roll process in this method, this is an excellent method in view of low cost production.

Such electrophoretic electronic paper is capable of retaining displayed content without requiring electric power after displaying the content once, which is recognized as one of the advantages. However, in fact, it is not possible to practically retain images because image density changes with time unless an electric field is applied or image quality deteriorates by static electricity and pressure from outside.

In attempts to solve these problems, for example, JP-2007-286124-A discloses a method of controlling a solubility parameter in a dispersion medium by making walls of microcapsules from a grail copolymer. Also, JP-2010-002933-A discloses a method of dissolving or dispersing a polymer that does not become thick in a fluid suspension.

These technologies are appropriate to improve the image retention (retentiveness) required for PLD.

However, these are not sufficient to retain images on rewritable paper.

This difference lies in the structures and the purposes of use of PLD and rewritable paper.

PLD has substrates each having an electric conductive layer, as electrodes, at the bottom and top of a display layer in which electrophoretic particles move and is covered by a housing, so that it is never or little affected from the outside. In addition, a voltage can be applied thereto if desired, which makes it possible to retain an image on PLD.

However, rewritable paper is not covered by a housing and is easily affected from the outside. In addition, a recording medium includes no element or power source to apply a voltage, meaning, that retaining an image for a long period of time is impossible from outside.

It is possible to reduce at impact from outside by providing a protective layer to cover rewritable paper in some cases. However, this is not sufficient to enhance g image retention.

Considering that PLD is used for display, images are frequently rewritten and demand for image retention is not strict. By contrast, rewritable paper is required to retain records for a long period of time almost permanently, like paper.

As a technology to significantly enhance image retention, there are a number of methods including controlling the viscosity of a dispersion medium in which electrophoretic particles are dispersed, lowering the viscosity by heating to conduct recording, and thereafter fixing colored particles cooling-down.

For example, JP-S50-15115-B1 mentioned above discloses a method of using a resin, rubber, waxes, or synthetic waxes that are solid at normal temperatures and softened thermally or chemically.

JP-4168556-B1 (JP-2001-147451-A) discloses a method of forming a uniform liquid phase by dissolving a solid phase of a dispersion medium, which has solid and liquid phases present at room temperature, during electrophoretic migration in a liquid dispersion containing electrophoretic particles, the dispersion medium a dye, and a dispersant.

JP-2001-301325-A discloses a method in which a heat-meltable substance that is solid when it is not heated and becomes liquid when it is heated, specifically, waxes, saturated fatty acid, higher alcohols, and electrophoretic fine particles are encapsulated into microcapsules.

JP-2002-365670-A discloses a method using a mixture that has fluidity at an electrophoretic operating temperature, and becomes an optically opaque solid at a temperature lower than the electrophoretic operating temperature, specifically, a mixture of a substance selected among long-chain alcohols, phenols, aromatic ketones, decanes, and dodecanes, and a substance selected among paraffin, solders, waxes, and saturated hydrocarbons.

JP-2003-91022-A discloses a method using higher paraffin hydrocarbons, solders, waxes, or aromatic hydrocarbons as a dispersion medium that is solid at normal temperatures and becomes liquid by heating.

JP-2007-140367-A discloses a method in which a dispersion medium is composed mostly of rice wax and contains a surfactant.

Thus, a dispersion medium that is solid at normal temperatures and becomes liquid when being heated is very effective for improvement in image retention because electrophoretic particles are fixed by cooling after recording.

However, since these technologies use waxes and saturated aliphatic acids, the dispersibility of electrophoretic particles significantly deteriorates when compared to a case where a solvent having excellent dispersability is used as the dispersion medium. For this reason, electrophoretic properties may be impaired, or image quality deteriorates due to aggregation of particles.

Further, temperature responsiveness is low in transition between the solid state and the liquid state of electrophoretic particles, which causes problems such that rewriting speed decreases, the viscosity of a dispersion medium is not sufficiently lowered even when heated, thereby degrading contrast, and the quality of image deteriorates over repeated rewriting.

A method of using a dispersion medium that turns into a gel in a PLD is disclosed.

For example, JP-H02-196227-A discloses a thermal writing system which includes a dispersion medium that turns into a gel and a sol (liquid) reversibly depending on temperatures and electrophoretic particles and locally causes the electrophoretic particles to migrate by locally converting the dispersion medium into a sol.

However, with this technology, as a dispersion medium that turns into a gel and a liquid, specifically, is solvent is used for a high-molecular weight substance, resulting in a poor solvent. This high-molecular weight substance is dissolved when the temperature of the solvent is high and the high-molecular substance becomes insoluble and turns into a gel when the temperature is low, so that the high-molecular substance itself does not have thermal reversibility.

Therefore, the temperature responsiveness is low in transition between a gel and a liquid and liquefaction is local, so that display speed and image quality are not satisfactory.

JP-2003-149691-A discloses a display gel for electrophoretic display, containing a dispersion medium, white particles, colored particles, and a gelling agent.

However, in this technology although a gelling agent is contained in the dispersion medium, thermal reversibility is not described. Actually, due to gelatinization, the dispersion medium is substantially equally divided into continuous and/or discontinuous minute regions and turns into a gel and the particles electrophoretically migrate by the action of an electric field in the dispersion medium in a gel state.

Therefore, rewriting speed and contrast remain unsolved.

JP-2007-11342-A discloses a display medium for electrophoretic display containing a set of a liquid system, a thermoreversible gelling agent, and colored particles for PLD. With this technology, by containing the thermoreversible gelling agent, the display medium turns into non-gel and is reduced in viscosity at temperature close to or higher than a melting point of the gelling agent, so that images can be limited in a display device.

When the display device is cooled after an image is formed, the medium turns into a gel, so that the image is stably maintained unless an electric field is applied.

In the method using a thermoreversible gelling agent, the gelling agent itself causes gelatinization, so that the temperature responsiveness is higher and more stable than in the conventional technologies in which waxes and solders are added or gelatinization is controlled by solubility of a high-molecular substance in a solvent, so that this method is very excellent for enhancing image retentiveness.

However, as long as the thermoreversible gelling agent is also controlled by temperature, the influence of reduction in rewriting speed on use with frequent image rewriting increases.

As described above, this technology using a thermoreversible gelling agent is premised on that it is used for a display device having two parallel transparent conductor electrode panels, that is, a PLD, so that the disadvantage of deterioration in display responsiveness becomes greater than the advantage of semipermanent image retentiveness by using a thermoreversible gelling agent.

In addition, a heating device and a cooling device must be provided inside the device, so that the thickness and weight of the PLD increase, and this is also a big disadvantage.

Therefore, the effect of use of the thermoreversible gelling agent has not been sufficiently utilized, and has not been applied to a PLD in actuality.

It is considered that the need for image retentiveness required for rewritable paper is higher than that for PLD as described above.

In order to perform rewriting, the PLD is configured as a device, so that the rewriting frequency is high.

Therefore, it does not necessarily require semipermanent image retentiveness.

On the other hand, the rewritable paper is rewritable, however, on the assumption that it is used instead of paper, high image retentiveness is required.

In addition, rewritable paper that is not covered by a housing is more easily affected by static electricity and pressures front outside than the PLD covered by a housing. This creates a problem when enhancing image retentiveness.

For this reason, image retentiveness is a large issue for rewritable paper rather than for PLD.

In addition, in a case of controlling transfer of sol-gel of a dispersion medium contained in an image recording layer by heating, heat conductivity of substrates or a protective layer to the image recording layer is also an issue.

If heat conductivity of substrates or it protective layer to the image recording layer is extremely decreased, a variety of problems occur such that solation is not sufficient, resulting in decrease of contrast, gelation does not occur instantly, thereby degrading image quality, or recording speed is reduced.

As described above, an image recording layer having a quick temperature responsiveness, which is formed using a thermoreversible gelling agent, is affected by a substrate and a protective layer, etc. formed to cover the layer. As a result, contrast deteriorates, visibility becomes interior, or heat conductivity becomes low which has a negative impact on printing speed.

SUMMARY

The present invention provides an improved recording medium having it first substrate, a second substrate; and an image recording layer provided between the first substrate and the second substrate, wherein the image recording layer has insulating properties and multiple cells or microcapsules, each of which encapsulates at least one of electrophoresis particles or magnetophoresis particles, a dispersion medium, and a thermoreversible gelling agent, wherein at least one of the first substrate or the second substrate comprises a filler.

As another aspect of the present invention, an image recording set is provided that has the recording medium mentioned above and an image recording device to record an image. The image recording device has a heating device to heat the image recording layer; an electric field application device to apply an electric field to the image recording layer and/or a magnetic field application device to apply a magnetic field to the image recording layer.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 10 is a schematic diagram illustrating one example of the recording medium which uses an electric conductive substrate;

FIG. 11 is a schematic diagram illustrating another example of the recording medium in which an electric conductive layer is formed between the image recording layer and the substrate;

FIG. 22 is a schematic diagram illustrating another example of an image recording device in the image recording set of the present invention;

FIG. 23 is a schematic diagram illustrating another example of an image recording device in the image recording set of the present invention;

DETAILED DESCRIPTION

Figure 1:
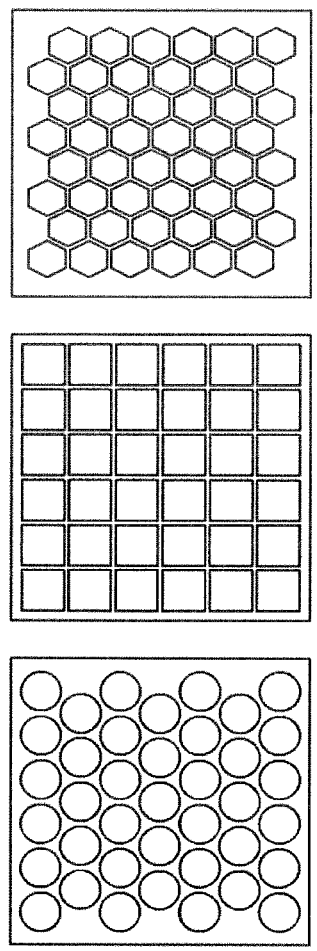
FIG. 1 is diagrams illustrating examples of forms of cells for use in the image recording layer of a recording medium using the cells according to in embodiment of the present invention.

The present invention is to provide a recording medium having an excellent image retention (retentiveness) and image quality. The recording medium, which is externally driven, is recordable at high speed and rewritable.

The recording medium of the present invention is preferably rewritable to record and erase images repeatedly. It is to be noted that a recording medium having a similar configuration with a limited rewriting ability due to an additional element, etc., is also within the recording medium of the present invention.

The present invention is 1): a recording medium having a first substrate; a second substrate; and an image recording layer provided between the first substrate and the second substrate, wherein the image recording layer has insulating properties and multiple cells or microcapsules, each of which encapsulates at least one of electrophoresis particles or magnetophoresis particles, a dispersion medium, and a thermoreversible gelling agent, wherein at least one of the first substrate or the second substrate comprises a filler.

Since the following 2) to 15) are included in the embodiments of the present invention, these are also described.

2): The recording medium mentioned above, wherein the filler contains at least one of a metal, a metal oxide, a metal nitride, and a carbon compound.

3): The recording medium mentioned above, wherein the filler has an anisotropic form.

4): The recording medium mentioned above, wherein the filler contains multiple mixtures.

5): The recording medium mentioned above, wherein a mixture of the dispersion medium and the thermoreversible gelling agent has a solation temperature higher than a gelation temperature.

6): The recording medium mentioned above, wherein the first substrate or the second substrate is electroconductive.

7): The recording medium mentioned above, further containing an electroconductive layer provided between the first substrate and the image recording, layer or between the second substrate and the image recording layer; and an electrode provided at an exterior of the recording medium wherein, the electroconductive layer and the electrode are electrically connected.

8): The recording medium mentioned above, farther containing a first electric conductive layer between the first substrate and the image recording layer; and a first electrode at an exterior of the recording medium, wherein the second substrate is electroconductive, wherein the first electroconductive layer and the first electrode are electrically connected.

9): The recording medium mentioned above, further containing a first electroconductive layer between the first substrate and the image recording layer; a second electroconductive layer between the second substrate and the image recording layer; and a first electrode at an exterior of the recording medium; and a second electrode at an exterior of the recording medium, wherein the first electroconductive layer and the first electrode are electrically connected, wherein the second electroconductive layer and the second electrode are electrically connected.

10): An image recording set that includes the recording medium mentioned above and an image recording device to record an image, which includes a heating device to heat the image recording layer; and at least an electric field application device to apply an electric field to the image recording, layer or a magnetic field application device to apply a magnetic field to the image recording layer.

11): The image recording set mentioned above, wherein the heating device is a thermal head.

12). The image recording set mentioned above, wherein the first substrate or the second substrate is electroconductive, wherein the electric field application device is electrically connected with the first substrate when the first substrate is electroconductive or the second substrate when the second substrate is electroconductive to apply the electric field to the image recording layer.

13). The image recording mentioned above, wherein the image recording medium includes: an electroconductive layer provided between the first substrate and the image recording layer or between the second substrate and the image recording layer; and an electrode provided at an exterior of the recording medium, wherein the electroconductive layer and the electrode are electrically connected, wherein the electric field application device is electrically connected with the electrode to apply the electric field to the image recording layer.

14). The image recording set mentioned above, wherein the recording medium includes a first electric conductive layer between the first substrate and the image recording layer; and a first electrode at an exterior of the recording medium, wherein the second substrate is electroconductive, wherein the first electroconductive layer and the first electrode are electrically connected, wherein the electric field application device is electrically connected with at least one of the first electrode or the second substrate to apply the electric field to the image recording layer.

15). The image recording set mentioned above, wherein the recording medium includes: a first electroconductive layer between the first substrate and the image recording layer; a second electroconductive layer between the second substrate and the image recording layer; and a first electrode at an exterior of the recording medium; and a second electrode at an exterior of the recording medium, wherein the first electroconductive layer and the first electrode are electrically connected, wherein the second electroconductive layer and the second electrode are electrically connected, wherein the electric field application device is electrically connected with at least one of the first electrode or the second electrode to apply the electric field to the image recording layer.

16). The image recording set mentioned above, further including an image erasing device to erase an image recorded on the recording medium by applying heat and at least one of an electric field and a magnetic field to the recording medium.

17). The image recording set mentioned above, further including: a screen; a drive unit to roll up and release the screen, wherein the recording medium is provided to the screen.

Recording Medium

The recording medium of the present disclosure includes a first substrate, a second substrate, and an image recording layer provided between the first substrate and the second substrate, and other optional members.

Unlike paper-like display (PLD) of interval-driving type having a drive element inside, which is capable of displaying an image, the recording medium is an externally driven rewritable recording medium capable of repeatedly recording and erasing an image by an externally set in recording device.

That is, recording and erasing an image on an recording medium is carried out by an externally set image recording device, which is not present in the recording medium.

Accordingly, the recording medium does not necessarily require a drive element or a power source, which is required for PLD to display an image.

The image recording layer contains microcapsules or cells each encapsulating: electrophoretic particles and/or magnetophoretic particles; a dispersion medium; and a thermoreversible gelling agent.

The electrophoretic particles and/or magnetophoretic particles migrate (move) in the dispersion medium as an electric field and/or magnetic field is externally applied.

The dispersion medium disperses the electrophoretic particles and/or magnetophoretic particles.

The thermoreversible gelling agent is a material, which turns the dispersion medium into a sol (liquidizes the dispersion medium) as the temperature thereof exceed a particular temperature, turns the dispersion medium into a gel (solidifies the dispersion medium) as the temperature thereof becomes a particular temperature or lower, and can reversibly induces sol-gel transition depending on temperatures.

The recording medium of the present disclosure contains a thermoreversible gelling agent in the image recording layer. By the thermoreversible gelling agent, the dispersion medium is maintained in a gel state at display of an image or in storage at room temperature and turned into liquid form at temperatures higher than room temperature to record (write) an image.

That is, since the dispersion medium maintains a gel form at display or in storage, the electrophoretic particles and/or magnetophoretic particles are prevented from moving, thereby suppressing changes of the quality of image during storage thereof for a long period of time.

In addition, images are retained firmly to stress such as electrostatics or pressure from outside.

Moreover, since the dispersion medium is liquidized by heat applied at the time of recording (writing), the electrophoretic particles and/or magnetophoretic particles freely move in the image recording layer. According to this phenomenon, images can be repeatedly recorded and erased.

However, unlike rewritable paper on which still image is written like paper, a thermoreversible gelling agent is not suitable to display an image for PLD since PLD is required to respond quick at writing as a display device.

In the case where the image recording; layer containing the thermoreversible gelling agent is used as an internally driven PLD having a drive element therein and capable of displaying an image itself as a conventional technique, it is necessary to house, in the display, a heating device or a cooling device as well is a display driving device to apply an electrode, and thus a size and weight of the display increase. In addition, it is necessary to increase and decrease the temperature every time the display is rewritten, and therefore there are problems that display speed is slow, and it is difficult to attain a sufficient display contrast ratio.

However, the recording medium of the present disclosure is not PLD and is a recording medium to which recording of an image is performed by an external image recording device. Therefore, it is not necessary to provide devices for heating and cooling to the recording medium itself, and these devices can be provided in an image recording device, which is separate from the recording medium.

Accordingly the problems caused with PLD, increase in the size and weight of the recording medium, low display speed, and insufficient display contrast ratio, can be solved.

Specifically, the recording medium can be formed into the shape or state similar to paper.

Not only solving a problem of low display speed caused by using a thermoreversible gelling agent, which has been a disadvantage to PLD, the recording medium of the present disclosure can attain a large advantage that semipermanent image retentiveness can be realized by using the thermoses gelling agent.

The recording medium of the present invention contains a multiple microcapsules or cells provided in the image recording layer with a particular gap between.

These cells or microcapsules have a configuration encapsulating electrophoretic particles and/or magnetophoretic particles, a dispersion medium, and a thermoreversible gelling agent. Due to this, deviation of electrophoretic particles and/or magnetophoretic particles are significantly reduced, thereby maintaining the gap between the image recording layer.

As a result, image retention (retentiveness) and the stability of writing and erasing images are improved.

In addition, if there is no cells or microcapsules, the gel in a recording medium is cracked if recording medium is bent, affecting the quality of image. This problem can be solved by providing cells or microcapsules.

When using the microcapsule, the dispersion medium in the microcapsules can be reversibly changed from sol to gel or the other way round depending on temperatures by encapsulating the thermoreversible gelling agent in the microcapsules together with electrophoretic particles and/or magnetophoretic particles and the dispersing medium.

As a result, the dispersion medium in the microcapsule is immediately liquidized when heated to temperatures higher than room temperature. Therefore, it is possible to migrate electrophoretic particle and/or magnetophoretic particles by an electric field and/or a magnetic field.

If the microcapsule is cooled down thereafter, the electrophoretic particles and/or the magnetophoretic particles do not migrate when an electric field and/or a magnetic field is applied.

For this reason, images can be retained semi-permanently.

The dispersion medium in the microcapsule little or never evaporates, which is advantageous to improve the stability of repeating writing images.

In addition, since it is possible to form a microcapsule layer on a substrate by coating, there is an advantage that this can be economically produced by a simple method such as a roll to roll.

There is no specific limit to the form of the cell. However, if the inner angle of the cell wall is narrow, electrophoretic particles and/or magnetophoretic particles tend to stay at the angle. To avoid this, it is suitable to make the inner angle of the cell to be 90° or more. A honeycomb having a hexagon form is most preferable.

Also, a recording medium having a honeycomb form is expected to be strong.

The recording medium of the present disclosure using the cell or the microcapsule mentioned above can be manufactured easily by, for example, forming a cell or a microcapsule on the first substrate and providing the second substrate or a protective layer thereon.

Since the recording medium can be made by such a simple method, the productivity thereof is improved, which is advantageous in terms of economy.

Substrate

There is no specific limit to the material for the substrate. Specific examples thereof include, but are not limited to, plastics such as synthetic resins and natural resins, paper, water-proof paper, thin glass, metal plates, and wood plates. Of these, synthetic resins are preferable in terms of flexibility and transparency.

There is no specific limit to the synthetic resin and suitable synthetic resins can be selected to a particular application.

Specific examples thereof include, but are not limited to, polyethylene, chlorinated polyethylene, ethylene-vinyl acetate copolymer, ethylene-ethyl acrylate copolymer, polypropylene, polybutadiene, an AS resin, an ABS resin, a methyl methacrylate resin, a vinyl chloride resin, vinyl chloride-vinyl acetate copolymer, vinyl chloride-vinylidene chloride copolymer, vinyl chloride-acrylic ester copolymer, vinyl chloride-methacrylic acid copolymer, vinyl chloride-acrylonitrile copolymer, ethylene-vinyl alcohol-vinyl chloride copolymer, propylene-vinyl chloride copolymer, a vinylidene chloride resin, a vinyl acetate resin, methacrylic acid-styrene copolymer, a polybutylene resin, methyl methacrylate-butadiene-styrene copolymer, polyvinyl alcohol, polyvinyl formal, a cellulose-based resin, a polyamide-based resin, a polyimide-based resin, a polyacetal resin, a polycarbonate resin, a urethane-based resin, a polyester resin (e.g., a polyethylene terephthalate resin, and a polybutyrene terephthalate resin), a polyphenylene oxide resin, a polysulfone resin, a polyamideimide resin, a polyamino bismaleimide resin, a polyether sulfone resin, a polyphenylene sulfone resin, a polyacrylate resin, a grafted polyphenylene ether resin, a polyether ether ketone resin, a polyether imide resin, a fluorine-based resin (e.g., a polytetrafluoroethylene resin, a polyfluoroethylene propylene resin, tetrafluoroethylene-perfluoroalkoxy ethylene copolymer, ethylene-tetrafluoroethylene copolymer, polyvinylidene fluoride, polychlorotrifluoroethylene, and fluoro rubber), and a silicone-based resin (e.g., a silicone resin, and silicone rubber).

These may be used alone, or in combination. These can be used alone or in combination.

The substrate thr use in the present disclosure can be formed by applying the synthetic resin specified above.

Of these resins, curable resins, which are cured by light, heat, electron beams, are more preferable.

However, a curable resin is not suitable which is hard and brittle when cured but suitable which is flexible to a degree that it can be bended.

Since such curable resins can be cured instantly, a substrate in which fillers are uniformly dispersed can be obtained.

In addition, when a thermoplastic resin is applied, it is dissolved in a massive amount of an organic solvent. For this reason, the thus-made substrate curls in an evaporation process after application in some cases. A curable resin is suitable because it suppresses curling.

Furthermore, when a curing resin is used, the drying process after application is short, thereby significantly improving productivity.

In the present disclosure, of these curable resin, acrylic; resins, diallyl phthalate resins, epoxy-based resins, urethane resins, melamine resins, and alkyd resins are preferably used.

As the substrate for use in the present disclosure, film molded from the synthetic resins specified above is suitably usable.

Specific examples of such resin films include, but are not limited to, polyolefin-based resin film such as polyethylene film polypropylene film, and ethylene copolymer film, polyester-based film such as polyethylene naphthaline and aromatic polyesters, polyamide-based film such as Nylon 6, MXD 6, and aramid polyimide film, polyether imide film, polyetherether ketone film, polyether sulfone film, polypheneylene sulfide film, triacetyl cellulose film, polycarbonate film, polystyrene film, polyacrylonitrile film, polyvinylchloride film, polyvinilydene chloride film, polyvinyl alcohol film, polyvinylbutyral film, film of copolymer of ethylene and vinyl acetate, film of copolymer of ethylene and vinylalcohol, film of copolymer of ethylene and methacylic acid, ionomer resin film, acrylic film, polyurethane film, and fluorine-containing resin film.

In addition, since these resin films have characteristics that the strength thereof can be enhanced by extending them at a fixed direction while being heated because the molecules thereof are aligned at the deformation direction, films extended along one or two axis direction can be suitably used.

In addition, resin films in which one or both sides are subject to surface treatment such as corona treatment, plasma treatment, frame treatment, or acid alkali treatment can be suitably used.

Furthermore, it is possible to for example, apply, deposit, or ion-plate a coating agent to one or both sides of these resin films.

Using these methods, it is possible to provide reflection protection features or finger print attachment prevention features, improve abrasion resistance and damage resistance, or impart antistatic properties.

In the present disclosure, of the resin films, polyethylene terephthalate film, polyethylene naphthaline film, polyimide film, nylon(polyamide)film, and triacetyl cellulose film.

In recording medium of the present disclosure, the first substrate and the second substrate are formed with the image recording layer therebetween. One of both of the first substrate and the second substrate contains fillers.

This filler means bulking agents or filing. Anything solid contained in a substrate is regarded as a filler.

Specific examples of such fillers include, but are not limited to, metal particulates, metal flakes, metal fiber, metal fiber resins, metal coating fiber, metal coating particles of copper, silver, gold, aluminum. nickel, iron, steel, platinum, zinc, etc., metal oxides such as silica, titanium oxide, alumina, magnesium oxide, beryllium oxide, calcium oxide, tin oxide, and indium oxide, electroconductive metal oxides in which antimony, on aluminum, etc, are doped with these metal oxides, metal nitrides such as boron nitride, silicon nitride, aluminum nitride, gallium nitride, and titan nitride, carbon powder, carbon fiber, or carbon flake of carbon compounds such as black lead, carbon black, carbon nanotube, fullerene, graphite, styrene resins, acrylic resins, benzoguanamine resins melamine resins, silicone resins, or organic resin particulates of copolymers thereof, molybdenum disulfide, tungsten disulfide, fluorine-containing resins such as PTFE, graphite fluoride, melamine cyanulate, talc, solid lubricants such as metal soaps, glass, ceramics, calcium carbonate, and magnesium carbonate.

Of these fillers, fillers are preferable which are selected from particulates or fiber containing metal such as metal particulates and metal coated particles, metal oxides, metal nitrides, or carbon compounds.

In particular, since powder of metal such as silver, copper, gold, carbon compounds such as black lead and carbon nanotube, and electroconductive metal oxides are highly electroconductive, the volume resistance of a substrate lowers, thereby reducing the impact of voltage decrease by the substrate. As a result, it is possible to obtain an image having a high contrast with a low drive voltage.

Furthermore, such fillers impala anti-stat, thereby preventing static electrical charge of a record medium and enhancing handling property.

In addition, fillers containing metal, carbon compounds, metal nitrides, metal oxides, etc., have high heat conductivity which contributes to improving the heat conductivity of a substrate.

For this reason, temperature responsiveness of sol-gel transfer by a thermoreversible gelling agent is enhanced, which makes it possible to obtain an image having a high contrast, increase the recording speed, and record an image at lower temperatures.

For this reason, in the present disclosure, it is preferable to use fillers having a high electroconductivity and heat conductivity and more preferable to use fillers selected from metal, metal oxides, metal nitrides, and carbon compounds.

Furthermore, fillers containing metal, carbon compounds, metal nitrides such as boron nitride, or fluorine-containing, resin particulates impart lubricity to the surface of a recording medium and reduce the surface energy thereof.

Consequently advantages are obtained that the damage resistance and abrasion resistance of the surface of a recording medium are improved, which leads to enhancement of the durability of the recording medium, the transferability of the recording medium to an image recording apparatus (preventing jamming), prolonging of the working life of a head by reducing friction between the recording medium and the head, and improvement of finger print resistance of the recording medium.

Electroconductivity is also referred to as electric conductivity which is a physical property value indicating the degree of the electric conductivity of a material.

The electroconductivity of fillers is an inverse number of resistivity. In general, it is possible to conduct comparison by measuring powder resistivity, which is effective in the present disclosure.

The powder resistivity of a filler can be measured by: for example, filing a cylinder container having an inner diameter of 18 mm with 1.0 g of the filler; measuring the resistance between both ends of the filler under a pressure of 100 kg/cm$^2$ by a digital multi-meter; and calculating the powder resistivity from the obtained resistance according to the following relation:

The powder resistivity of fillers for use in the present disclosure is preferably low. Specifically it is preferably $1\times10^6$ $\Omega\cdot$cm or less and more preferably $1\times10^3$ $\Omega\cdot$cm or less.

$$\text{Powder resistivity } (\Omega\cdot\text{cm}) = \text{resistance } (\Omega) \times \text{cross section } (\text{cm}^2) \text{ of sample/thickness of cross section (cm)}$$

The heat conductivity is a value indicating conductivity of heat and represents a heat amount per second flowing through an area of 1 m$^2$ of a board having a thickness of 1 m with a temperature difference of 1 K between both sides thereof.

Of these fillers, particulates of metal such as silver, copper, gold, aluminum, and iron, metal nitrides such as aluminum nitride, hexagonal boron nitride, and silicon nitride, metal oxides such as beryllium oxide, magnesium oxide, aluminum oxide, and carbon compounds such as black lead, silicon carbide, and carbon nanotube are known as fillers having high heat conductivity. These are particularly suitable in the present disclosure.

Considering that plastic or a resin for use in a substrata generally has a heat conductivity of from 0.1 [W/(m·K)] to 0.3 [W/(m·K)], fillers having a heat conductivity higher than that are preferable in the present disclosure.

In addition, it is preferable that the heat conductivity of fillers is high.

To measure the heat conductivity of fillers, a heat conductivity measuring device available on the market is used.

Specific examples of the measuring methods include, but are not limited to, a hot disc method, a probe method, a heat flowing amount method, and a laser flash method. Of these, the laser flash method is preferable because the heat conductivity of a material is obtained by emitting a laser beam from a laser oscillator to irradiate the surface of the material with the beam; and monitoring the amount of heat coming out of the rear side of the material and time.

Specific examples of such measuring devices include, but are not limited to, thermal constant measuring devices (Manufactured by ULVAC-RIKO, Inc.) and heat conductivity measuring devices (manufactured by Rigaku Corporation).

Filers have a variety of forms such as a spherical form, a flake-like form, a fiber-like form, a needle-like form. Any of these forms is suitably used. Of these, fillers having an aeolotropic form are more preferable.

Unlike an isotropic form having the same form to all the axes, an aeolotropic form has different forms depending on axis.

That is, such fillers have a longitudinal length from a latitudinal length, which has fiber-like forms or needle-like forms.

With regard to fillers having particle-like form, when an approximated ellipse is used, the ratio of the major diameter to the minor diameter is used. When fillers having a fiber-like form are used, the aspect ratio of the length to the diameter is used. As fillers having, an aeolotropic form, fillers having a high aspect ratio are preferable.

This is because, since the electroconductivity or the heat conductivity of a substrate is demonstrated by contact between fillers, the addition amount of fillers is increased to improve electroconductivity or heat conductivity.

However, if the content of fillers is significantly increased, the film as a substrate tends to be brittle, which impairs the flexibility thereof.

When using fillers having an aeolotropic form, the contact points between fillers are reduced, thereby improving electroconductivity and heat conductivity with a small amount.

The aspect ratio is obtained by: for example, cutting a substrate containing fillers along vertical direction; observing the cut surface by an electron microscope with a magnifying power of 1,000× to measure the length of major axis and minor axis of particles appearing in the cut surface, the diameter, etc., and calculating the averages thereof.

A substrate containing fillers is produced by adding filers to liquid containing a binder resin, monomers, and oligomers for dispersion; applying the liquid dispersion followed by drying and optionally curing.

To disperse fillers, known methods using a bead mill, a ball mill, a roll mill, ultrasonic, etc. can be used.

Specific examples of applying a liquid dispersion include, but are not limited to, dipping coat methods, blade coat methods, wire bar coat methods, roll coat methods, spray coat methods, nozzle coat methods, spin coat methods.

Optionally, other additives such as a dispersant, a surfactant, a surface adjuster can be added to the liquid dispersion.

In addition, a resin film or sheet containing fillers available on the market can be suitably used.

Film, paper, synthetic paper, etc., which contain fillers to prevent static charges or impart electroconductivity, are also available on the market.

In addition, these substrates can be formed of a single layer or laminated.

For example, layers containing fillers having different features can be laminated or layers having a structure of a layer having fillers provided on the resin film mentioned above can be regarded as a substrate.

In the present disclosure, advantages of a substrate containing fillers are as follows: Firstly, by adding fillers having a higher electroconductivity than a substrate to the substrate, an image having a high contrast with a low drive voltage is obtained because the volume resistance of the substrate is decreased, which reduces an impact of voltage falling by the substrate.

In addition, due to anti-stat of the fillers, a recording medium is prevented from static charge, which improves the handling property thereof.

Secondly, by adding fillers having a higher heat conductivity than a substrate to the substrate, the heat conductivity of the substrate is improved, thereby enhancing temperature responsiveness of sol-gel transfer by a thermoreversible gelling agent, so that us image having a high contrast is obtained, recording speed becomes faster, and recording can be conducted at lower temperatures (i.e., lower power consumption).

Thirdly, by adding fillers having a lubricity or reducing surface energy to the substrate, the surface of a recording medium is protected from abrasion or damage ascribable to friction with a head or another recording medium, which leads to prolonging of the working life of the recording medium.

In addition, the transferability of an image recording device is improved, which prevents printing error or breakdown thereof ascribable to unappropriate transfer performance, resulting in prolonging of the working life of head.

Furthermore, linger print resistance of a recording medium is improved.

Fourthly, by adding white or colored fillers to the substrate, a substrate on the rear side of a recording medium is made unclear or can be colored desirably. This contributes to improvement on visibility and power of expression.

Fifthly, by part of fillers contained in a substrate extruding from the surface of the substrate, the surface of the substrate is made to have fine roughness, which leads to anti-reflection or gives change of tactual sense and texture to the recording medium.

The recording medium of the present disclosure has an image recording layer between the first substrate and the second substrate.

Heat conductivity is preferably high for the first substrate and the second substrate. However, the electroconductivity of a substrate depends on the recording format of an image recording device.

With regard to the recording medium of the present disclosure, the entire of the recording medium is heated to liquidize the dispersion medium in all the cells or microcapsules, an electric field is applied to a recording area to migrate particles therein to form an image. Alternatively, while applying an electric field to the entire of a recording medium, a recording area is heated to migrate particles therein to form an image.

In the former case in which an image is formed by an electric field, it a substrate located on the side to which the electric field is applied has highly electroconductive, image flow tends to occur or no image is recorded.

For this reason, it is preferable that one of the first substrate and the second substrate is electroconductive.

However, in the latter case in which an image is formed by heat, the substrate provided on the side to which an electric field is applied preferably has a high electroconductivity to uniformly apply the electric field to the image recording layer.

For this reason, it is more preferable that both of the first substrate and the second substrate are electroconductive.

One or both of the first substrate and the second substrate contains fillers.

In addition, the materials and the kinds of fillers contained in the first substrate and the second substrate are not necessarily the same.

The substrate on the side on which a recording medium is seen is preferably transparent.

Therefore, when fillers are contained in the substrate on the side to be seen, it is preferable to use a substrate that can maintain the transparency even when it contains fillers.

In general, if fillers are contained to improve the electroconductivity or the heat conductivity of a substrate, the transparency thereof is degraded.

Therefore, the substrate containing fillers is arranged on the reverse to the visible side (from which an image is seen).

In the case in which an image is formed by heat, for example, a transparent substrate is used as the substrate on the visible side, a transparent electroconductive layer is formed between the substrate and the image recording layer, and an electrode can be formed to apply a voltage to the electroconductive layer.

By forming an image record layer in such a manner to contact this electroconductive layer and furthermore providing a substrate containing the electroconductive fillers mentioned above in such a manner to contact the image forming layer, the image recording layer is sandwiched between the electroconductive layer and the electroconductive substrate.

If a voltage is provided therebetween, the image recording layer is directly applied. As a result, an image having a high contrast at a low drive voltage is recorded.

The electroconductive film is formed on the surface of a substrate such as transparent plastic film or glass using metal, metal leaf plated metal, or deposited metal of ITO (indium tin oxide), zinc oxide, gold, silver, copper, aluminum, chromium, tin, nickel, etel, silver nanowire, grapheme, carbon nanotube, electroconductive polymer, or mixtures thereof.

Specific examples of methods of forming film layers include, but are not limited to known methods such as sputtering, depositing, and coating.

With regard to the resistivity of a substrate, the surface resistivity or volume resistivity is easily obtained by a resistivity meter.

A specific example of such a resistivity meter available on the market is Hiresta or Loresta, manufactured by Mitsubishi Chemical Analytech Co., Ltd.

The surface layer of these electroconductive film layer is preferably from $10^7$ Ω·cm or less, more preferably from $10^5$ Ω·cm or less, and furthermore preferably from $10^1$ Ω·cm or less.

The substrate having such an electroconductive layer is formed on the image recording layer and electrically connected with an exterior of the recording medium.

For example, it is possible to provide an electrode on the exterior of a recording medium to electrically connect the electroconductive layer.

By this connection, an image recording device can directly apply an electric field to the image recording layer.

In addition, the electroconductive substrate for use in the recording medium can be formed as one or both of the first substrate and the second substrate.

By this formation, an image having a high contrast can be obtained by a lower drive voltage.

In general, since using an electroconductive substrate for both of the first substrate and the second substrate better than for only one of these, it is preferable to use the electroconductive substrate for both in the present disclosure.

It is suitable to select and adjust the kind and the amount of fillers contained in the first substrate and the second substrate considering the positional relation of an electric field application device to apply an electric field to a recording medium and a heating device to heat the recording medium and the visible side of the recording medium.

In addition, fillers having a high heat conductivity do not necessarily have a high electroconductivity or show a desired color.

For this reason, it is possible to use a mixture of several kinds of fillers.

For example, it is suitable to use a mixture of a filler having a high heat conductivity and a filler having a high electroconductivity or add a white filler or a lubricative filler.

In the present disclosure, one of the mast preferable recording medium has a substrate on the visible side formed of a transparent resin film and a substrate on the rear side formed by applying a curable resin containing fillers.

In this structure, since the transparency of the substrate provided on the visible side is kept high, the high visibility of the recording medium is secured.

In addition, since the image recording layer is formed on the resin film, the roughness of the image recording layer on the visible side is reduced in particular when microcapsules are used for the image recording layer. Also, the opening portion is enlarged, which is advantageous to improving the quality of image.

Moreover, since the substrate on the rear side opposing the visible side is not necessarily transparent, it is possible to arbitrarily set the electroconductivity, heat conductivity, transparency, color, etc. of the substrate on the roar side by applying a curable resin containing in fillers.

For example, by adding colored fillers to the substrate on the rear side, it is possible to arbitrarily set the color of the substrate on the rear side, which is advantageous to enhance the power of expression of the recording medium.

There is no specific limit to the average thickness of the substrate. The average thickness is preferably from 10 μm to 500 μm, more preferably from 15 μm to 300 μm, and particularly preferably from 20 μm to 150 μm.

When the average thickness is too thin, the substrate tends to wrinkle or bend, thereby causing image deficiency.

In addition, the feeding in a printer occurs in some cases.

When the average thickness is too thick, the flexibility and the portability (thin film, light weight) of the substrate tends to deteriorate or a high applying voltage tends to be required when recording (writing).

Basically, although the average thickness of a substrate is preferably thin, a thick substrate can be used in some cases if a suitable amount of filler is added.

In addition, the average thickness of the first substrate and the second substrate can be the same or different.

Image Recording Layer

The image recording layer has multiple microcapsules or cells each encapsulating a dispersion liquid containing at least electrophoretic particles and/or magnetophoretic particles, a dispersion medium, and a thermoreversible gelling agent.

The microcapsules or cells may further encapsulate other components, if necessary.

A method of producing multiple microcapsules or cells each encapsulating a dispersion liquid containing at least electrophoretic particles and/or magnetophoretic particles, a dispersion medium, and a thermoreversible gelling agent is appropriately selected depending on the intended purpose without any limitation, provided that the method provides a structure where the dispersion liquid is encapsulated in multiple microcapsules or cells provided at particular distance.

For example, cells can be formed of a method including applying a thermoplastic resin or a curable resin onto a substrate, pressing a mold for providing cells against the applied resin to perform a microembossing process to the resin, to thereby form multiple cells provided at certain intervals.

Also there is a method including applying a material for forming cells onto a template, in which recesses are regularly formed so as to cover the recesses with the material, and then reducing the pressure of the surrounding air to relatively expand an bubbles present in the recesses at the singe time, to thereby form cells.

The recording medium of the present disclosure can be produced by providing, on a substrate, multiple cells provided at certain intervals in the aforementioned manner, placing, in the cells, a dispersion liquid containing at least electrophoretic particles and/or magnetophoretic particles, a dispersion medium, and a thermoreversible gelling agent, and bonding a substrate thereon so as not to include any air bubbles.

The aforementioned method uses a coating process and enables to perform continuous production. Therefore, it is very suitable for low cost production.

Moreover, as the cells have wide openings, the recording medium produced by such a method has characteristics that it easily achieves high contrast.

A form of each cell is not particularly limited, as long as the liquid dispersion is separated by multiple cells.

For example, as illustrated in FIG. 1, cells of various shapes, such as polygons, circles, and ovals can be provided.

Considering use thereof in the recording medium, however, preferred as shapes of the cells are those each having an area on which a cell is formed as small as possible, and those each having a large angle so as not to collect the particles at a corner of the cell.

The former is preferably a rectangular and the latter is preferably a circle. In order to obtain both characteristics, the forms the cells are particularly preferably a hexagonal honeycomb shape.

In addition to the characteristics above, the cells having the honeycomb shape can further give an effect of enhancing the strength of the image recording layer, and therefore the honeycomb form is particularly preferable.

In a case in which microcapsules are used, a production method of the microcapsules is appropriately selected depending on the intended purpose without any limitation, and examples thereof include conventional methods known in the art, such as a complex coacervation method, and an interfacial polymerization method, and an in situ polymerization method.

By the coacervation method, microcapsules are formed by separating a uniform phase into a thick phase of polymers accounting for the majority and a thin phase by lowering the temperature of a polymer solution, thereby coacervated small droplets of the thick phase dispersed in the thin phase being caused to adhere to the surfaces of dispersed particles; and maintaining this state.

A specific example of materials used in the complex coacervation is gelatine—Arabian gum.

In the microcapsulation by the interfacial polymerization method, a hydrophobic monomer and a hydrophilic monomer are combined to form layers in reaction at the interface of emulsion droplets.

In the microcapsulation by the in situ polymerization method, which is also referred to as an interface reaction method, wall layer materials of monomers, prepolymers, etc. and polymerization catalysts are provided around core materials to conduct polymerization reaction at the surface (interface) of the core materials, thereby forming it layer.

Specific example of the materials include, but are not limited to, urea-formaldehyde and melamine-formaldehyde.

Also, a phase separation method, a liquid drying method, and a liquid curing layer forming method are also suitable.

For example, formation of the microcapsules can be carried out by adding a liquid dispersion (O) of electrophoretic particles and/or magnetophoretic particles into an aqueous solution in which a water-soluble monomer or a surfactant has been dissolved to prepare an emulsion, and allowing the monomer to carry out a polymerization reaction at the O/W interface.

In the present disclosure, formation of microcapsules can be performed by adding a thermoreversible gelling agent to the liquid dispersion in advance, heating the aqueous solution temperature equal to or higher than the solation temperature, adding the liquid dispersion into the aqueous solution to prepare an emulsion, and then setting the temperature to reaction temperature.

Considering the fact that the particles migrate in each microcapsule, a form of each microcapsule is preferably spherical, i.e., a cross-sectional form of each microcapsule is preferably a circle.

In reality, however, it is preferred in view of image quality that microcapsules be closely filled without a space between the microcapsules to improve contrast. Therefore, a cross-sectional form of each microcapsule may be circle, oval, or polygon, or a mixture thereof.

The form thereof is not particularly limited.

The size of the microcapsules is preferably from 1 μm to 500 μm, more preferably form 10 μm to 100 μm, and furthermore preferably from 20 μm to 80 μm.

Although large microcapsules are suitable to improve contrast, the drive voltage is increase or images exude in some cases.

In contrast, small microcapsule are advantageous about image exuding and drive voltage but have a negative impact on contrast in some cases.

When the size is excessively small, the concentration is low even in reverse, contrast may excessively become low.

The size of the microcapsules in the present disclosure is the diameter for a circle form, the major diameter for an ellipse form, the longest diagonal for a polygon form.

The size of microcapsules is determined by observing a microcapsule layer formed on a substrate by an optical microscope.

For example, the size is determined by calculating the average of the measuring values of, for example, 50 microcapsules to 100 microcapsules arbitrarily selected from the microcapsules observed by an optical microscope.

The size of microcapsules can be controlled by, for example, a sieve.

For example, microcapsule slurry is screened by multiple sieves having different meshes to obtain microcapsules having a desired size range.

In addition, wet classifiers or centrifugals can be used.

The microcapsule layer formed between substrates is preferably a single layer in terms of the quality of image.

If a microcapsule layer is formed by a single layer without being overlapped, drive voltage is decreased, contrast is improved, and non-uniform density is improved in some cases.

In addition, the size of microcapsules is preferably the same.

Microcapsules having the same size has a positive impact on the decrease of non-uniform density.

By using microcapsules, it is possible to prevent evaporation of a dispersion medium, which leads to a long working life of a recording medium.

Particularly, the recording medium of the present disclosure is heated every time recording or erasing is conducted, and therefore to prevent vaporization of the dispersion medium is suitable to achieve high image quality, high stability, and long service life of the recording medium. To this end, use of the microcapsules is more preferable.

Moreover, slurry of the microcapsules makes it possible to manufacture recording media by coating, which is advantageous in low cost production thereof.

It is preferable that the microcapsules formed on the substrate is fixed thereon by a binder resin.

The binder resin also serves to secure insulating properties of an image recording layer in addition to fixing of microcapsules.

In particular, in a case where electric conductive layers or electric conductive substrates are provided above and below the microcapsules, it is not possible to apply an electric field to the image recording layer of an image recording medium unless the image recording layer has insulating properties. If an electric field is not applied, the particles in the image recording layer do not migrate to record an image.

As for the binder resin, suitably used is a resin having excellent insulating properties and high affinity or adhesion to a substrate, electronic conductive layer, or microcapsules.

A type of the resin for use is not particularly limited. Specific examples thereof include, but are not limited to, a thermoplastic resin and a curable resin known in the art. These resins are more preferably thermo- or photo-curable.

A microcapsule layer having insulation properties is easily formed on a substrate by mixing any of these binder resins with the microcapsules and applying the mixture onto the substrate followed by drying.

In a case where the microcapsules are not mixed with water, various resin materials can be used. In a case of slurry in which the microcapsules are mixed with water, an aqueous resin is preferably used.

Of such aqueous resins, a resin to which a hydrophilic group or hydrophilic segment is provided, an emulsion in which a hydrophilic resin is forcibly emulsified using a surfactant, a prepolymer which is blocked with a blocking agent having an hydrophilic group, or a blocked prepolymer to which a hydrophilic segment has been provided are preferable, and an aqueous urethane resin having these functions is particularly preferable.

It is preferable to make the image recording layer be insulated by using only a binder resin mixed with the microcapsules. In a case where insulating properties are not sufficient, however, it is possible to further apply an insulating resin onto the microcapsule layer to form all image recording layer, and this method is suitable to maintain insulating properties of the image recording layer.

Any microcapsule including a mixture thereof with a slurry can be used if it can form a layer on a substrate together with an aqueous resin. In this case, a resin mixed with an organic solvent can be applied thereon. Therefore, the insulating resin can be selected from a wide range of resins.

However, if the insulating resin layer is significantly thicker than the microcapsule layer, the image recording layer becomes thick, thereby weakening the electric field, so that images having low contrast may be produced.

Accordingly, it is desirable that the insulating resin layer is not significantly thicker than the microcapsule layer.

In the present disclosure, the binder resin for use in the image recording layer or the resin layer formed to maintain the insulation properties of the image recording layer or to protect microcapsules can be the same material as that of the substrate.

That is, the image recording layer and the substrate for use in the present disclosure do not necessarily have an interface. If a resin, how slight the amount thereof may be, is attached to the microcapsule, it can be regarded as a substrate.

For example, in an image recording layer formed by applying a liquid dispersion in which microcapsules are mixed with a binder resin to a first substrate, if the reverse side of the microcapsule on the first substrate is covered with a binder resin, the binder resin is regarded as the second substrate.

Electrophoretic Particles and Magnetophoretic Particles

The electrophoretic particles are appropriately selected depending on the intended purpose without any limitation, provided that they are particles that can exhibit electrophoresis in a fluid dispersion medium upon application of electric field. Specific examples thereof include, but are not limited to, an organic pigment and an inorganic pigment.

A type of the pigment may be selected depending on a color of an image to be recorded in the recording medium of the present disclosure.

Specific examples of black electrophoretic particles include, but are not limited to, carbon black, aniline black, titanium black, furnace black, lamp black and black iron oxide.

Specific examples of red electrophoretic particles include, but are not limited to, rhodamine 6G lake, dimethylquinacridone, watching red, lake red C, brilliant carmine 6B, rose Bengal, rhodamine B, alizarin lake, lithol red, permanent red 4R, and benzidine red.

Specific examples of yellow electrophoretic particles include, but are not limited to, chrome yellow, benzidine yellow, hansa yellow, naphthol yellow, molybdenum yellow, quinoline yellow and tartrazine.

Specific examples of blue electrophoretic particles include, but are not limited to, phthalocyanine blue, methylene blue, cobalt blue, victoria blue, methyl violet, aniline blue, ultramarine blue, sky blue, indanthrene blue and cerulean blue.

Specific examples of green electrophoretic particles include, but are not limited to, phthalocyanine green, malachite green lake, naphthol green, emerald green, viridian, cobalt green and chrome oxide.

Specific examples of purple electrophoretic particles include, but are not limited to, fast violet, methyl violet lake, indigo, mineral violet and cobalt violet.

Specific examples of brown electrophoretic particles include, but are not limited to, toluidine maroon, indanthrene red violet RH, burnt umber and iron oxide.

Specific examples of white electrophoretic particles include, but are not limited to: metal oxide, such as titanium oxide, zinc oxide, antimony oxide, aluminum oxide, and silicon dioxide; barium titanate; and barium sulfate.

These can be used alone, or in combination.

It is also possible to use white electrophoretic particles, which have been colored with various colorants, such as the aforementioned pigments or dyes.

In addition, in the present disclosure, electret particles can be suitably used as the electrophoretic particles.

Electret particles have semi-permanently charges by, for example, methods using electron beams, radiation ray, corona discharging, etc.

By using electret particles, the charging size of particles can be uniformed, which is advantageous to the quality of images in some cases.

The magnetophoretic particles are appropriately selected depending on the intended purpose without any limitation, provided that they are particles that can exhibits magnetophoresis in a fluid dispersion medium upon application of magnetic field. Specific examples thereof include, but are not limited to, a ferromagnetic material, such as ferromagnetic metal (e.g., iron, nickel, and cobalt) and an alloy containing the ferromagnetic metal; and permanent magnet, such as ferrite magnet, and alloy magnet.

Specific examples thereof include black iron oxide, porous iron oxide, black magnetite, $\gamma$-hematite, manganese dioxide-containing iron oxide, chromium dioxide, ferrite, iron, nickel, cobalt, gadolinium and alloys thereof.

It is also possible to use magnetophoretic particles having surfaces colored by various coloring agents.

For the purpose of enhancing dispersibility it the electrophoretic particles and/or magnetophoretic particles in the dispersion medium, preventing aggregations thereof, and achieving stable electrophoresis, it is preferred that the electrophoretic particles and/or magnetophoretic particles are subject to a surface treatment.

A coupling agent is mainly used for the surface treatment.

Specific examples of the coupling agent include a chromium-based coupling agent, a silane-based coupling agent, a titanate-based coupling agent, an aluminum-based coupling agent, a zirconium-based coupling agent, a zircon-alumminate coupling agent and a fluorine-based coupling agent.

As for the surface treatment, also suitable are a method for forming graft chains on surfaces of the electrophoretic particles and/or magnetophoretic particles, and a method for coating surfaces of the electrophoretic particles and/or magnetophoretic particles with polymer.

The average particle, diameter of the electrophoretic particles and/or the magnetophoretic particles is appropriately selected depending on the intended purpose without any limitation. It is preferably from 0.01 $\mu$m to 20 $\mu$m more preferably from 0.03 $\mu$m to 5 $\mu$m, and particularly preferably front 0.1 $\mu$m to 1 $\mu$m.

When the average particle diameter thereof is too large, the responsiveness of particles tends to be low, or the dissolution of an image tends to be low. When the average particle diameter thereof is too small, particles are easily aggregated to each other, or the image density of a resulting image tends to be low.

The average particle diameter means the particle diameter of the average primary particle diameter representing a particle group and is represented by the number average particle diameter.

Specifically, particles are directly taken out, or the recording medium of the present disclosure is cut and the section thereof is directly observed under an electron microscope.

Thereafter, primary particle diameters of the particles are determined, and the average value of these primary particle diameters (for example, the average value of 100 particles) is calculated and determined as the average particle diameter.

As for the electrophoretic particles and/or magnetophoretic particles, these can be used alone or in combination.

In a case where one type of particles is used, an image can be formed by coloring the dispersion medium, and coloring the particles in a different color to that of the dispersion medium.

In a case where two type of particles are used, an image can be formed by using groups of particles each having different color and charge polarity.

Alternatively, if three types of particles are used, an image can be formed by a combination of two type of the electrophoretic particles and/or magnetophoretic particles, or one type of non-electrophoretic particles and/or non-magnetophoretic particles.

Either of the electrophoretic particles or magnetophoretic particles can be used to record an image in the recording medium of the present disclosure. The electrophoretic particles and the magnetophoretic particles each can form an image upon application of electric field and magnetic field, respectively. In view of obtainable image quality and recording speed, use of the electrophoretic particles is preferable.

However, it is to be noted that, it is possible to use the electrophoretic particles and the magnetophoretic particles in combination. By providing an image recording device with a device for applying electric field and magnetic field, the electrophoretic particles, and the magnetophoretic particles having different color to that of the electrophoretic particles are individually controlled. As a result, multicolor image formation can be achieved.

There is no specific limit to the amount of the electrophoretic particles and/or magnetophoretic particles in the image recording layer. It is appropriately determined to a particular application.

Dispersion Medium

There is no specific limit to the dispersion medium. Any dispersion medium that can disperse electrophoretic particles and/or magnetophoretic particles can be suitably used.

Specific examples of the dispersion medium include, but are not limited to, an organic solvent, silicone oil, and water.

Of these, an organic solvent and silicone oil are preferable in view of electrophoresis of the electrophoretic particles and/or magnetophoretic particles, responsiveness, and image retentiveness.

Specific examples of the organic solvent include: an alcohol-based solvent, such as methanol, ethanol, and isopropanol; chain or cyclic aliphatic hydrocarbons, such as pentane, hexane, heptane, octane, nonane, decane, dodecane, isohexane, isodoctane, isododecane, tetradecane, dodecylbenzene, cyclohexane, kerosene, ISOPAR™, naphthene, liquid paraffin, and petroleum; aromatic hydrocarbons, such as benzene, toluene, xylene, alkyl benzene, solvent naphtha, phenylxyl ethane, diisopropyl naphthalene; and halogenated hydrocarbon, such as carbon tetrachloride, chloroform, dichloromethane, ethyl bromide, trichloroethylene, tetra chloroethylene trifluoroethylene, tetrafluoroethylene, trichlorotrifluoroethylene, and tetrachlorofluoroethylene.

Of these, a non-polar solvent is preferable and an aliphatic hydrocarbon is more preferable.

Specific examples of the silicone oil include, but are not limited to various silicone oil, such as dialkyl silicone oil (e.g., dimethyl silicone oil), cyclic dialkyl silicone oil, alkylphenyl silicone oil, cyclic alkylphenyl silicone oil, and polyalkylaralkyl siloxane.

Specific examples of the alkylphenyl silicone oil include, but are not limited to, methyl phenyl silicone oil, ethyl phenyl silicone oil, propyl phenyl silicone oil, butyl phenyl silicone oil, hexyl phenyl silicone oil, octyl phenyl silicone oil lauryl phenyl silicone oil, and stearyl phenyl silicone oil.

Specific examples of the cyclic alkylphenyl silicone oil include, but are not limited to, cyclic polymethylphenyl siloxane, cyclic polyethylphenyl siloxane, cyclic polybutylphenyl siloxane, cyclic polyhexylphenyl siloxane, cyclic polymethylchlorophenyl siloxane, and cyclic polymethylbromophenyl siloxane.

Specific examples of the polyalkylaralkyl siloxane include, but are not limited to, benzyl-modified silicone oil and methylstyryl-modified silicone oil.

Specific examples of commercial products of the silicone oil include, but are not limited to: KF96 series, KF50 series, KF54, KF56, all manufactured by Shin-Etsu Chemical Co., Ltd.; AK series, AS series, AR series, AP series, and PDM series, all manufactured by Wacker Asahikasei Silicone Co., Ltd., TSF451 series, TSF456 series, TSF405, TSF4427, TSF431, TSF433, TSF437, and TSF456 series, all manufactured by GE Toshiba Silicone Co., Ltd.; and SH200 series, SH510, SH550, SH556, SH702, SH704, and SH705, all manufactured by Dow Corning Toray Co., Ltd.

These can be used alone or in combination.

Of these, dispersion media having a boiling point of 80° C. or higher is more preferable and dispersion media having a boiling point of 150° C. or higher is furthermore preferable.

When the dispersion medium having a boiling point of lower than 80° C. is used, the dispersion medium is vaporized by repeatedly heating the recording medium every time an image is recorded or erased. As a result, migration of electrophoresis of the particles tends to be restricted, which leads to production of defective images. The dispersion medium easily remains as a gel without turning into a sol when heated so that the image may not be able to be rewritten.

There is no specific limit to the amount of the dispersion medium in the image recording layer. It can be selected to a particular application.

It is possible to tint the dispersion medium by dissolving, in the dispersion medium, a dye having the same or different color to that of the electrophoretic particles and/or magnetophoretic particles.

There is no specific limit to the selection of the dyes. For examples, an oil-soluble dye is suitably used.

Specific examples of the oil-soluble dye include, but are not limited to, spirit black (SB, SSBB, AB), nigrosine substrate (SA, SAP, SAPL, EE, EEL, EX, EXBP, EB), oil yellow (105, 107, 129, 3G, GGS), oil orange (201, PS, PR), fast orange, oil red (5B, RR, OG), oil scarlet, oil pink 312, oil violet #730, Macrolex blue RR, Sumiplast green G, oil brown (GR, 416), Sudan black X60, oil green (502, BG), oil blue (613, 2N, BOS), oil black (HBB, 860, BS), Valifast yellow (1101, 1105, 3108, 4120), Valifast orange (3209, 3210), Valifast red (1306, 1355, 2303, 3304, 3306, 3320), Valifast pink 2310N, Valifast brown (2402, 3405), Valifast blue (3405, 1501, 1603, 1605, 1607, 2606, 2610), Valifast violet (1701, 1702), and Valifast black (1802, 1807, 3804, 3810, 3820, 3830).

In addition to dyes, non-electrophoretic particles can be added.

Non-electrophoretic particles demonstrate no or extremely low electrophoretic properties in an electric field. Any of inorganic or non-organic particles is suitable. Since these non-electrophoretic particles do not migrate in an electric field, a dispersion medium can form a while or colored state.

Images are recorded by the electrophoretic particles contained together migrating closer to the imaging side, i.e., rear side, than the non-electrophoretic particles.

Unlike dyes, the non-electrophoretic particles are not transparent, thereby hiding the electrophoretic particles. As a result, the non-electrophoretic particles is advantageous in some cases to improve contrast or color representation as a recording medium.

A specific example of the organic non-electrophoretic particles is polyvinylnephthalene particles.

In addition, a specific example of the inorganic non-electrophoretic particles is metal oxide. A surface-treated metal oxide can control chargeability in some cases.

In addition, it is possible to contain the magnetophoretic particles as the non-electrophoretic particles or the electrophoretic particles as the non-magnetophoretic particles.

These coloring agents (colorants) can be added alone or in combination to the recording medium of the present disclosure.

Thermoreversible Gelling Agent

As the thermoreversible gelling agent, it is suitable to use a thermoreversible gelling agent capable of converting the dispersion medium into a gel at the time of image browsing and image saving, and converting the dispersion medium into a liquid at the time of image recording at a temperature higher than the temperature for the image browsing and image saving.

Further as the thermoreversible gelling agent, a thermoreversible gelling agent having higher temperature responsiveness is preferable, and a thermoreversible gelling agent that converts the dispersion medium into a sol at once when the temperature becomes higher than a certain temperature, and converts the dispersion median into a gel at once when the temperature becomes the certain temperature or lower, is more suitable.

Image browsing means a state where a use views image information recorded on the rewritable recording medium, and image saving means a state where image information is saved on the rewritable recording medium.

In other words, the time of image browsing and image saving means a situation at a normal temperature, and for example, a state at temperature of 10° C. or higher but lower than 40° C.

In the present disclosure, a state of a gel means a state where the liquid dispersion has lost its fluidity, to thereby inhibit the movements and to fix the electrophoretic particles and/or magnetophoretic particles dispersed at the liquid dispersion.

In the present disclosure, a state of a gel is preferably a state with elasticity for providing the recording medium with flexibility.

On the other hand, a state of a liquid means a state where the dispersion medium has fluidity, thereby allowing the electrophoretic particles and/or magnetophoretic particles dispersed in the liquid dispersion to move freely.

In the present disclosure, a state of a liquid preferably has a sufficiently low viscosity so as not to suppress the movements of the electrophoretic particles and/or magnetophoretic particles.

The thermoreversible gelling agent forms a network structure by hydrogen bonding, the van der Waals' force, hydrophobic interaction, electrostatic interaction, and π-π interaction. By incorporating the dispersion medium into the network structure, the dispersion medium is converted into a gel. On the other hand, the three-dimensional network structure is easily cut by heating, so that it is considered that the dispersion medium is returned to a liquid by heating.

The three-dimensional network structure is formed in such a manner that, for example, the thermoreversible gelling agent molecules self-aggregate due to hydrogen bonding to form fibrous aggregates by intermolecular interaction, and further, the fibrous aggregates grow due to the van der Waals' force and hydrophobic or electrostatic interaction, and fibrous aggregates intertwine with each other.

By incorporating the dispersion medium molecules into the three-dimensional network structure, gelatinization of the dispersion medium progresses.

Specific examples of the thermoreversible gelling agent include, but are not limited to, organogel and hydrogel.

The organogel is a thermoreversible gelling agent that can turn an organic solvent or silicone oil serving as the dispersion medium into a gel.

As the thermoreversible gelling agent for use in the present disclosure, a thermoreversible gelling agent having an amide bond (—NHCO—) in a molecule thereof is preferably used.

The energy source for the thermoreversible gelling agent to convert the dispersion medium into a gel is formation of hydrogen bonding between N—H and C=O of the amide bond.

Formation of a gel with high temperature responsiveness depends on reactivity of the hydrogen bonding, and therefore the thermoreversible gelling agent having an amide bond in a molecule thereof is used as a thermogelling agent in the present disclosure.

In the present disclosure, more preferred is the thermoreversible gelling agent having a urethane bond (—NH-COO—) in a molecule thereof.

The thermoreversible gelling agent having the urethane bond has high temperature responsiveness to sol-gel transition compared to the thermoreversible gelling agent having an amide bond. Therefore the thermoreversible gelling agent having a urethane bond is very suitable in the present disclosure.

Moreover, a polymer or oligomers thermoreversible gelling agent has been known.

A low molecular weight thermoreversible galling agent is turned into a crystal depending on a structure thereof, as it is left for a long period of time, which easily degrades the stability thereof.

On the other hand, the polymer or oligomers thermoreversible gelling agent may be effective, as it does not crystallized owing to molecular weight distribution thereof or movements of a flexuous chain thereof.

The polymer or oligomers thermoreversible gelling agent can be obtained, for example, by introducing a gelling component that induces gelation to a polymer component that prevents crystallization.

Even one amide bond or urethane bond in a molecular of the thermoreversible gelling agent is suitable. To enhance temperature responsiveness to sol-gel transition, the thermoreversible gelling agent preferably has multiple amide bonds or urethane bonds in a molecule thereof. It is more preferable to contain a larger number of the amide bonds or urethane bonds in the molecule thereof.

By having more amide bonds or urethane bonds, gelation capability is enhanced and temperature responsiveness to gelation becomes higher. Therefore, it is suitable in the present disclosure.

In the present disclosure, moreover, the thermoreversible gelling agent is more preferably a thermoreversible gelling agent having a siloxane bond in a molecule thereof.

The siloxane bond is a structure in which silicon (Si) and oxygen (O) are alternately bonded. Examples thereof are as follows:

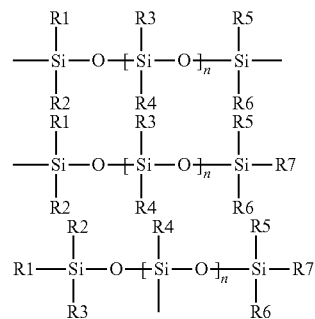

In the formulae above, R1 to R7 are each a C8-C20 alkyl group, and R1 to R7 may be the same or different to each other, and n is an integer of 0 to 80.

The thermoreversible gelling agent having the siloxane bond hardly crystallizes, and can enhance the stability of a gel.

In addition, the gel tends to be softened, and this is effective for enhancing flexibility of the recording medium of the present disclosure.

As the siloxane bond in the thermoreversible gelling agent becomes longer, the gel becomes softer, and the sol-gel transition temperatures of the dispersion medium tend to become lower.

However, if the gel of the dispersion medium becomes excessively soft, the function of fixing the electrophoretic particles or the magnetophoretic particles may deteriorate and the safety may deteriorate.

It is preferable that the length of the siloxane bond is properly controlled with respect to the sol-gel transition temperatures and flexibility of the dispersion medium set for the recording medium.

A preferable length of the siloxane bond in the thermoreversible gelling agent is defined as follows.

That is, it is preferable that the number of silicon atoms A of the siloxane bond in the molecule of the thermoreversible gelling agent and the total number B of the amide bonds (—NHCO—) and urethane bonds (—NHCOO—) in the molecule satisfy the following relation:

$$0.5 \leq A/B \leq 4.0$$

When the ratio A/B is less than 0.5, the sol-gel transition temperatures of the dispersion medium may be excessively higher than solation or gelation temperature suitable for the rewritable recording medium, there is a possibility that the gel becomes unstable, or the gel becomes excessively hard and the flexibility becomes smaller.

When the ratio A/B is greater than 4.0, on the other hand, there is a possibility that the sol-to-gel transition temperature becomes excessively lower than a sol-to-gel transition temperature suitable for the rewritable recording medium, or the gel becomes excessively soft, and the dispersion medium does not turn into a gel even at a normal temperature and the image retentiveness deteriorates.

Moreover, it is preferred that the thermoreversible gelling agent has a long chain alkyl group.

In order to grow aggregates formed by hydrogen bonding of the amide bond or urethane bond of the thermoreversible gelling agent into fibrous form and further form a three-dimensional network structure, a structure for causing aggregates to easily interact with each other is preferable.

It is considered that these long-chain alkyl group and long-chain alkylene group promote intermolecular interaction and contribute to the formation of the fibrous aggregates and three-dimensional network structure.

The number of carbon atoms of the alkyl group is preferably 8 to 20.

As described above, any thermoreversible gelling agents cannot be used for the recording medium of the present disclosure. It is suitable that the thermoreversible gelling agent for use in the recording medium of the present disclosure can be used with a high insulating dispersion medium, sol-gel transition temperature thereof is suitable for the environment in which the recording medium is used, the thermoreversible gelling agent has high temperature responsiveness to sol-gel transition (promptly turn the dispersion medium into a liquid as heated, and immediately turns the dispersion medium into a gel, as the temperature is returned to room temperature), and the thermoreversible gelling agent stably functions without being crystallized and collapsing a get, even after sol-gel transition thereof is repeated.

Examples of the particularly preferable gelling agents for use as the thermoreversible gelling agent in the recording medium of the present disclosure are as follows.

These are examples, and the thermoreversible gelling agent for use in the present disclosure is not limited to these examples.

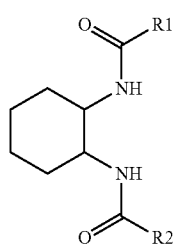

In the formula above, R1 and R2, each, independently represent C8-C20 alkyl groups.

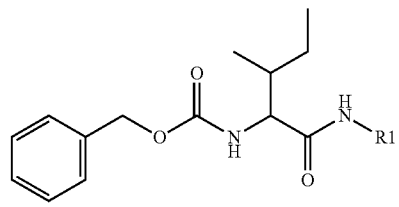

In the formula above, R1 is a C8-C20 alkyl group.

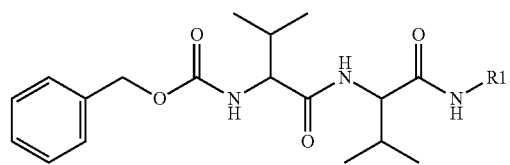

In the formula above, R1 is a C8-C20 alkyl group

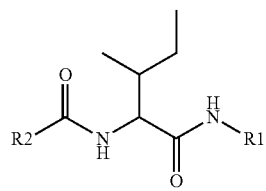

In the formula above, R1 and R2 each, independently represent alkyl groups, where the alkyl groups are preferably C8-C20 alkyl groups.

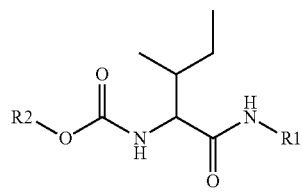

In the formula above, R1 and R2 each, independently represent alkyl groups, where the alkyl groups are preferably a C8-C20 alkyl group.

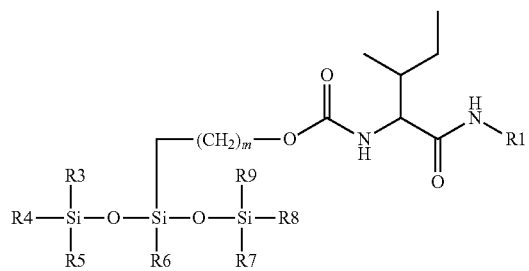

In the formula above, R1 is a C8-C20 alkyl group; R3 to R9 are each a hydrogen atom, a C1-C12 alkyl group, a C1-C12 alkoxy group, or an aryl group that may have substituents, where R3 to R9 are identical or different; and m is an integer of 1 to 20.

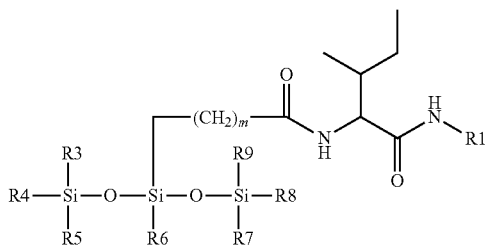

In the formula above, R1 is a C8-C20 alkyl group; R3 to R9 each, independently represent hydrogen atoms, C1-C12 alkyl groups, C1-C12 alkoxy groups, or aryl groups that may have substituents, where R3 to R9 are identical or different; and m is an integer of 1 to 20.

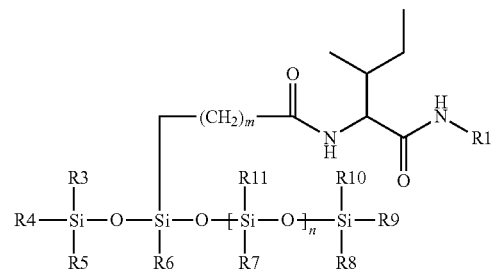

In the formula above, R1 is a C8-C20 alkyl group.

R3 to R11 each, independently represent hydrogen atoms, C1-C12 alkyl groups, C1-C12 alkoxy groups, or aryl groups that may have substituents, where R3 to R11 are identical or different; m is an integer of 1 to 20; and n is an integer of 1 to 80.

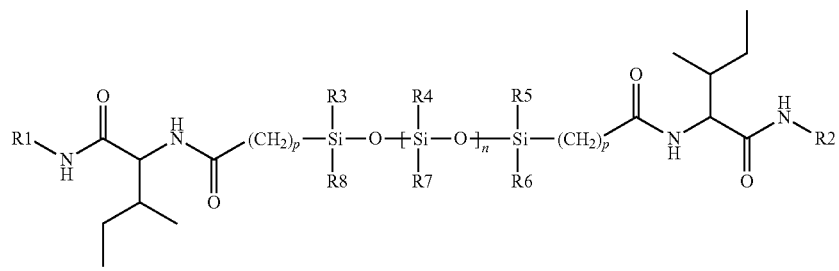

In the formula above. R1 and R2 each, independently represent C8-C20 alkyl groups; R3 to R8 each, independently represent hydrogen atoms, C1-C12 alkyl groups, C1-C12 alkoxy groups, or aryl groups that may have substituents, where R3 to R8 are identical or different; n is an integer of 0 to 80; and p is an integer of 1 to 20.

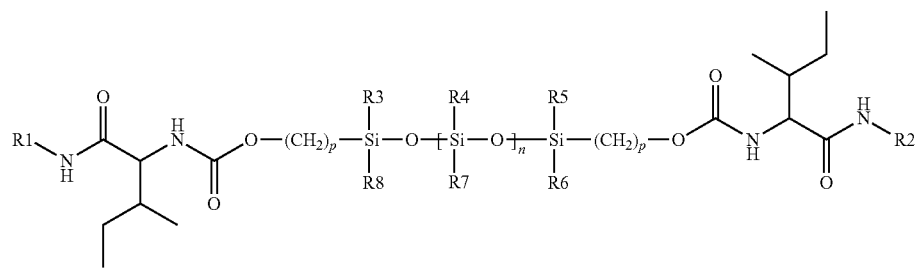

In the formula above, R1 and R2 each, independently represent C8-C20 alkyl groups; R3 to R8 each, independently represent hydrogen atoms, C1-C12 alkyl groups, C1-C12 alkoxy groups, or aryl groups that may have substituents, where R3 to R8 are identical or different; n is an integer of 0 to 80; and p is an integer of 1 to 20.

The amount of the thermoreversible gelling agent in the image recording layer can be determined so that the dispersion medium is in the state of a gel during displaying an image and storing (for example, at room temperature), and the dispersion medium is in the state of a liquid when an image is recorded (written) (for example, at temperature higher than the temperature during displaying an image and storing). The amount of the thermoreversible gelling agent in the image recording layer is preferably 0.05% by mass to 50% by mass, more preferably 0.1% by mass to 20% by mass, and even more preferably 0.5% by mass to 10% by mass, relative to the dispersion medium.

When the amount thereof is less than 0.05% by mass, the gelation of the dispersion medium is insufficient, which may impair image retentiveness. When the amount thereof is greater than 50% by mass, the viscosity of the dispersion medium may not be sufficiently reduced, or insoluble matter may be remained, when the recording medium is heated. As it result of this, movements of the electrophoretic particles and/or magnetophretic particles is inhibited, thereby causing deterioration in image quality.

The gelation temperature and solation temperature of the dispersion medium in the image recording layer are appropriately selected depending on the intended purpose without any limitation, but they are preferably 20° C. to 120° C., more preferably 30° C. to 100° C., and even more preferably 40° C. to 80° C.

The gelation temperature and solation temperature can be adjusted by appropriately selecting a type and an amount of the dispersion medium and a type and an amount of the thermoreversible gelling agent, or mixing different thermoreversible gelling agents at an appropriate ratio.

When the gelation temperature and solation temperature are lower than 20° C., they pose no problem in a normal environment, however, the image retentiveness tends to deteriorate, as the recording medium is used outdoors where it is exposed to direct sunlight or in a sun-heated car.

In particular, unlike a PLD, it is assumed that the recording medium of the present disclosure is expected to be used in various environments including outdoors, so that high image retentiveness is also required in these environments.

When the gelation temperature and solation temperature are higher than 120° C., the time taken to reach the temperatures becomes longer, and thus the recording speed and image quality is easily degraded.

However, the gelation temperature and the solation temperature are not necessarily the same, and hysteresis between the gelation temperature and the solation temperature is allowed.

When the solation temperature is higher than the gelation temperature, images can be recorded in a wider temperature range.

For example, in a case where the solation temperature is 80° C. whereas the gelation temperature is 40° C., if the dispersion medium is once turned into a sol at 80° C. or higher, it is possible to record an image until it is gelated at 40° C. or lower. That is, when compared with a case in which the solation temperature is closer to the gelation temperature, images can be recorded in a longer period of time.

When recording is conducted in a wider temperature range, contrast is improved, the degree of the non-uniformity of image density is reduced, and the image quality is improved. In addition, the printing speed is also improved and the designing flexibility is obtained with regard of arrangement of a heater, an electric field applicator, or a magnetic field applicator. In a case where the solation temperature is higher than the gelation temperature, if the dispersion medium is once turned into a gel by cooling after recording an image, it has to be heated to 80° C. or higher for solation. In such a case, it is possible to maintain image retentiveness.

Which of the gelation temperature and the solation temperature is higher depends on a dispersion medium and a thermoreversible gelling agent but not on electrophoretic particles nor magnetophretic particles.

Here, the gelation temperature or the solution temperature means temperature at which a mixture of a dispersion medium and a thermoreversible gelling agent is turned from a sol (liquid) into a gel or from a gel into a sol (liquid) by the thermoreversible gelling agent.

A method for determining the gelation temperature and solation temperature of the dispersion medium containing the thermoreversible gelling agent is not particularly limited, as long as it is a method capable of determining temperature at which transition from a sol to a gel, or transition form a gel to a sol occurs. For example, the following methods can be used. One of the methods is a method using differential scanning calorimetry (DSC).

As for a device, a commercially available DSC analysis device is used.

When a sample containing the thermoreversible gelling agent is set and a measurement of DSC is performed, an endothermic peak is observed during a heating process, and an exothermic peak is observed during a cooling process.

The temperature of the endothermic peak in the heating process can be regarded as solation temperature, and the temperature of the exothermic peak in the cooling process can be regarded as gelation temperature.

If the heating rate and the cooling rate are too fast, a performance to track the heat becomes low, leading to a large error in the value. Therefore, the heating rate and the cooling rate are preferably slow, e.g., 5° C./min or less, more preferably 2° C./min or less.

Moreover, examples of the aforementioned method include a method using dynamic mechanical analysis (DMA).

As for a device, a device, which is generally called as a viscoelasticity measuring device, or rheometer, can be used for the measurement.

When a sample containing the thermoreversible gelling agent is set and DMA is performed, a region where the storage elastic modulus (G') exceeds the loss elastic modulus (G''), and a region where the storage elastic modulus (G') and the loss elastic modulus (G'') are crossed and then the loss elastic modulus (G'') exceeds the storage elastic modulus (G') are observed.

Typically, the sample is regarded as the state of a gel in the region where G' is larger than G'' (G'>G''), and is regarded as the state of a sol in the region where G' is smaller than G'' (G'<G'').

The point at which G' and G'' are crossed in a heating process can be regarded as the solation temperature, and the point at which G' and G'' are crossed in a cooling process can be regarded as the gelation temperature.

If the heating rate and the cooling rate are too fast, a performance to track the heat becomes low, leading to a large error in the value. Therefore, the heating rate and the cooling rate are preferably slow, e.g., 5° C./min or less, more preferably 3° C./min or less.

Moreover, in order to prevent vaporization of the dispersion medium in the state of a sol, a surrounding area of the plate to which the sample is set can be sealed with oil, and this method is effective in some cases.

As other examples, various methods known in the art can be used for the measurement of the solation temperature and gelation temperature, and such methods include: a method using a tuning-fork vibration viscometer, in which an oscillator is vibrated in a liquid at a constant frequency, to measure the value of electric current with which the viscous resistance of the oscillator becomes exciting-force, to thereby measure a viscosity; a method using a rigid pendulum rheometer, in which a measuring part, which is a supporting point of a pendulum, on a sample, and a damping factor of the vibrations of the pendulum is measured; a method containing placing a colored liquid or object on a gel sample, and visually observing a change caused by heating.

Other Components

Examples of other components contained in the image recording layer include a dispersing agent, and a surfactant.

However, the aforementioned other components are not limited to these examples, and optionally contains other components.

Dispersing Agent

The dispersing agent is appropriately selected depending on the intended purpose without any limitation, provided that it is a dispersing agent capable of enhancing dispersibility of the electrophoretic particles and/or magnetophoretic particles in the dispersion medium, preventing aggregation of electrophoretic particles and/or magnetophoretic particles, and making the electrophoretic particles and/or magnetophoretic particles stably migrate.

The dispersing agent is preferably selected form those soluble to the dispersion medium, and having a function of preventing the electrophoretic particles and/or magnetophoretic particles from being aggregated to each other by electrostatic repulsion or steric hindrance by being adsorbed to the surfaces of the electrophoretic particles and/or magnetophoretic particles.

The dispersing agent is appropriately selected depending on the intended purpose without any limitation, but it is preferably a dispersing agent soluble in a nonpolar solvent, more preferably a polymer dispersing agent.

This is because the dispersion stability of particles in a non-polar organic solvent system greatly depends on the steric effect of a polymer compound.

The polymer dispersing agent is preferably a polymer dispersing agent having a basic group and a polymer dispersing agent having an acid group, and the former dispersing agent is more preferable.

The reason for this is because it is considered that, for example, in the case where a pigment, such as carbon black, is used as electrophoretic particles, a basic polymer dispersing agent is adsorbed to the surface of the pigment and acts as a positive charge-controlling agent, and exerts an effect of positively charging the pigment surface.

Examples of the polymer dispersing agent having a basic group include a polymer prepared from at least one monomer having a basic group (e.g., N-methylaminoethyl(meth)acrylate, N-ethylaminoethyl(meth)acrylate, N,N-dimethylaminoethyl(meth)acrylate, N,N-diethylaminoethyl(meth)acrylate, N,N-dibutylaminoethyl acrylate, N,N-di-tert-butylaminoethyl acrylate, N-phenylaminoethyl methacrylate, N,N-diphenylaminomethyl methacrylate, amino styrene, dimethylaminostyrene, N-methylaminoethylstyrene, dimethylaminoethoxystyrene, diphenylaminoethylstyrene, N-phenylaminoethylstyrene, 2-N-piperidylethyl (meth)acrylate, 2-vinylpyridine, 4-vinylpyridine, and 2-vinyl-6-methylpyridine) and at least one selected from the group consisting of alkyl ester of (meth)acrylic acid, and aryl ester of (meth)acrylic acid.

As for the polymer dispersing agent having a basic group, a commercial product can be used.

As for the commercial product thereof, preferred are SOLSPERSE 17000 (single polyester, anchoring site: basic group), SOLSPERSE 16000 (single polyester, anchoring site: basic group), SOLSPERSE 41000 (single polyester, anchoring site: acid), and SOLSPERSE 3000 (single polyester, anchoring site: acid), all manufactured by The Lubrizol Corporation. As another example, Disperbyk-2050, 2150, 160, 161, 162, 163, 164, 166, 167, and 182 (all manufactured by BYK Japan KK) can also be preferably used.

Surfactant

The surfactant is added for the purpose of improving of the dispersion stability of the electrophoretic particles and/or magnetophoretic particles, obtaining a sufficient migration speed, and enhancing image retentiveness.

The surfactant is appropriately selected depending on the intended purpose without any limitation, but it is preferably a nonionic surfactant.

If a surfactant other than nonionic surfactants is used, for example, an ionic surfactant is used, the ionic surfactant is adsorbed to the surfaces of the electrophoretic particles and magnetophoretic particles and the behavior of the electrophoretic particles and/or magnetophoretic particles may become unstable.

Examples of the nonionic surfactant include polyoxyethylene alkyl ether, polyoxyethylene alkyl allyl ether, polyoxyethylene alkylphenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanol amide, amine oxide, polyoxyethylene alkyl amine, glycerin fatty acid ester, sorbitan fatty acid ester, polyoxyethylene sorbitan fatty acid ester polyoxyethylene sorbitol fatty acid ester, and alkyl(poly)glycoxyde.

Of these, preferred are sorbitan trioleate, sorbitan laurate, sorbitan palmitate, sorbitan stearate, sorbitan tristearate, sorbitan oleate, sorbitan tribehenate, and sorbitan caprylate.

Structural Example of Recording Medium

One example of the recording medium of the present disclosure using cells is explained with reference to FIG. 2.

Figure 2:
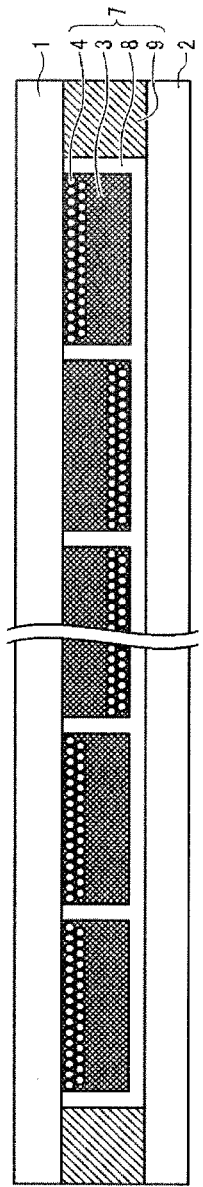
FIG. 2 is a schematic diagram illustrating an example of the recording medium using cells according to an embodiment of the present invention.

The recording medium illustrated its FIG. 2 contains a first substrate 1, a second substrate 2, and an image recording layer 7 sandwiched with these substrates (namely, enclosed with these substrates).

The image recording layer 7 contains cells 8 provided at constant intervals, and a colored dispersion medium 3 containing white electrophoretic particles 4, and a thermoreversible gelling agent, which is encapsulated in the cells 8.

As for the electrophoretic particles 4, particles of any color can be used other than white.

Moreover, it is possible to provide a sealant 9 at the perimeter of the recording medium for the purpose of bonding the first substrate 1 with the second substrate 2 and sealing the image recording layer.

Either or both of the first substrate 1 and the second substrate 2 contains a filler.

Figure 3:
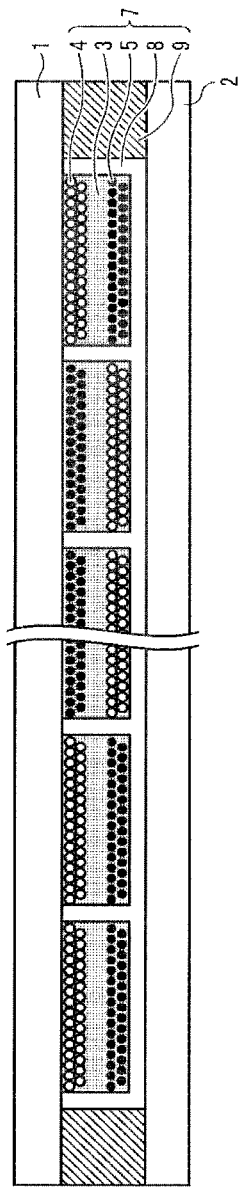
FIG. 3 is a schematic diagram illustrating another example of the recording medium using cells according to an embodiment of the present invention.

The recording medium illustrated in FIG. 3 contains a first substrate 1, a second substrate 2, and an image recording layer 7 sandwiched with these substrates (namely enclosed with these substrates).

The image recording layer 7 contains cells 8 provided certain intervals, and a transparent dispersion medium 3 containing white electrophoretic particles 4, and black electrophoretic particles 5, which is encapsulated in each cell.

As for the electrophoretic particles 4 and 5, particles of any color can be used other than white or black.

Moreover, it is possible to provide a sealant 9 at the perimeter of the recording medium for the purpose of bonding the first substrate 1 with the second substrate 2 and sealing the image recording layer.

Either or both of the first substrate 1 and the second substrate 2 contains a filler.

One example of the recording medium of the present disclosure using microcapsules is explained with reference to FIG. 4.

Figure 4:
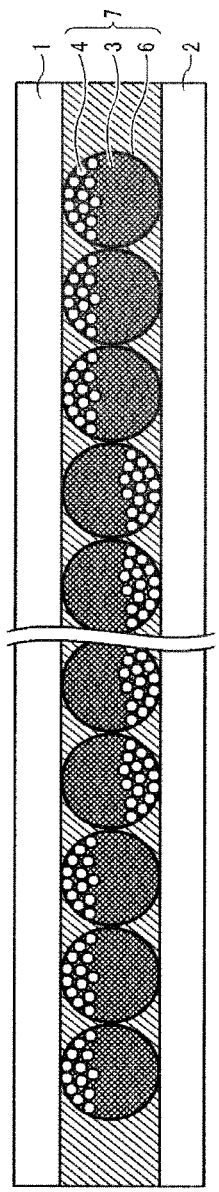
FIG. 4 is a schematic diagram illustrating an example of the recording medium using microcapsules according to an embodiment of the present invention.

The recording medium illustrated in FIG. 4 contains a first substrate 1, a second substrate 2, and an image recording layer 7 sandwiched with these substrates (namely enclosed with these substrates).

The image recording layer 7 contains multiple microcapsules 6, which are aligned, and each contain a colored dispersion medium 3 containing white electrophoretic particles 4, and a thermoreversible gelling agent.

As for the electrophoretic particles 4, particles of my color can be used other than white.

Either or both of the first substrate 1 and the second substrate 2 contains a filler.

Figure 5:
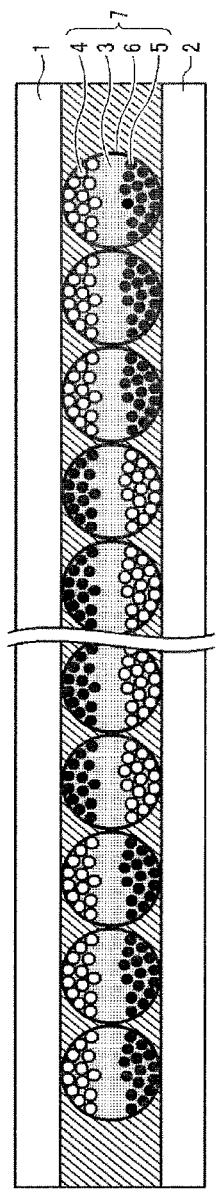
FIG. 5 is a schematic diagram illustrating another example of the recording medium using microcapsules according to an embodiment of the present invention.

The recording medium illustrated in FIG. 5 contains a first substrate 1, a second substrate 2, and an image recording layer 7 sandwiched with these substrates (namely enclosed with these substrates).

The image recording layer 7 contains multiple microcapsules 6, which are aligned, and each contain a transparent dispersion medium 3 containing white electrophoretic particles 4, black electrophoretic particles 5, and a thermoreversible gelling agent.

As for the electrophoretic particles 4 and 5, particles of any color can be used other than white or black.

Either or both of the first substrate 1 and the second substrate 2 contains a filler.

A thickness of the image recording layer is appropriately selected depending on the intended purpose without any limitation, but it is preferably 5 μm to 200 μm, more preferably 10 μm to 100 μm, and even more preferably 20 μm to 80 μm.

When the thickness of the image recording layer is less than 5 μm, a contrast ratio may be low. When the thickness thereof is greater than 200 μm, recording speed or resolution may reduce, or it may be necessary to increase driving voltage.

Note that, the thickness of the image recording layer indicates a thickness of the thickest part of the image recording layer.

Figure 6:
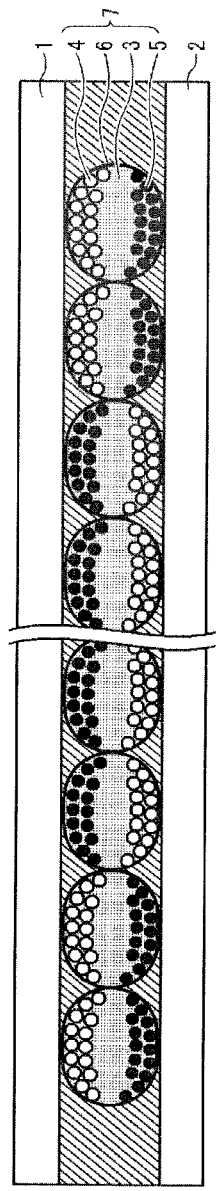
FIG. 6 is a schematic diagram illustrating an example where a cross-section of the image recording layer is a substantially circle.
Figure 7:
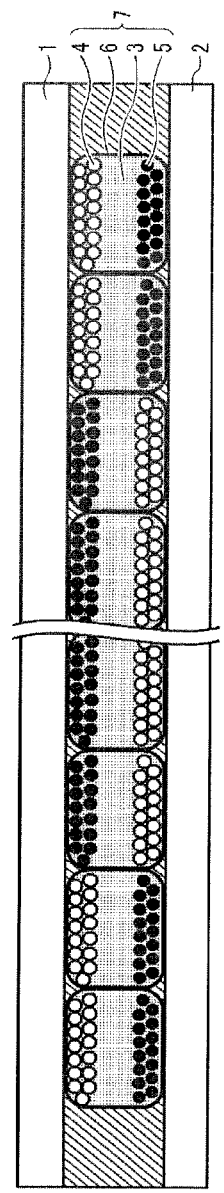
FIG. 7 is a schematic diagram illustrating an example where a cross-section of the image recording layer is a polygon.

For example, as illustrated in FIGS. 6 and 7, in the case where a cross-sectional form of the image recording layer is a form other than a true circle, such as a substantially circle and a polygon, the length of the longest part of the image recording layer along the thickness direction is a thickness of the image recording layer.

The average thickness of the recording medium of the present disclosure is appropriately selected depending on the intended purpose without any limitation, but it is preferably 15 μm to 1,200 μm, more preferably 30 μm to 600 μm, and even more preferably 50 μm to 260 μm.

Moreover it is possible and suitable that the recording medium of the present disclosure has a structure where an electric conductive layer between the image recording layer and the substrate, and the electric conductive layer is electrically connected with an electrode formed on an external part of the recording medium.

Figure 8:
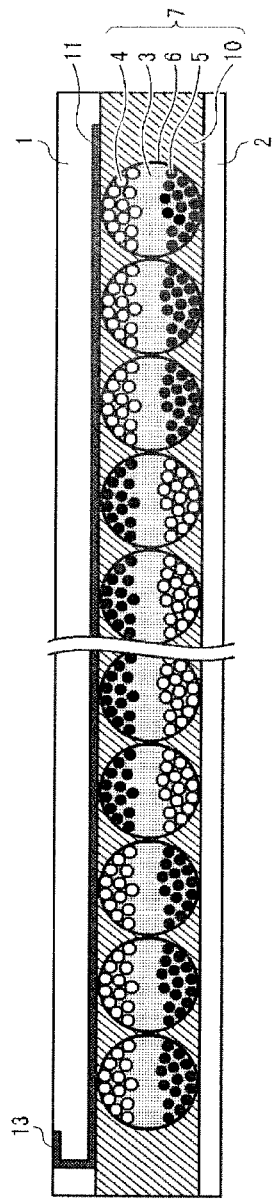
FIG. 8 is a schematic diagram illustrating an example of the recording medium in which an electric conductive layer is formed between the image recording layer and the substrate.

For example, FIG. 8 illustrates an example of a recording medium having an electroconductive layer provided between one of substrates and an image recording layer, in which a first electric conductive layer 11 is provided between the first substrate 1 and the image recording layer 7 of the recording medium of FIG. 5.

The recording medium illustrated in FIG. 8 contains a first substrate 1, a second substrate 2, and an image recording layer 7 provided between these substrates.

In the image recording layer 7, multiple microcapsules 6 each containing a transparent dispersion medium 3 containing white electrophoretic particles 4, black electrophoretic particles 5, and a thermoreversible gelling agent are aligned, and fixed and insulated with a binder resin 10.

A first electric conductive layer 11 is provided between the image recording layer 7 and the first substrate 1.

Moreover, the first electric conductive layer 11 is electrically connected with a first electrode 13 formed on a surface of the recording medium.

In this case, at least one of the first substrate 1 and the second substrate 2 contains a filler.

The second substrate 2 onto which an electric conductive layer has not been formed is preferably as thin as possible.

Figure 9:
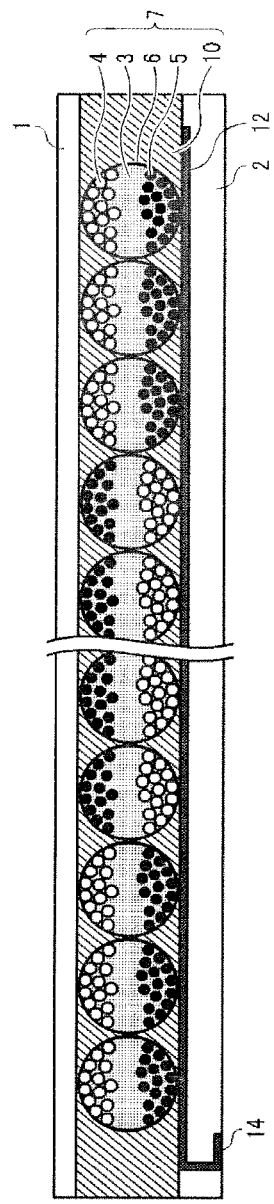
FIG. 9 is a schematic diagram illustrating another example of the recording medium in which an electric conductive layer is formed between the image recording layer and the substrate.

As another example of the recording medium of the recording medium of FIG. 8, it is possible that a recording medium has a structure as illustrated in FIG. 9, where a second electric conductive layer 12 is provided between the second substrate 2 and the image recording layer 7, and the second electric conductive layer 12 and an electrode 14 are electrically connected.

Further, as another example of the recording medium different from the recording medium of FIG. 9, it is possible that a recording medium has a structure as illustrated in FIG. 10, where an electric conductive substrate 15 is used instead of the second substrate 2.

In addition, FIG. 11 illustrates an example of the recording medium containing electric conductive layers between one substrate and the image recording layer and between the other substrate and the image recording layer, in which a first electric conductive layer 11 is provided between the first substrate 1 and the image recording layer 7 of the recording medium of FIG. 5, and a second electric conductive layer 12 is provided between the second substrate 2 and the image recording layer 7 thereof.

The recording medium illustrated in FIG. 11 contains a first substrate 1, a second substrate 2, and an image recording layer 7 provided between the first substrate 1 and the second substrate 2.

In the image recording layer 7, multiple microcapsules 6 each containing a transparent dispersion medium 3 containing white electrophoretic particles 4, black electrophoretic particles 5, and a thermoreversible gelling agent are aligned, and fixed as insulated is a binder resin 10.

A first electric conductive layer 11 is provided the image recording layer 7 and the first substrate 1, and a second electric conductive layer 12 is provided between the image recording layer 7 and the second substrate 2.

Moreover, the first electric conductive layer 11 is electrically connected with a first electrode 13 formed on the exterior of the regulating medium, and the second electric conductive layer 12 is electrically connected with a second electrode 14 formed on an opposite exterior of the recording medium.

Note that, the "exterior of the recording medium" can be any area of the recording medium and be electrically connected to an application device equipped with an image recording device.

For example, the exterior (external surface) of the recording medium indicates a surface, a back surface, and a side surface of the recording medium.

Moreover, a case where the electric conductive layer and the electrode are integratedly mounted is depicted in FIGS. 8 to 11, but the electric conductive layer and the electrode can be provided as separate devices.

Figure 12:
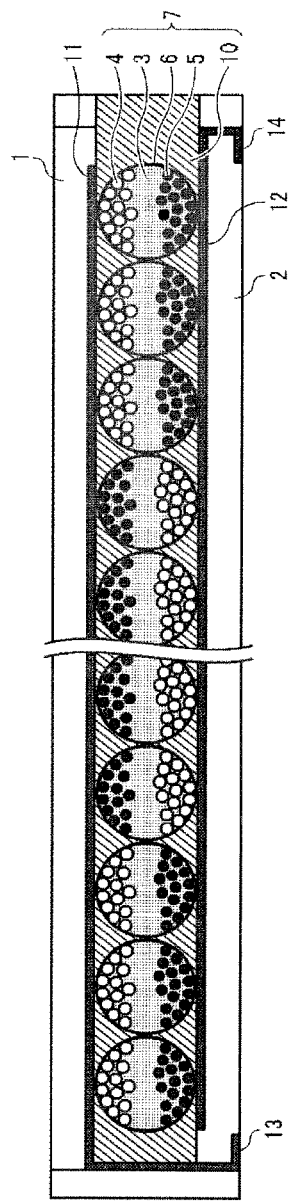
FIG. 12 is a schematic diagram illustrating another example of the recording medium in which an electric conductive layer is formed between the image recording layer and the substrate.

Moreover, as another example of the recording medium of FIG. 11, the first electrode 13 and the second electrode 14 can be provided on the same surface, as illustrated in FIG. 12.

Figure 13:
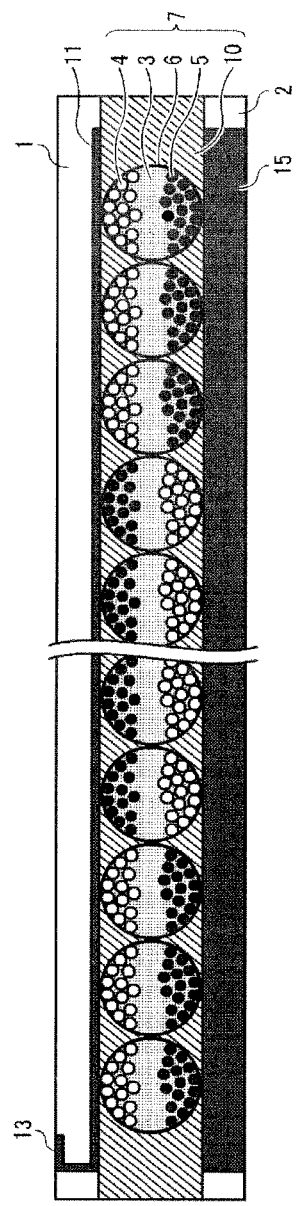
FIG. 13 is a schematic diagram illustrating one example of the recording medium in which an electric conductive layer is formed between the image recording layer and an electric conductive substrate.

As another example of the recording medium of the recording medium of FIG. 11, the recording medium may have a structure illustrated in FIG. 13.

The recording medium of FIG. 13 contains a first substrate 1, a second substrate 15, and an image recording layer 7 provided between the first substrate 1 and the second substrate 15.

In the image recording layer 7, multiple microcapsules 6 each containing a transparent dispersion medium 3 containing white electrophoretic particles 4, black electrophoretic particles 5, and a thermoreversible gelling agent are aligned, and fixed and insulated with a binder resin 10.

A first electric conductive layer 11 is provided between the image recording layer 7 and the first substrate 1, and the first electric conductive layer 11 is electrically connected to a first electrode 13 formed in the exterior of the recording medium.

As for the substrate (second substrate) provided an opposite side of the recording medium, an electric conductive substrate 15 having an electroconductive filler is provided, being electrically connected to the image recording layer 7.

Image Recording Device, Image Recording Method, and Image Recording Set

The image recording device of the present disclosure is an image recording device used for recording an image on the recording medium of the present disclosure, and contains at least a heating device, an electric field application device and/or a magnetic field application device.

The image recording device of the present disclosure preferably further contains an image erasing device, and may further contain other devices, if necessary.

In accordance to the image recording method of the present disclosure, an area of the image recording medium of the rewritable recording medium heated by the image recording, device is smaller than, or larger than, or the same to an area of the image recording layer of the recording medium to which an electric field and/or magnetic field is applied.

In the case where the heated area of the image recording layer of the rewritable recording medium is smaller than the area of the image recording layer of the recording medium to which an electric field or magnetic field is applied, for example, used is a system where an electric field and/or magnetic field is applied an entire area of the recording medium, and an image pattern is recorded by applying heat.

In the case where the heated area of the image recording layer of the rewritable recording medium is larger than the area of the image recording layer of the recording medium to which an electric field or magnetic field is applied, for example, used is a system where an entire area of the recording medium is heated to turn the dispersion medium therein into a state of a sol, and an image pattern is recorded by applying an electric field and/or magnetic field.

In the case where the heated area of the image recording layer of the rewritable recording medium is the same to the area of the image recording layer of the recording medium to which an electric field or magnetic field is applied, for example, used is a system where heat, and electric field and/or magnetic field are applied to an area of the recording medium to which an image is recorded.

The image recording set of the present disclosure contains at least the recording medium of the present disclosure, and an image recording device, and may further contain other members, if necessary.

Image Recording Device

The image recording device of the present disclosure is an image recording device used for recording an image on the recording medium of the present disclosure, and contains at least a heating device, an electric field application device and/or a magnetic field application device.

The image recording device of the present disclosure preferably further contains an image erasing device, and may further contain other devices, if necessary.

The heating device, the electric field application device and/or the magnetic field application device, and the image erasing device are not necessarily provided in this order in the image recording device, and they can be arbitrarily provided.

The image recording method of the present disclosure contains at least a heating step, and an electric field applying step or magnetic field applying step, preferably further contains an image erasing step, and may further contain other steps, if necessary.

The image recording method can be suitably carried out by the image recording device. The heating step can be carried out by the heating device. The electric field applying step or magnetic field applying step can be carried out by the electric field application device or magnetic field application device. The image erasing step can be carried out by the image erasing device.

The heating step, the electric field applying step and/or magnetic field applying step, and the image erasing step do not need to be performed in this order, and the order thereof can be appropriately set.

The image recording device is not integrated with the recording medium of the present disclosure and is a so-called external driving-type image recording device.

However, an embodiment in which a recording medium and an image recording device are used as a set and are integrated together is also included in the scope of the present disclosure.

Healing Device and Heating Step

The heating device is appropriately selected depending on the intended purpose without any limitation, provided that it is a device capable of heating the recording medium to temperature equal to or higher than gelation (liquidization) temperature of the dispersion medium in the image recording layer of the recording medium.

The heating device is used differently in a case where an entire area of the image recording layer of the recording medium of the present disclosure is heated and a case where a part of the image recording layer is heated, depending on the image recording method.

For example, the former is a case where an entire area of the image recording layer is heated to turn into a state of a sol, followed by applying an electric field and/or magnetic field to a part of the image recording layer to record an image, and the latter is a case where, after (or while) an electric field and/or magnetic field is applied to the entire area of the image recording layer, part of the image recording layer is heated and turned into a state of a sol, thereby recording an image.

The sequence of the heating step and the electronic and/or magnetic field applying step can be the other way round.

It is also suitable to apply heat and an electric field and/or magnetic field only to the area in which an image is recorded.

In a case in which the entire image recording layer is heated, any method that can heat a recording medium is suitable. For example, heaters can be used.

In addition, a fixing device used for electrophotographic copiers or printers can be suitably used as the heating device.

Specifically, examples thereof include a heat roller.

The heating step is appropriately selected depending on the intended purpose without any limitation, provided that the recording medium of the present disclosure can be heated, and for example, the heating step can be carried out by the heating device.

Figure 14:
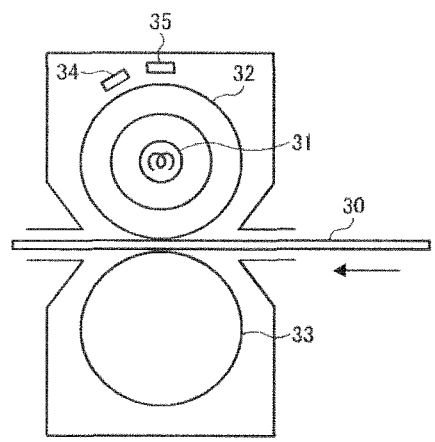
FIG. 14 is a schematic diagram illustrating an example of a heating device of an image recording device in an example of the image recording set according to an embodiment of the present invention.

FIG. 14 illustrates one example of the heating device using a heat roller.

The heating device of FIG. 14 contains a heat roller 32 having a heat source 31 inside, a pressure roller 33, a high speed response thermistor 34 and a thermostat 35 for preventing overheating.

Examples of the heat source 31 include a halogen heater, and a ceramic heater.

The heating roller 32 preferably has a configuration in which the core metal thereof high rigidity such as iron and SUS is covered with Si rubber.

It is preferable that the core metal of the pressure roller 33 is coated with a thickness of approximately 100 μm of Si rubber, fluorine-contained rubber or fluorine resin for smooth feeding and prevention of twining of a transfer material.

In addition, it is preferable that a pressurizing arm is provided on an end portion of the pressurizing roller 33, and spring suspension is provided to allow a load to be applied between the pressurizing roller and the heating roller 32.

A method is also possible that the pressurizing roller 33 is a heat roller enclosing a heater so as to heat the recording medium from both of the recording surface side and the back surface side, and this is suitable to increase the recording speed of the rewritable recording medium 30.

Figure 15:
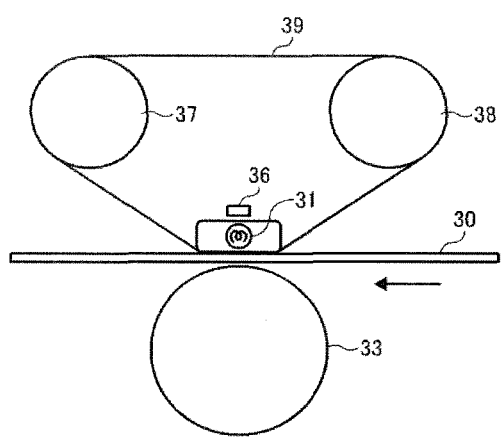
FIG. 15 is a schematic diagram illustrating another example of a heating device of an image recording device in an example of the image recording set according to an embodiment of the present invention.

As illustrated in FIG. 15, moreover, a device containing a belt-like form film roll 39 disposed in contact with the recording medium 30 of the present disclosure, and a heat source 31 fixed on the inner side of the film so as to lace the recording medium 30 can be used.

This has advantages such as shortening the warm-up time and reducing the power consumption.

In this heating device, the belt-like form film roll 39 is rotated by a roller 37 and a roller 38.

Moreover, the recording medium 30 is pressurized by the pressure roller 33.

Furthermore, the temperature of the heat source 31 is controlled by a temperature sensor 36.

The heating device is, for example, an IH (Electromagnetic Induction Heater) type device.

In the IH system, when a high-frequency power source (inverter) is connected to an exciting coil and a high-frequency current is supplied to the exciting coil, a high-frequency magnetic field is generated around an IH coil, and due to this magnetic field, an eddy current flows to a magnetic metal member and Joule heat is generated, whereby performing heating.

On the other hand, for recording an image on the recording medium to which an electric field and/or a magnetic field is applied by heating a part of the image recording layer, a thermal head can be used.

The thermal head is a device that performs recording on a recording medium by heating aligned heat resisting elements by selectively applying a potential according to image data to be recorded.

The thermal head can be appropriately selected from conventional thermal heads used for a thermosensitive printer, such as a direct thermal printer, and a thermal transfer printer, provided that it can heat the recording medium to temperature equal to or higher than the solation temperature.

The thermal head is light in weight and small in size, requires low consumption power, and is capable of straight pass, hence is very suitable as an image forming device used for the recording medium of the present disclosure.

The recording medium of the present disclosure uses the thermoreversible gelling agent, and therefore temperature responsiveness of the recording medium to sol-gel transition is high, and sol-gel transition of the dispersion medium can be sufficiently, induced by the thermal head.

Moreover, because of the points as mentioned, image formation can be performed not only by an electric field, but also by heat, it is very suitable and useful.

As another method, moreover, a method using laser light can be applied.

In this method, heating is performed using thermal energy of laser light, which is a non-contact heating system different from recording by a thermal head. With this method, recording can be performed from a position distant from the recording medium.

Electric Field or Magnetic Field Application Device and Electric Field or Magnetic Field Applying Step The electric field application device or magnetic field application device is appropriately selected depending on the intended purpose without any limitation, provided that it is a device to apply an electric field, or a magnetic field, or a combination thereof to the recording medium of the present disclosure.

The electric field applying step or magnetic field applying step is appropriately selected depending on the intended purpose without any limitation, provided that it is a step containing applying an electric field and/or a magnetic field to the recording medium of the present disclosure. For example, the electric field applying step or magnetic field applying step can be performed by the electric field application device or magnetic field application device.

Application Device

The application device is used differently in the case where an electric field is applied to an entire area it the image recording layer of the recording medium of the present disclosure, and in the case where an electric field is applied to a part of the image recording layer, depending on the image recording method.

The former is a case where, after (or during) an electric field is applied to an entire area of the image recording layer, an image is formed by the heating device, and the latter is a case where, after an entire area of the image recording layer is heated by the heating device, an electric field is applied to a part of the image recording layer to record an image.

As for a device to apply an electric field to an entire area of the image recording layer of the recording medium, various chargers or dischargers are used, but such device is particularly limited as long as it is capable of applying an electric field. Examples thereof include a corona charger, a roller charger, a brush charger, a blade charger, and a solid discharger.

The corona charger is a member that charges the rewritable recording medium by applying a high voltage to a wire, ionizing the air around the wire, and moving the ions to the surface of the rewritable recording medium, and has advantages of non-contact, high-speed followability, and high charge uniformity.

The corona charger is formed by laying discharge wires such as tungsten wires and stainless steel wires with a diameter of 40 μm to 100 μm in 1 row to 3 rows in a shield case provided with corrosion resistance, and gold-plated discharge wires are used for reducing discharge unevenness in many cases.

As the corona charger, there are a corotron type without a grid and a scorotron type using metal thin wires or punching metal as a grid (control grid or suppressor grid).

The discharge state is different between the case where a positive voltage is applied to the discharge wire and the case where a negative voltage is applied to the discharge wire, and when a positive voltage is applied, discharge occurs uniformly along the wire, and on the other hand, when a negative voltage is applied, discharge becomes point-like.

Therefore, when a positive voltage is applied, charging becomes substantially uniform even without a grid, and on the other hand, when a negative voltage is applied, charge unevenness assuming linear shading occurs without a grid, so that a scorotron type provided with a grip is preferable for uniform charging.

The roller charger is electrically connected to or provided adjacent to the recording medium of the present disclosure, and can charge an entire surface of the recording medium while rolling with respect to the movement of the recording medium.

The roller charger is typically composed of two layers of an elastic layer and a top layer provided on a core metal. Particularly for the elastic layer, for example, hydrin rubber or urethane rubber is used.

In such rubber, a resistance control material such as carbon, graphite, activated carbon fiber, and an ionic conductor is dispersed to control the volume resistivity to $10^5$ Ω·cm to $10^8$ Ω·cm.

The roller charger produces less ozone and $NO_x$ and allows setting of a low applied voltage, so that it is effective for reducing power consumption.

Moreover, it is also possible to use an application device, other than a charger utilizing discharge. Such application device is particularly suitably used for a recording, medium, in which an electric conductive layer is provided between a substrate and an image recording layer, or an electric conductive substrate is used as a substrate.

Use of these recording mediums is particularly preferable because driving voltage can be significantly reduced and it obviates the need of a charger utilizing discharge, which it particularly preferable in the present disclosure.

In a case of the recording medium in which an electric conductive layers or electric conductive substrates are provided on the both surfaces of the image recording layer, an electric field can be applied thereto by giving a difference between the voltage applied to the electric conductive layer or electric conductive substrate provided at the side from which the recording medium is viewed, and the voltage applied to the electric conductive layer or electric conductive substrate provided at the opposite side to the side from which the recording medium is viewed.

For example, an electric field of 100 V can be applied to the image recording layer by applying voltage of 100V to the electric conductive layer provided at the side from which viewed, through an electrode of the recording medium electrically connected with the electric conductive layer, and electrically connecting the electrode, which is electrically connected with the electrically conductive layer provided at the opposite side to the side from which viewed, with earth. The reverse connection thereof can apply an electric field of −100 V to the image recording layer.

In this case, as for the application device, any device can be used, as long as it is electrically connected to an electrode or electric conductive substrate, and is capable of applying an electric field to the image recording medium.

For example, a brush-like form or roller-like form member having electric conductivity is preferably used. Specifically, a brush formed of electric conductive fibers or metal plating, or a rubber formed of electric conductive rubber or metal can be used.

The device to apply a part of the image recording layer of the recording medium of the present disclosure to form an image is appropriately selected depending on the intended purpose without any limitation, provided that it is capable of forming a latent electrostatic image, and can form an image by applying an electric field to the recording medium.

As for a system for forming the latent electrostatic image, an electrophotographic system, and an ion irradiating system have been known, and these systems can be particularly effectively used in the present disclosure.

In order to apply an electric field, a counter electrode is provided at the position facing the image forming device via the recording medium.

Electrophotographic Image Fuming Device

The electrophotographic application device is appropriately selected depending on the intended purpose without any limitation, and examples thereof include a device to charge an image bearing member, and then exposing light corresponded to an image pattern to the image bearing member to form a latent electrostatic image on a surface of the image bearing member.

The recording medium of the present disclosure can be recorded by bringing the recording medium into contact with a surface of the image bearing member to which a latent electrostatic image has been formed.

The electrophotographic image forming device contains at least an image bearing member, a charger, and an exposing device, and may further contain other members, such as a diselectrification device, if necessary.

In order to apply an electric field to the recording medium of the present disclosure, a counter electrode is provided at the position facing the image bearing member serving as the image forming device via the recording medium of the present disclosure.

Image Bearing Member

The image bearing member is appropriately selected depending on the intended purpose without any limitation, provided that it is capable of forming a latent electrostatic image. For example, the image bearing member may be a single-layer image bearing member containing a single-layer photosensitive layer, in which a charge generating material and a charge transporting material are mixed, provided on an electric conductive support formed of an aluminum or nickel element tube, or a belt, or may be a laminate image bearing member, in which a charge generating layer and a charge transporting layer are laminated.

Further, the image bearing member is optionally of a high resistant image bearing member, in which a protective layer is provided at a top surface thereof.

The image bearing member can be used both by positively charged and by negatively charged. As there are more variations of hole transporting materials than those of electron transporting materials, a negative charging system (in this case, black electrophoretic particles are positively charged) is more preferable in view of electrostatic properties.

However, a positive charging system may be used in case of the single-layer image bearing member, as electron transportation and hole transportation are possible.

Charger

The charger is appropriately selected depending on the intended purpose without any limitation, provided that it is capable of charging the image bearing member. Examples of the charger include a corona charger, a roller charger, a solid discharger, and a brush charger. Of these, a corona charger and a roller charger are preferable.

Exposing Device

The exposing device is appropriately selected depending on the intended purpose without any limitation, provided that it is capable of forming a latent electrostatic image on a surface of the image bearing member, and examples thereof include a semiconductor laser (LD), a light emitting diode (LED), and an electroluminescence (EL).

Of these, a semiconductor laser (LD) and a light emitting diode (LED) are preferable.

Diselectritication Device

The diselectritication (discharging) device is appropriately selected depending on the intended purpose without any limitation, provided that it is capable of totally erasing the latent electrostatic image formed on the surface of the image bearing member, and examples thereof include a semiconductor laser (LD), a light emitting diode (LED), an electroluminescence (EL), a fluorescent light, a tungsten lamp, and a halogen lamp.

Of these, a light emitting diode (LED) is preferable.

Other Devices

Examples of the aforementioned other devices include a cleaning device, and a lubricating substance application device.

The cleaning device is used for the purpose of removing foreign matter and discharge product deposited on the surface of the image bearing member.

The cleaning device is appropriately selected depending on the intended purpose without any limitation, and examples thereof include a blade, and a brush.

The cleaning device is preferably disposed to be in contact with the image bearing member.

The lubricating substance application device is used for the purpose of enhancing lubricity of the surface of the image bearing member or removing a discharge product in combination with the cleaning device.

The lubricating substance application device is appropriately selected depending on the intended purpose without any limitation, and examples thereof include a brush.

The lubricating substance application device is preferably disposed to be in contact with the image bearing member and a solid lubricating substance.

In the case where the lubricating substance application device is a brush, the lubricating substance is applied to the surface of the image bearing member by rotating the brush.

Examples of the lubricating substance include wax, a fluorine-containing resin, a silicone resin, a polyolefin-based resin, and fatty acid metal salt.

Of these, fatty acid metal salt is preferable, and zinc stearate is more preferable.

Counter Electrode

The counter electrode is provided at the position opposite to the image bearing member to place the recording medium of the present disclosure between the counter electrode and the image bearing member.

A material of the counter electrode is appropriately selected depending on the intended purpose without any limitation, provided that it conducts electricity, and examples thereof include platinum, gold, silver, copper, aluminum, zinc, nickel, titanium, and bismuth, alloys of these metals and carbon.

Since it is suitable to increase the attachability between the counter electrode and the rewritable recording medium, for example, a conductive roll member with elasticity is preferably used as the counter electrode.

Figure 16:
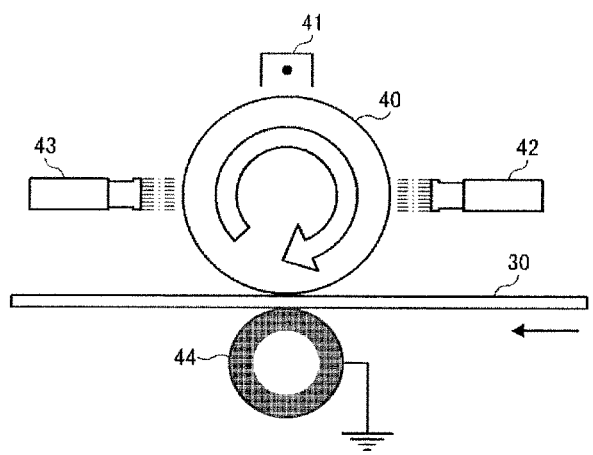
FIG. 16 is a schematic diagram illustrating an example of an electric field application device in an example of an image recording device in the image recording set according to an embodiment of the present invention.

FIG. 16 illustrates an example of an image forming device using an image bearing member in the image recording device.

At the recording side of the recording medium 30 of the present disclosure, an image bearing member 40 is provided to be in contact with the recording medium 30. At the back surface side of the recording medium 30, a counter electrode 44 is provided to at the position opposite to the image bearing member 40 to place the recording medium 30 between the counter electrode 44 and the image bearing member 40.

In the surrounding area of the image bearing member 40, provided are at least a charger 41 to charge the image bearing member 40, an exposing device 42 to form a latent electrostatic image on a surface of the image bearing member 40, and a diselectrification device 43 to erase the latent electrostatic image on the surface of the image bearing member 40.

Ion Irradiation Type Application Device

The ion irradiation type application device includes, for example, an ion flow generating section generally made of a discharge body, an electrode that controls a generated ion flow, and an opening thr releasing an ion flow.

The flow volume of ions generated in the ion flow generating section is controlled by an electric field.

With the ion irradiation type, under an atmosphere in which ion generation is possible such as in the atmosphere, a latent electrostatic image can be directly formed by irradiation of ions generated by discharge than a discharge electrode, so that an image can be directly recorded on the recording medium of the present disclosure.

As the ion irradiation type, for example, JP-3725092-B1 (JP-2003-326756-A) describes a heating discharge type in which discharge is generated by selectively heating discharge electrodes in a state where a voltage (discharge control voltage) that does not generate discharge only by being applied to the discharge electrodes but generates discharge by heating is applied.

This type includes discharge electrodes and heating elements disposed corresponding to the respective discharge electrodes, and discharge is not generated only by applying a voltage to the discharge electrodes, and discharge is generated by heating.

Therefore, ion generation can be controlled by the presence/absence of heating elements, and lower-voltage driving, cost reduction, and downsizing of the device are realized.

Specific example of the ion irradiation type application device include an ion irradiation head having the aforementioned mechanism.

The ion irradiation head contains a discharge body and optionally a heating member and other members.

Moreover, a counter electrode is provided at the position opposite to the ion irradiation head via the recording medium of the present disclosure.

Since image recording to the recording medium of the present disclosure is realized by heating and liquidizing the dispersion medium of the image recording layer, the aforementioned system, in which heating is performed during image recording, is very suitable for the present disclosure.

That is, this image recording method is capable of matching the area of the image recording layer of a rewritable recording medium to which an electric field is applied with the area of the image recording layer of a rewritable recording medium to which heat is applied.

Therefore, in this method, this irradiation device (ion head) serves as a heating device and an electric field application device, which is advantageous to reduce the cost, power consumption, and the size of a device.

Figure 17:
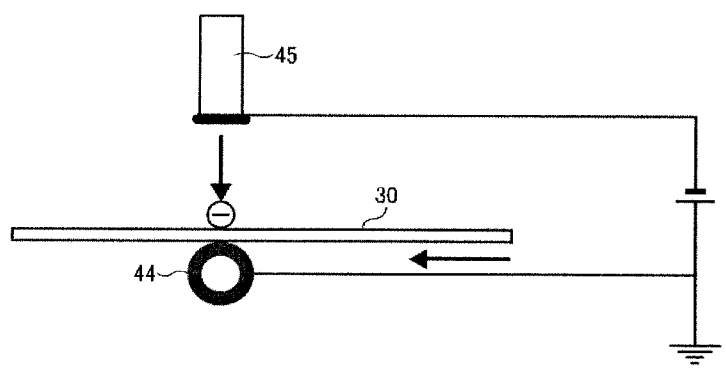
FIG. 17 is a schematic diagram illustrating another example of an electric field application device in an example of an image recording device in the image recording set according to an embodiment of the present invention.

FIG. 17 illustrates one example of the ion irradiation type image forming device.

In FIG. 17, at the position opposite to the ion irradiation head 45, a counter electrode 44 is provided to as to be in contact with the back surface of the recording medium 30. The ion irradiation head 45 is provided in contact with or adjacent to the recording surface of the recording medium 30.

Inside the ion irradiation head 45, a discharger and optionally a heating member are provided. In the case of heating discharge system, a voltage is applied to a region in which discharge is generated by heating, and ion irradiation is carried out by temperature control by using the heating member.

Ions that passed through the opening of the ion irradiation head 45 are attached to the recording medium 30 according to an electric field formed between the ion irradiation head 45 and the counter electrode 44, thereby recording an image.

Device for Forming Image by Applying Magnetic Field

Similar to the application device, the magnetic field application device is used differently in the case where a magnetic field is applied to an entire area of the image recording layer of the recording medium of the present disclosure, and in the case where a magnetic field is applied to a part of the image recording layer, depending on the image recording method.

The former is the case where an image is formed by the heating device, while applying a magnetic field to the entire area of the image recording layer, and the latter is a case where, after the entire area of the image recording layer is heated by the heating device, a magnetic field is applied to a part of the image recording layer to record an image.

The magnetic field application device to apply a magnetic field to an entire surface of the image recording layer of the recording medium is preferably a magnet, in particular, a permanent magnet such as an alnico magnet, ferrite magnet, neodymium magnet, and samarium-cobalt magnet, or electromagnet, and particularly preferably an electromagnet.

The electromagnet is formed by winding a coil around a ferromagnetic iron core with high magnetic permeability, and when a currant is supplied to the coil, due to its magnetic field, the iron core is magnetized and becomes a magnet, and when the current is cut off, the iron core returns to an unmagnetized state.

On the other hand, the magnetic field application device to apply a magnetic field to a part of the image recording layer of the recording medium is appropriately selected depending on the intended purpose without any limitation, provided that it can form a latent magnetic image, and can form an image by applying a magnetic field of the recording medium. Examples thereof include a magnetic head to be used for a magnetography magnetic printer.

Magnetic Head

The magnetic head is enabled to form a latent magnetic image when leakage magnetic flux is generated from the magnetic pole tip and portion by supplying a current to the coil of each channel.

By scanning the recording medium with the magnetic head, magnetophoretic particles of the recording medium are made migrate, and an image is recorded on the recording medium.

However, as the magnetic head, there are a multi-channel type and a full-line type, and a full-line type including aligned multichannel heads enables high-speed recording without the need of scanning of the heads.

The material of the head is preferably a soft magnetic material to be used for a high-permeability core.

The soft magnetic material is, for example, a high-permeability material with low coercivity and high saturation flux density such as Fe—Si—B—C amorphous alloy FeP, permalloy (NiFe alloy). FeCoP, CoP, FeB, FeBSi, and silicon steel.

The magnetic printer is capable of forming a latent magnetic image on a latent magnetic image bearing member by using a magnetic head, and in the present disclosure, is also capable of performing recording by bringing the recording medium according to the present disclosure into contact with the latent magnetic image bearing member on which a latent magnetic image is formed.

It is possible to use an application device and a magnetic held application device in combination, as the image forming device.

A multi-color printing can be realized by using the application device and the magnetic field application device in combination, using electrophoretic particles and magnetophoretic particles, colors of which are different, in the recording medium of the present disclosure.

Image Erasing Device and Image Erasing Step

The image erasing device is appropriately selected depending on the intended purpose without any limitation, provided that it is to apply an electric field, or a magnetic field, or a combination thereof to the recording medium of the present disclosure to erase the image recorded on the recording medium.

The image erasing step is appropriately selected depending on the intended purpose without any limitation, provided that it contains applying an electric field, or a magnetic field, or a combination thereof to the recording medium of the present disclosure to erase the image recorded on the recording medium. For example, the image erasing step can be carried out by the image erasing device.

Device for Erasing Image by Applying Electric Field

The device for erasing an image by applying an electric field is appropriately selected depending on the intended purpose without any limitation, and examples thereof include an image erasing device containing a counter electrode, and any of a charger, a discharger, an electric conductive brush, or electric conductive roller.

Specifically, the application device to apply an electric field to an entire surface of the image recording layer of the recording medium of the present disclosure, such as a corona charger, a roller charger, a solid discharger, a metal brush, and an electric conductive rubber roller, is also effectively used as the image erasing device.

Examples of the counter electrode include the counter electrode mentioned in the descriptions of the electrophotographic image forming device.

Device for Erasing Image by Applying Magnetic Field

The device for erasing an image by applying a magnetic field is appropriately selected depending on the intended purpose without any limitation. For example, the magnetic field application device to apply a magnetic field to an entire surface of the image recording layer of the recording medium of the present disclosure, such as permanent magnet, and electromagnet, is also effectively used as the image erasing device.

By scanning the rewritable recording medium or the permanent magnet in a state where the permanent magnet is brought into contact with the recording surface and/or the back surface of the recording medium, a recorded image can be totally erased.

The electromagnet is capable of controlling its magnetic force by means of turning ON/OFF of current supply, so that for example, a head including aligned electromagnets is provided, and the head is scanned with respect to the entire surface of the recording medium in a state where the current supply is turned ON, whereby totally erasing a recorded image.

Other Devices and Other Steps

Examples of the aforementioned other devices include a cooling device. Examples of the aforementioned other steps include a cooling step.

Cooling Device and Cooling Step

The cooling device is appropriately selected depending on the intended purpose without any limitation, provided that it is a device capable of cooling the image recording layer of the recording medium of the present disclosure to temperature equal to or lower than the gelation temperature thereof. Examples of the cooling device include a cooling fan, a cooling roller, and a cooling belt.

As the cooling roller and the cooling belt, for example, a water-cooling system inside of which water is circulated can be adopted.

The cooling step is appropriately selected depending on the intended purpose without any limitation, provided that it is a step containing cooling the image recording layer of the recording medium of the present disclosure to temperature equal to or lower than the gelation temperature thereof. For example, the cooling step can be carried out by the cooling device.

By the cooling device and the cooling step, the dispersion medium is turned into a gel soon after image recording, and image defects can be prevented, so that higher image quality is realized.

Note that, the image recording device of the image recording set of the present disclosure contains at least a heating device, and an application device and/or a magnetic field application device, preferably further contains an image erasing device. However, two or more devices selected from the group consisting of the heating device, the application device and/or the magnetic field application device, and the image erasing device can be combined and used as one device, which is effective in cost saving, consumption power saving, and down sizing of the device.

Specifically, it is possible to perform image formation while heating, using the heating device and the application device in combination.

For example, the ion irradiation head is provided with a heating member, or a drum heater is mounted on the image bearing member capable of forming a latent electrostatic image.

It is also possible that the image erasing device and the application device are combined so that image recording is performed subsequently to total image erasing.

For example, after totally erasing the image on the recording medium of the present disclosure by the application device, an image can be used by means of the same application device.

Similarly, it is also possible to combine the heating device, the application device and/or magnetic field application device, and the image erasing device.

For example, an image on the recording medium of the present disclosure is erased by initially outputting a solid pattern on the entire surface of the recording medium by the image bearing member equipped with a drum heater as the heating member, followed by outputting an image pattern.

As described above, as for the image recording device of the image recording set of the present disclosure, the heating device, the image erasing device, the application device and/or the magnetic field application device can be combined for use, and all combinations are included in the scope of the present disclosure.

Each of the heating device, the image erasing device, and at least one of the application device and the magnetic field application device provided may be plural in number.

In particular, by installing multiple the heating devices, the image quality may be improved.

For example, an image is stably formed in any temperature environment by maintaining the temperature of the recording medium of the present disclosure with multiple the heating devices from the time when the recording medium is passed the first heating device to the time when an image is recorded.

In the case where an image bearing member is used as the image forming device, particularly, gelation of the dispersion medium may be started when the recording medium, which has been heated by the heating device in advance, is in contact with the image bearing member, if the image bearing member serving as the image forming device is cold.

Therefore, it may be suitable to provide a drum heater serving as the heating member to the image bearing member to maintain the temperature of the recording medium high until image recording is completed.

One example of the electrophoretic image recording method using the recording medium of the present disclosure is explained with reference to FIGS. 18 and 19.

However, the present disclosure is not limited to these examples.

Figure 18:
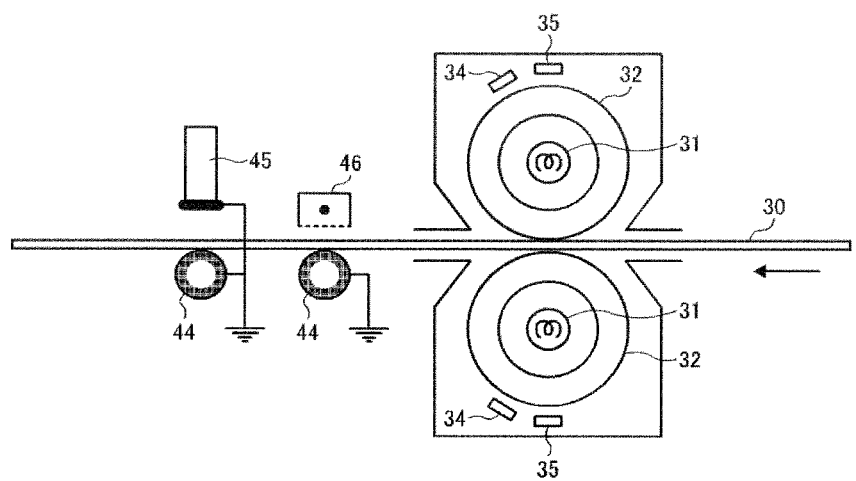
FIG. 18 is a schematic diagram illustrating an example of an image recording device in the image recording set of the present invention.

The image recording device depicted in FIG. 18 contains a heating device equipped with heating rollers 32 each containing a heat source 31 respectively provided with respect to both a recording surface and back surface of the recording medium 30 of the present disclosure, an image erasing device 46 to charge an entire recording surface of the recording medium 30 by a corona charger to erase all the recorded image, an image forming device to form an image on the recording medium 30 using an ion irradiation head 45, and a counter electrode 44, which is brought into contact with back surface of the recording medium 30 when the recorded image is all erased and an image is formed.

The heating device further contains a high speed response thermistor 34 and a thermostat 35.

Figure 19:
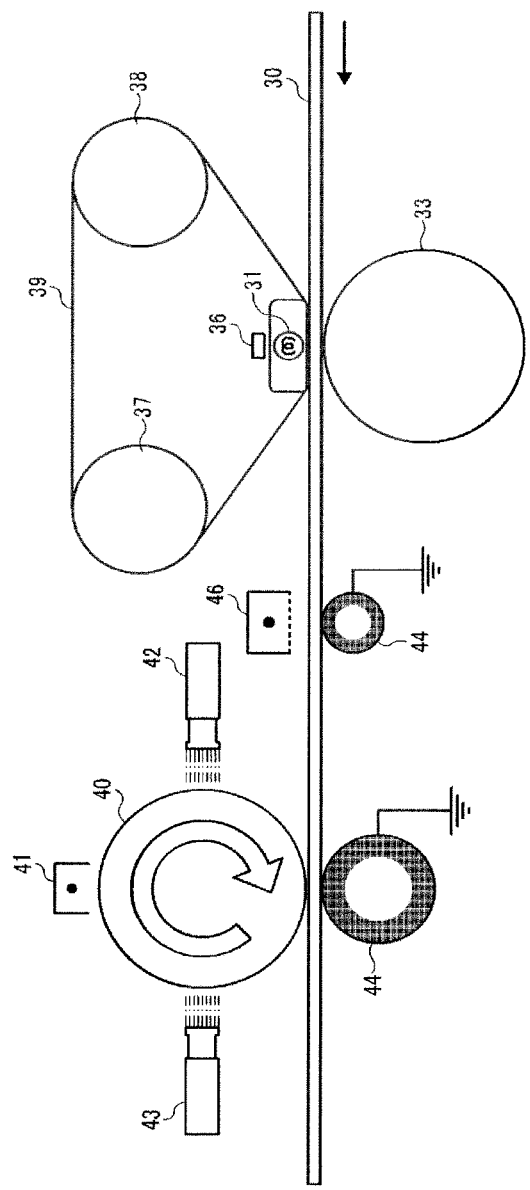
FIG. 19 is a schematic diagram illustrating another example of an image recording device in the image recording set of the present invention.

The image recording device depicted in FIG. 19 contains a heating device to heat the recording medium 30 through a belt-like form film roll 39 that is suspended around and provided in contact with a heat source 31, an image erasing device 46 to charge an entire recording surface of the recording medium 30 by means of a corona charger to erase the recorded image, an image forming device containing an image bearing member 40 to which a latent electrostatic image can be repeatedly formed by means of a charger 41, an exposing device 42, and a diselectrification device 43, and a counter electrode 44, which is brought into contact with back surface of the recording medium 30 when the recorded image is all erased and an image is formed.

In the heating device, the belt-like form film roll 39 is rotated by a roller 37, and roller 38.

Moreover, the recording medium 30 is pressed by a pressure roller 33.

Furthermore, temperature of the heat source 31 is controlled by a temperature sensor 36.

As illustrated in FIGS. 18 and 19, as the recording medium 30 is heated by the heating device, the dispersion medium contained in the recording medium is turned into a liquid by a function of the thermoreversible gelling agent contained in the dispersion medium, so that the electrophoretic particles dispersed in the dispersion medium are allowed to move.

Next, uniform voltage is applied to an entire image recording surface of the recording medium 30 by the image erasing device 46 to erase all the recorded image on the recording medium 30, so that the electrophoretic particles, which contribute to image formation, move to the opposite side of the image recording layer to the side thereof from which it is viewed.

In the case where electrophoretic particles for constituting a background of an image are contained, these electrophoretic particles are moved to the side of the image recording layer from which it is viewed.

In the case where positively charged black electrophoretic particles are contained in the dispersion medium, for example, the black electrophoretic particles are moved to the opposite side to the side thereof from which it is viewed by applying positive charge by the image erasing device 46.

In the case where negatively charged white electrophoretic particles are contained as well as the black electrophoretic particles, the black electrophoretic particles are moved to the opposite side to the side thereof from which it is viewed by applying positive charge and the white electrophoretic particles are moved to the side from which it is viewed, by applying positive charge by the image erasing device 46.

Subsequently, a latent electrostatic image corresponding to an image pattern is formed on the recording medium 30, to thereby record the image pattern on the recording medium 30.

In the case where an image forming device to form a negativity charged latent electrostatic image in an imaging area is used, for example, the positively charged black electrophoretic particles are moved to the side to be viewed, and no movement of the particles occurs in non-imaging area, so that a black image pattern is recorded on the recording medium 30.

Thereafter, once the recording medium 30 is cooled to room temperature, the dispersion medium in the recording medium 30 is turned into a state of a gel by a function of the thermoreversible gelling agent, so that the electrophoretic particles contained in the dispersion medium cannot move, and the dispersion medium turns white (e.g., turns cloudy).

As a result, the imaging area in which the black electrophoretic particles have moved to the side to be viewed is displayed in black, and other area is displayed in white, to thereby form an image.

Moreover, the formed image is stably maintained even when stimuli is externally applied over a long period, as the dispersion medium is converted into a gel.

Figure 20:
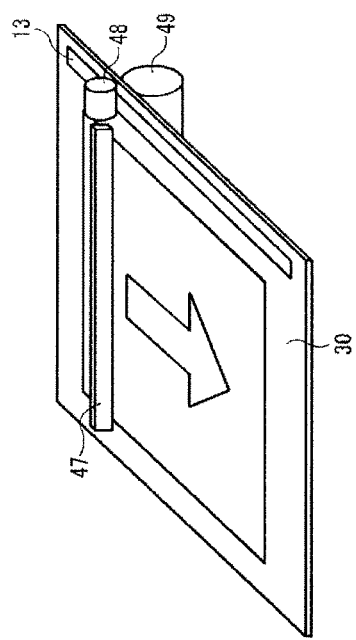
FIG. 20 is a schematic diagram illustrating another example of an image recording device in the image recording set of the present invention.
Figure 21:
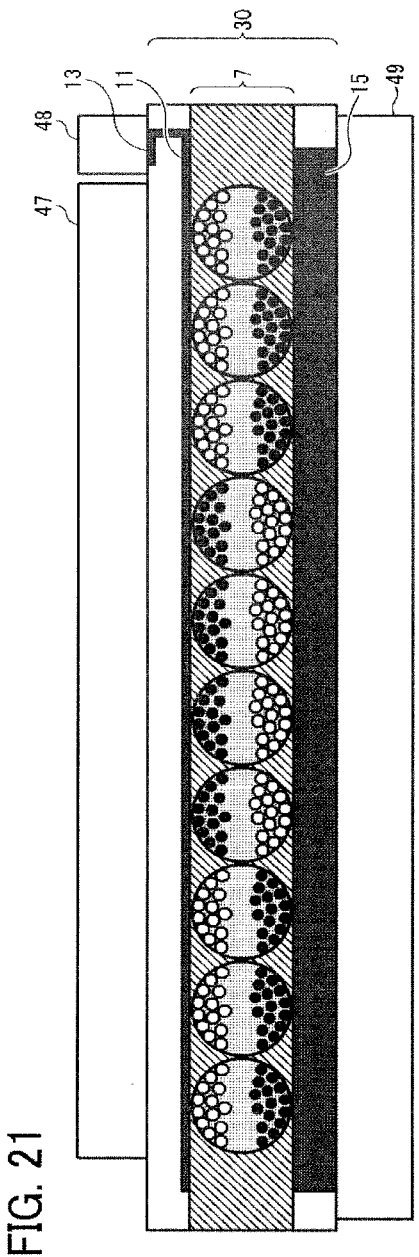
FIG. 21 is a schematic diagram illustrating another example of an image recording device in the image recording set of the present invention.

Another example of an image recording method of electrophoresis using the recording medium of the present disclosure will be exampled through FIGS. 20 and 21.

Note that the present disclosure is not limited this example.

The image recording device depicted in FIG. 20 contains a thermal head 47 serving as an image forming device to heat a certain area of the recording medium 30 of the present disclosure, an application device 48 to electrically connect with a first electrode 13 formed in an external part of the recording medium and to apply an electric field to the image recording layer in the recording medium, and an electric field application device 49 to externally connect to a second electrode 14 or an electric conductive substrate 15 (not illustrated) formed on a back surface of the recording medium, and to apply an electric field to the image recording layer in the recording medium.

FIG. 20 illustrates the state where FIG. 21 is viewed from the side, and as for the recording medium, the recording medium illustrated as one example thereof in FIG. 13 is used.

Once the recording medium 30 is set in the image recording device and is transported therein, the first electrode 13 formed in the external part of the recording medium 30 and the roller-like form application device 48 equipped with the image recording device are electrically connected to each other.

Similarly, the electrode conductive substrate 15 formed on the back surface of the recording medium 30 and the electric field application device 49 having a roller-like form provided to the image recording device are electrically connected to each other.

When an electric field is applied to the application devices 48 and 49, the electric field is applied to the entire image recording layer 7.

Note that, the first electric conductive layer 11 and the electric conductive substrate 15 are not electrically connected to each other, and they are insulated with the image recording layer 7.

Moreover, as for other structural examples of FIG. 21, there are structures illustrated in FIGS. 22 and 23.

At the same time as the electric field is applied to the entire image recording layer 7, the predetermined area of the image recording layer 7 is heated by the thermal head 47.

The area heated by the thermal head 47 is liquidized by a function of the thermoreversible gelling agent contained in the dispersion medium in the recording medium, and the electrophoretic particles therein are allowed to move by further applying an electric field to the entire area of the image recording layer 7.

When the recorded image in the entire area of the recording medium 30 is erased, the entire area of the image recording layer 7 is heated by the thermal heat 47, while applying an electric field to the entire area of the image recording layer 7, thereby liquidizing the dispersion medium. As a result, the electrophoretic particles contributing to image formation are moved to the opposite side to the side of the image recording layer from which the image recording layer is viewed, thereby erasing the entire area of the recording medium.

In a case where positively charged black electrophoretic particles are added to the dispersion medium, for example, the black electrophoretic particles are moved to the opposite side to the side to be viewed by positively charging the side of the image recording layer 7 from which it is viewed by means of the electric field application devices 48 and 49.

In a case where negatively charged white electrophoretic particles are added as well as the black electrophoretic particles, the white electrophoretic particles are moved to the side to be viewed.

As a result, the entire surface turned into white so that a state where an image is erased can be created.

When an image pattern is recorded on the recording medium 30, the predetermined area of the image recording layer 7 is heated by the thermal head 47 to liquidize only the dispersion medium present in the heated area, while an electric field is applied to the entire image recording layer 7, so that the electrophoretic particles contributing to image formation are moved to the side of the image recording layer 7 than which the image recording layer 7 is viewed.

In a case where negatively charged white electrophoretic particles are contained as well as the black electrophoretic particles, the white electrophoretic particles are moved to the opposite side to the side from which it is viewed.

As a result, the predetermined image pattern can be recorded.

In the case where positively charged electrophoretic particles are contained in the dispersion medium, for example, from the initial state that the entire area of the image recording layer 7 is in white, the black electrophoretic particles are moved to the side from which the image recording layer 7 by negatively charging the side it the image recording layer 7 from which it is viewed by means of the electric field application devices 48 and 49.

In a case where negatively charged white electrophoretic particles are contained as well as the black electrophoretic particles, moreover, the white electrophoretic particles are moved to the opposite side to the side to be viewed.

As a result, the predetermined black image pattern with the white background can be recorded.

When the recording medium, to which recording or erasing has been performed in the aforementioned manner, is cooled, the dispersion medium in the recording medium 30 is turned into a state of a gel by a function of the thermoreversible gelling agent so that the electrophoretic particles contained the dispersion medium cannot move. Therefore, an image on the recording medium is stably maintained, even when the recording medium is stored over a long period, or stimuli is externally applied thereto.

The aforementioned image recording device using the thermal head 47 has a very simple structure, and therefore it is very effective in downsizing, reducing the weight thereof cost waving, and powder saving.

Moreover, the recording medium having an electrode at the exterior thereof or electric conductive substrate, which is used for the aforementioned image recording device, is as thin as paper, and an electric field is directly applied to the image recording layer thereof, while maintaining flexibility. Therefore, it is possible to record a high contrast image thereon with low driving voltage, and this recording medium is particularly useful in the present disclosure.

The image recording set is very useful as a portable rewritable printer.

The image recording set of the present disclosure contains the aforementioned recording medium, and an image recording device equipped with a heating device to heat the recording medium, and an electric field and/or magnetic field application device to apply an electric field and/or magnetic field to the recording medium.

The image recording set of the present disclosure include, not only an embodiment where a recording medium and an image recording device, which are separately existed, are used as a set, but also an embodiment where a recording medium and an image recording device are integrated.

Figure 24:
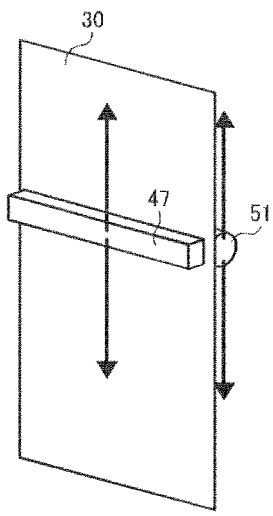
FIG. 24 is a diagram illustrating an example of an image recording set where a recording medium and an image recording device are integrated together.
Figure 25:
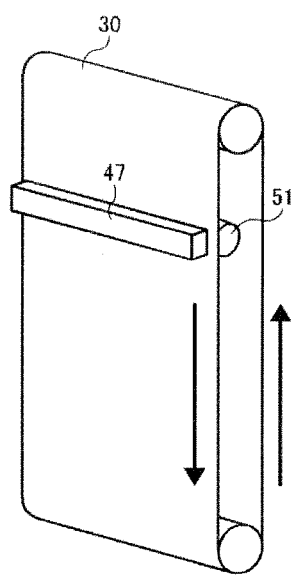
FIG. 25 is a diagram illustrating another example of an image recording set where a recording medium and an image recording device are integrated together.

Examples of the integrated image recording set will be illustrated in FIGS. 24 and 25. FIG. 24 is the image recording set of the present disclosure, equipped with a heating device 47 to perform recording and erasing of an image on the recording medium 30, and an electric field and/or magnetic field application device 51, which are integratedly mounted with the record/medium 30 of the present disclosure.

Moreover, the image recording set contains other devices, such as an image erasing device, and a cooling device.

In the image recording set depicted in FIG. 24, the recording medium 30 is fixed, and an image can be recorded on and erased from the recording medium 30, by moving the heating device 47, and the electric field and/or magnetic field application devices 51, which had been integrated with the recording medium 30, over an external surface of the recording medium 30.

Moreover, another example, which is different from FIG. 24, is depicted in FIG. 25, FIG. 25 is a diagram illustrating the image recording set of the present disclosure equipped with a heating device 47 to record and erase an image on the recording medium 30, and an electric field and/or magnetic field application device 51, which are integratedly mounted with the recording medium 30 of the present disclosure.

Moreover, the image recording set may further contain other devices, such as an image erasing device, and a cooling device.

In the image recording set depicted in FIG. 25, the heating device 47 and the electric field and/or magnetic field application devices 31 are fixed, and an image can be recorded on and erased from the recording medium 30 by moving the recording medium 30 while in contact with the heating device 47 and the electric field and/or magnetic field application devices 51.

In place of the recording medium 30 in FIGS. 24 and 25, a flexible, sheet screen can be used, to which the recording medium 30 is attached.

To secure electric connection between the electrode or the electroconductive substrate provided on the recording medium 30 and the electric field application device 51, for example, electroconductive areas are formed on a part of the entire of the screen.

Figure 26:
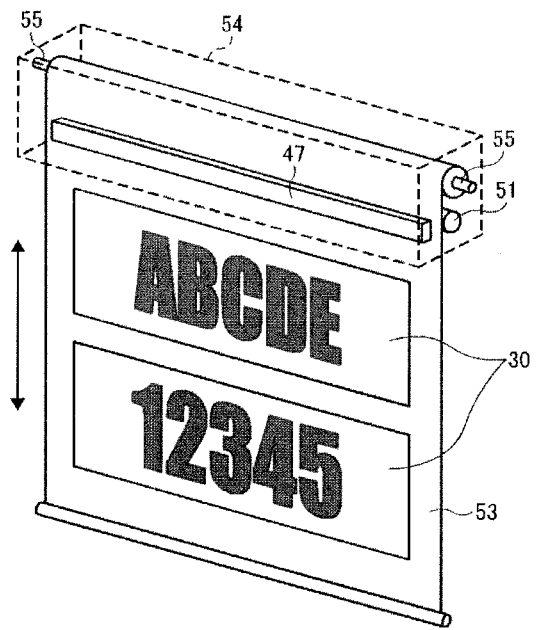
FIG. 26 is a diagram illustrating another example of an image recording set where a recording medium and an image recording device are integrated together.

Furthermore, the image recording set of the present disclosure having a roll screen as illustrated in FIG. 26 is very suitable.

The image recording set of FIG. 26 is a roll screen type having a flexible sheet-like form screen 53 and a drive unit 55 to roll up or release the screen 53 in addition to the recording medium 30, the heating device 47, and the electric field and/or magnetic field application devices 51 and 52. The recording medium 30 is provided on the screen 53.

In addition, the image recording set optionally has a container 54 to accommodate the screen 53, the recording medium 30, the heating device 47, the electric field and/or magnetic field application devices 31 and 52, etc.

Figure 27:
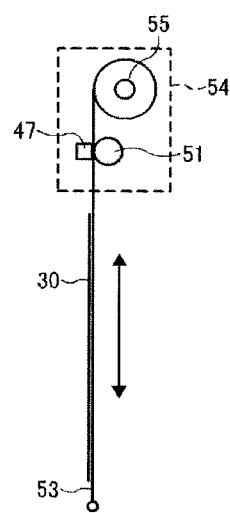
FIG. 27 is a diagram illustrating another example of an image recording set where a recording medium and an image recording device are integrated together.

FIG. 27 is a diagram illustrating a side view of FIG. 26.

Rolling up a screen means that a screen having a sheet-like form is rolled up. Releasing a screen means reversing rolling up, meaning that a screen having a roll-like form is released to have a sheet-like form.

In addition, the screen 53 to which the recording medium 30 is provided is formed by attaching the recording medium 30 to the screen 53. Alternatively, both are integrated.

The image recording set to which the recording medium 30 is provided records or erases an image in the recording medium 30 by using the heating device and the electric field and/or magnetic field application device in the step of rolling up or releasing the screen 53 to which the recording medium 30 is provided.

Images can be recorded and erased in the step of rolling up or releasing the screen or separately.

For example, when the screen 53 to which the recording medium 30 is provided, accommodated in the container 54, is released and pulled out therefrom, it is possible to record an image on the recording medium 30 provided to the screen 53 by the heating device 47 and the electric field and/or magnetic field application devices 51 and 52.

To the contrary, when the screen 53 pulled out from the container 54 is pulled thereinto, the recorded image on the recording medium 30 provided to the screen 53 can be erased by the heating device 47 and the electric field and/or magnetic field application devices 51 and 52.

In addition, it is possible to record or erase an image in the medium 30 provided to the screen 53 when the screen 53 is rolled up. Also it is possible when the screen 53 is released.

Furthermore, it is possible to record an image while the screen 53 to which the recording medium 30 is provided is released, thereafter, roll up the screen 53 without erasing the image, and overwrite the image when the screen 53 is released again.

The image recording set, as illustrated in FIGS. 26 and 27, records and erases image by the heating device 47 and the electric field and/or magnetic field application devices 51 and 52. It is also possible to provide the heating devices 47 for recording and erasing separately and the electric field and/or magnetic field application devices 51 and 52, which is suitable in terms of improvement of contrast and suppressing residual images.

In addition, not only a sheet but also multiple sheets of the recording media 30 can be provided on the screen 53 as illustrated in FIG. 26.

For example, by multiple sheets of the recording, media 30 having different colors multiple color images can be demonstrated if a sheet of the recording medium 30 represents only two colors.

Furthermore, the image recording device preferably has the drive unit 55 which employs an electric system in order to conduct rolling up and releasing the screen 53 at a constant speed.

Additionally, it is possible and suitable to provide a screen holding member to hold the screen 53.

It is preferable that the screen holding member expands and contracts to the movement of the screen 53.

Figure 28:
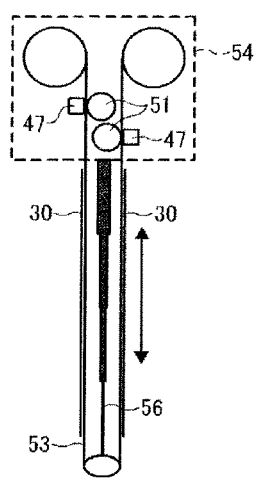
FIG. 28 is a diagram illustrating another example of an image recording set where a recording medium and an image recording device are integrated together.

FIG. 28 is a diagram illustrating an example of an image recording set having two screens, each having the recording medium 30 to write and erase images.

In this case, it is possible to record different images on the recording medium 30.

If the screen holding member 56 is provided to hold the screen 53, it is possible to suppress curling or twisting of the screen 53.

There are following merits (1) to (5) of the roll type image recording set of the present disclosure:
(1): The recording medium is thin, light-weight, and flexible, so that the provided screen can be accommodated in the container, thereby improving the portability of the set.

Conventional signages or signboards are not flexible, which requires extensive installation work for a large signage or signboard;
(2): Since the freedom of the installation of such a set is high, it is possible to set it on a ceiling or a window pane.

For example, if it is set on a window pane, in addition to light-shielding, image can be displayed thereon;
(3): Images in the recording medium is overwritable, which obviates the need of work such as printing, replacement, or removal of a screen. In addition, it is repeatedly usable, thereby being free from the problem of waste of the screen and ink.

As a result, it is effective to reduce the cost;
(4): Since there is no need to provide a pixel electrode or thin film transistor (TFT) substrate, the production cost is reduced, which is advantageous to size increase.

Moreover, such a set is tough, so that a long working life is expected; and
(5): Such a set employs a reflection type display system and retains images very good once recording is conducted, so that visibility of the images is high and the electricity to display an image is unnecessary.

The image recording set is applicable to fields of still images for signboards, advertisement, annunciators, etc.

Having, generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited to Examples.

Example 1

Manufacturing of Black Electrophoretic Particles

In 180 parts of toluene, 14 parts of methacryloxypropyl-modified silicone (SILAPLANE FM-0711 manufactured by Chisso Corporation), 1 part of dimethylaminoethyl methacrylate (manufactured by Tokyo Chemical Industry Co., Ltd.), and 0.1 parts of azobis dimethylvaleronitrile serving as a polymerization initiator were dissolved, and the resulting solution was heated for 6 hours at 60° C. in a nitrogen atmosphere.

After the reaction completed, the toluene was removed by vaporization to obtain a dispersing agent.

Next, in a reaction vessel equipped with a stirrer, a thermometer, and a reflux condenser, 1 part of the dispersing agent, 1.5 parts of carbon black, and 200 parts of silicone oil were mixed, and irradiated with ultrasonic waves for 1 hour by a homogenizer while being cooled with ice, thereby dispersing the carbon black.

To the resultant, 6 parts of methyl methacrylate, 3 parts of methacryloxypropyl-modified silicone (SILAPLANE FM-0725, manufactured by Chisso Corporation, molecular weight: about 10,000), 0.1 pairs of N,N-dimethylaminopropylacryl amide, and 0.05 pairs of azobis dimethylvaleronitrile serving as a polymerization initiator were added, and the resulting mixture was allowed to react for 6 hours at 60° C.

After the reaction completed, only a solid component was collected, and dried, to thereby obtain the intended black electrophoretic particles (average particle diameter: 300 nm).

Production of White Electrophoretic Particles

A reaction vessel equipped with a stirrer and a temperature control device was charged with a solvent, which had been prepared by mixing 93 parts of ethanol and 7 parts of water, and the solvent was adjusted to pH 4.5 with glacial acetic acid.

To this, 16 parts of 3-(trimethoxysilyl)propyl methacrylate was added and dissolved, followed by adding 100 parts of titanium oxide. The resulting mixture was stirred for 10 minutes.

Subsequently, 180 parts of ethanol was added, and stirred. A solid content collected from the mixture by centrifugal separation was left to stand for 24 hours, followed by vacuum drying for 4 hours at 70° C., to thereby obtain surface-treated titanium oxide.

Next, a reaction vessel equipped with a stirrer, a thermometer, and a reflux condenser was charged with 70 parts of toluene, and 50 parts of laurel methacrylate, and the lauryl methacrylate was dissolved therein.

To the resulting solution, 40 parts of the surface-treated titanium oxide, and 25 parts of toluene to which 0.3 parts of azobis isobutyronitrile had been dissolved were added, and the resulting mixture was heated and stirred for 7 hours at 70° C. under nitrogen atmosphere.

After the reaction ended, the solid component was separated and refined by repeatedly performing centrifugal separation and washing with toluene, and the resultant was finally vacuum dried for 4 hours a 70° C., to thereby obtain the intended white electrophoretic particles (average particle diameter: 400 nm).

Preparation of Liquid Dispersion for Forming Image Recording Layer

To 5.7 parts of an isoparaffin-based hydrocarbon solvent (Isopar G, manufactured by ExxonMobil Chemical, initial boiling point: 166° C.) serving as a dispersion medium, 0.2 parts of the black electrophoretic particles, 4.0 parts of the white electrophoretic particles, 0.05 parts of a dispersing agent (Solsperse 17000, manufactured by The Lubrizol Corporation), and 0.05 parts of a surfactant (sorbitan trioleate, SPAN85) were added, and the mixture was dispersed by applying ultrasonic waves, to thereby prepare a particle liquid dispersion.

Next, to the particle liquid dispersion, 0.3 parts of the thermoreversible gelling agent represented by the following Chemical formula A1 was added, and the resulting mixture was heated and dissolved at the temperature higher than the solation temperature of the added thermoreversible gelling agent by 10° C. with stirring, to thereby prepare a liquid dispersion for forming an image recording layer.

Note that, the sol-gel transition temperature of the thermoreversible gelling agent was measured by adding the thermoreversible gelling, agent to the isoparaffin-based hydrocarbon solvent serving as a dispersion medium, heating the mixture to melt and stir, followed by cooling to obtain 5% gel, and measuring the gel by differential scanning calorimetry (DSC).

The measurement of DSC was performed with a cycle containing heating at the rate of 2° C./min and cording at the rate of 2° C./min.

As a result, the endothermic peak temperature during the heating was 50.8° C., the exothermic peak temperature during the cooling was 40.8° C.

In the present disclosure, the endothermic peak temperature obtained by the DSC measurement is determined as solation temperature, and the exothermic peak temperature obtained by the DSC measurement is determined as gelation temperature.

Moreover, a measurement of dynamic viscoelasticity (DMA) was also performed.

The measurement was performed with a cycle containing cooling at the rate of 1° C./min and heating at the rate of 2° C./min.

It was confirmed from the result thereof that the solation temperature and the gelation temperature were substantially the same to the result of the DSC.

Formation of Image Recording Layer Using Microcapsules

Gelatine was added to water, and the resulting mixture was heated to 40° C. and stirred for 30 minutes, thereby obtaining 100 parts of a 2.5% gelatine aqueous solution.

Next, the temperature of the gelatine aqueous solution was raised to the temperature 10° C. higher than the solation temperature of the thermoreversible gelling agent added in the liquid dispersion for forming an image recording layer. To this, 15 parts of the liquid dispersion for forming an image recording layer, which had been heated to the temperature higher than the solation temperature of the added thermoreversible gelling agent by 10° C., was gently added form a liquid surface of the gelatin aqueous solution, with stirring.

Next, 25 parts of a 5% Arabian gum aqueous solution was added thereto, and a resulting mixture was continuously stirred for 30 minutes.

Thereafter, to the aqueous solution, a 10% acetic acid aqueous solution was added dropwise until pH became 3.5, and the mixture was continuously stirred for 30 minutes.

Next, the temperature of the resultant was set to 5° C., and the temperature was maintained the same for 60 minutes. To this, 1.2 parts of a 25% glutaraldehyde aqueous solution was slowly added dropwise, and the mixture was continuously stirred for 30 minutes.

Next, a 10% sodium hydroxide aqueous solution was slowly added dropwise until pH became 9.0, and the mixture was continuously stirred for 30 minutes.

Thereafter, the temperature of the resultant was raised to 40° C., and the resultant was stirred for 120 minutes, followed by cooling to room temperature and stirred for 24 hours.

Finally, the resulting capsule slurry was repeatedly washed until pH of washing water became 5.0, followed by carrying out classification using a sieve, to thereby obtain microcapsule slurry.

Manufacturing of Rewritable Recording Medium Using Microcapsules

After a hydrosoluble urethane resin liquid was added to the thus-obtained microcapsule slurry as a binder resin followed by stirring, the resultant was applied to a polyester substrate having a thickness of 50 μm, which was a first substrate to be viewed.

The resultant was dried at 70° C. for 30 minutes to form an image recording layer having a thickness of about 40 μm, which was formed of microcapsules and binder resins with insulation property.

Next, electroconductive resin materials (Dotite, D-550, Fujikura Kasci Co., Ltd.) in which the second substrate liquid application contained silver fillers having electroconductivity Chemical formula A1

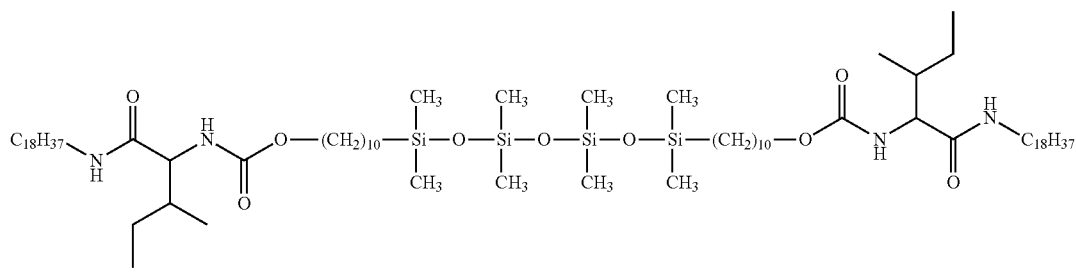

and thermal conductivity were applied by a blade to the image recording layer. The resultant was dried at 80° C. for 30 minutes to form a silver white second substrate having a thickness of about 30 μm, thereby forming a rewritable recording medium.

Example 2

A rewritable recording medium was manufactured by forming a brown second substrate having a thickness of about 30 μm in the same manner as in Example 1 except that the liquid application of the second substrate in Example 1 was changed to an electromagnetic shield paint (Ele-Earth EMI51ac, manufactured by EDOGAWA GOSEI CO., LTD.) that contained silver fillers and copper fillers having electroconductivity and heat conductivity.

Example 3

A rewritable recording medium was manufactured by forming a gray second substrate having a thickness of about 30 μm in the same manner as in Example 1 except that an electroconductive resin adhesive (TB351C, manufactured by ThreeBond Holdings Co., Ltd.) containing nickel fillers having electroconductivity and heat conductivity were used and the thermocuring conditions were changed to 90° C. for 60 minutes.

Example 4

A rewritable recording medium was manufactured by forming a black second substrate having a thickness of about 20 μm in the same manner as in Example 1 except that the liquid application of the second substrate in Example 1 was changed to a carbon paste in which a thermocuring resin contained carbon fillers having electroconductivity and heat conductivity and the thermocuring conditions were changed to 150° C. for 30 minutes.

Example 5

50 pasts of Lewis acid reaction type ultraviolet curing type epoxy resin main agent (AD7200, manufactured by ADEKA CORPORATION) and 1.5 parts of Lewis acid salt curing catalyst (PP33, manufactured by ADEKA CORPORATION) were mixed and dissolved.

Thereafter, silver fillers (SILCOAT AgC-2011, manufactured by FUKUDA METAL FOIL & POWDER Co., LTD.; average primary particle diameter: about 1.8 μm; aspect ratio: 3 to 6) having electroconductivity and heat conductivity and electroconductive white titanium oxide filler (ET-500W, manufactured by ISHIHAR ASANGYO KAISHA Ltd.; ET-500W, average primary particle diameter: about 0.25 μm) which were coated with an electroconductive layer of antimony—doped tin oxide were added followed by kneading by three-roll to manufacture white liquid application of second substrate.

This liquid application of second substrate was applied to the image recording layer formed on the first substrate formed in the same manner as in Example 1. After being exposed to ultraviolet ray for curing, the resultant was dried at 100° C. for 30 minutes to form a second substrate having a thickness of about 30 μm, thereby forming a rewritable recording medium.

Example 6

60 parts of methacrylic-based monomer liquid mixture (Syrup B, manufactured by Soken Chemical Engineering Co., Ltd.), 0.2 parts of optical polymerization initiator (IRGACURE 369, manufactured by Ciba Specially Chemicals Corporation), and 20 parts of boron nitride (UHP-S1, manufactured by Showa Denko K.K.; average particle diameter: 1 μm to 2 μm) were mixed and stirred.

Furthermore, 40 parts of silver fillers (SILCOAT AgC-2011, manufactured by FUKUDA METAL FOIL & POWDER Co., LTD.; average primary particle diameter: about 1.8 μm; aspect ratio: 3 to 6) having electroconductivity and heat conductivity were added followed by stirring to prepare a liquid application of second substrate.

This liquid application of second substrate was applied by a blade to the image recording layer formed on the first substrate of Example 1. After being exposed to ultraviolet ray for curing, the resultant was dried at 80° C. for 30 minutes to form a white second substrate haring a thickness of about 30 μm, thereby forming a rewritable recording medium.

Comparative Example 1

An ultraviolet curing type resin (Photolec. A-784, manufactured by SEKISUI CHEMICAL CO., LTD.) free from fillers, which was used as a liquid application of second substrate, was applied by a blade to the image recording layer formed on the first substrate at Example 1. After being exposed to ultraviolet ray for curing, the resultant was dried at 80° C. for 30 minutes to form a transparent second substrate having a thickness of about 40 μm, thereby forming a rewritable recording medium.

Comparative Example 2

A rewritable recording medium was manufactured in the same manner as in Comparative Example 1 except that a polyester substrate having a thickness of about 50 μm was used as the liquid application of second substrate and an ultraviolet curing type resin (Photolec A-784, manufactured by SEKISUI CHEMICAL CO., LTD.) free from fillers was used as the first substrate.

Comparative Example 3

A thermocuring resin was applied by a blade to the image recording layer formed on the first substrate formed on the first substrate of Example 1 in such a manner that the thickness from the substrate was 45 μm. A PET film having a thickness of 50 μm was attached thereto in order not to let air in and thereafter pressed by a roller to be flat. The resultant was dried at 80° C. for 30 minutes for curing to manufacture a rewritable recording medium.

Example 7

Liquid of hydrosoluble urethane resin was added as a binder resin to the microcapsule slurry obtained in Example 1 followed by stirring. Thereafter, the resultant was applied by a blade to a graphite sheet serving as a second substrate having electroconductivity and heat conductivity, which formed the rear side. The resultant was dried at 70° C. for 30 minutes to form an image recording layer having a thickness of about 40 μm formed of microcapsules and the binder resin.

Thereafter, as the liquid application of the first substrate, ultraviolet curing type resin (Photolec A-784, manufactured by SEKISUI CHEMICAL CO., LTD.) to which silicone resin particulates (TOSPEARL® 120, manufactured by Momentive Performance Materials Inc.: average particular diameter: 2.0 μm) were added was used, which was applied by a blade to the image recording layer formed on the second substrate followed by irradiation of ultraviolet ray for curing and thereafter being heated at 80° C. for 30 minutes to form a transparent first substrate having a thickness of about 30 μm, thereby manufacturing a rewritable recording medium.

Example 8

Another rewritable recording medium was manufactured in the same manner as in Example 7 except that, as the liquid application of first substrate, the thermocuring specially-modified acrylic resin (manufactured by Harima Chemicals Group, Inc.) having finger print resistance to which silicon resin particulate (TOSPEARL® 120, manufactured by Momentive Performance Materials Inc.: average particular diameter: 2.0 μm) were added was used, which was applied by a blade to the image recording layer formed on the second substrate followed by heating at 80° C. for 30 minutes for curing to form a transparent first substrate having a thickness of about 30 μm.

Example 9

25 parts of methylmethacrylate, 15 parts of methacrylic acid-2-hydroxyethyl, 5 parts of n-stearylmethacyate having lubricity, and 150 parts of methylethyl ketone were stirred and mixing. Subsequent to addition of 0.4 parts of a polymerization initiator (V-601, manufactured by Wako Pure Chemical Industries, Ltd.), the resultant was heated to 70° C. in a nitrogen atmosphere followed by heating for reflux for 8 hours and cooling down to room temperature to obtain a resin. Next, 8 parts of this resin, 14 parts of acrylic monomer (A-9530, manufactured by Shin-Nakamura Chemical Co., Ltd.), 4 parts of acrylic monomer (A-TMM-3LM-N, manufactured by Shin-Nakamura Chemical Co, Ltd.), 1 part of an optical polymerization initiator (IRGACURE® 184), and 80 parts of methylethyl ketone were mixed and stirred to prepare a liquid application of first substrate.

This liquid application of first substrate was applied by a blade to the image recording layer formed on the second substrate of Example 7 followed by drying by heating at 80° C. for five minutes. The resultant was exposed to ultraviolet ray for curing to form a transparent first substrate having a thickness of about 15 μm, thereby forming a rewritable recording medium.

Example 10

A rewritable recording medium was manufactured in the same manner as in Example 1 except that the thermoreversible gelling agent to be encapsulated in microcapsules was changed to a thermoreversible gelling agent represented by the following Chemical formula B. When the sol-gel transfer temperature of the thermoreversible gelling agent represented by the following chemical formula B was measured, the endothermic peak during temperature rising was 46.0° C. and the heat generating peak temperature during temperature falling was 30.1° C.

Chemical formula B

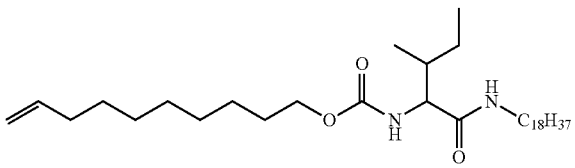

Example 11

A rewritable recording medium was manufactured in the same manner as in Example 1 except that the thermoreversible gelling anent to be encapsulated in microcapsules was changed to a thermoreversible gelling agent represented by the following chemical formula C. When the sol-gel transfer temperature of the thermoreversible gelling agent represented by the following chemical formula C was measured, the endothermic peak during temperature rising was 44.2° C. and the heat generating peak temperature during temperature falling was 25.5° C.

Chemical formula C

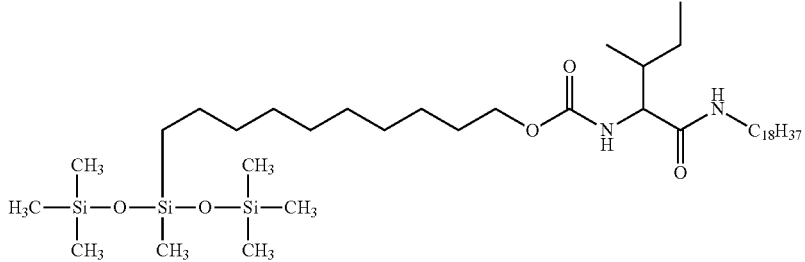

Example 12

0.5 parts of oil-soluble black dye (OIL BLACK HBB, manufactured by Exon Chemical Co., Ltd.) and 0.5 parts of non-ionic surfactant (Sorbitane monolaurate: Span 20, reagent) were dissolved in 74 parts of an isoparaffin-based hydrocarbon solvent (IsoparG, manufactured by Exon Chemical Co., Ltd.) serving as a dispersion medium). Thereafter, 20 parts of white electrophoretic migrating particles manufactured in Example 1 was added followed by ultrasonic dispersion for 120 minutes. 5 parts of the thermoreversible gelling agent of the chemical formula A1 was added to the thus-obtained liquid dispersion followed by dissolving by stirring and heating at a temperature 10° C. higher than the solation temperature of the thermoreversible gelling agent to form a liquid dispersion of image recording layer.

This liquid dispersion of image recording layer was used to obtain microcapsule slurry in the same manner as in Example 1. Furthermore, a rewritable recording medium was manufactured in the same manner as in Example 1 except that the thus-obtained microcapsule slurry was used.

Example 13

Manufacturing of Rewritable Recording Medium Using Cell

A curable epoxy resin was applied to a graphite sheet serving as a second substrate having electroconductivity and heat conductivity, thereby forming the rear side. After semi-cured state was achieved, the epoxy resin was subject to embossing treatment to form a cell aggregation having a honeycomb-like form in which hexagonal concave portions having a diagonal of about 150 µm at maximum were arranged in matrix. The cell aggregation was exposed to ultraviolet to cure the epoxy resin to form a cell aggregation having a honeycomb like form with a thickness of 60 µm. Around the cell aggregation as attached a thermocuring double-sided adhesive film having a frame-like form. The second substrate on which this cell aggregation was formed was set on a hot plate and heated to a temperature 10° C. higher than the sol-gel transfer temperature of the added thermoreversible gelling agent. The liquid application of image recording layer manufactured in Example 1, which was preliminarily heated to a temperature 10° C. higher than the sol-gel transfer temperature of the added thermoreversible gelling agent, was infused into the cell followed by quick squeeging so that the cell was filled. Thereafter, the resultant was cooled down and when gelation started, the polyester film having a thickness of 50 µm, which served as first substrate, was attached from above using a roller to prevent air from entering. Furthermore, the rim of the cell was sealed by a thermocuring resin. Thereafter, the thermocuring resin was cured by heating to manufacture a rewritable recording medium.

Comparative Example 4

A rewritable recording medium was manufactured in the same manner as in Example 1 except that the thermoreversible gelling agent was not added.

Comparative Example 5

A rewritable recording medium was manufactured in the same manner as in Example 12 except that the thermoreversible gelling agent was not added.

Comparative Example 6

100 parts of wax (product name: Nissan Electol WE-40, manufactured by NOF CORPORATION), 1 part of black dye (product name: OILBLACK HBB, manufactured by Orient Chemical Industries Co., Ltd.), 5 parts of titanium oxide (product name: JR-603, manufactured by TAYCA CORPORATION), and 0.5 parts of surfactant (tertiary ammonium salt ethylsulfate: SAT-60, manufactured by Toagosei Company, Limited.) were placed in a polyethylene and thereafter zirconia beads having a diameter of 1 mm were placed therein. This was left in a constant temperature bath set at 120° C. for 30 minutes. Thereafter, the resultant was quickly moved to a stirrer followed by stirring for 15 minutes. This operation was repeated twice. Moreover, after being left at 120° C. for 30 minutes and taken out the resultant was filtered by a mesh to obtain a liquid dispersion of image recording layer.

A rewritable recording medium was manufactured in the same manner as in Example 1 except that this liquid dispersion of image recording layer was used.

Evaluation by Using Image Recording Device

The recording media of Examples 1 to 13 and Comparative Examples 1 to 6 were evaluated using an image recording device. The image recording device was designed to transfer a recording medium in a straight line. A charging device using a corotoron to apply an electric field to a recording medium, a heating device using a thermal head to heat the recording medium, and a cooling device using a brass roller were mounted onto the image recording device in this sequence. The heating device was set in order that the surface temperature of the recording medium was not lower than the sol-gel transfer temperature of the thermoreversible gelling agent contained therein.

The recording medium was set in the image recording device. First, the entire surface of the recording medium was positively charged by the charging device. Thereafter, the entire surface of the recording medium was heated to a temperature higher than the solation temperature of the dispersion medium by the heating device to liquidize the dispersion medium. Thereafter, the entire surface of the recording medium was cooled down to the gelation temperature of the dispersion medium or lower by the cooling device. The application voltage of the charger was set to 4 kV. As a result, in the recording medium, the white particles migrated to the surface side while the black particles migrated to the rear side to record a white solid image on the entire of the recording medium, meaning that the image was erased. The recording medium was set again in the image recording device. The entire surface of the recording medium was negatively charged by the charging device.

Thereafter, a checker pattern was input into the heating device and the entire surface of the recording medium was heated in the checker pattern to a temperature higher than the solation temperature of the dispersion medium by the heating device to liquidize the dispersion medium. Thereafter, the entire surface of the recording medium was cooled down to the gelation temperature of the dispersion medium or lower by the cooling device. The application voltage of the charger was set to −4 kV.

In the recording medium, the white portion of the checker pattern remained unchanged and the black particles migrated to the black portion of the surface side to record the checker pattern of black and white.

Example 14

Recording and erasing images on the recording medium of Example 11 were operated using the following image recording device.

Evaluation by Using Image Recording Device

A remodeled image recording device employing electrophotography was used as the image recording device. A single-layered photoreceptor containing a charge generating materials, hole carrier materials, and electron carrier materials that can be charged positively or negatively was used as the photoreceptor of the image recording device. In addition, the heating device using a heater having a sheet-like form was mounted in the drum of the photoreceptor to apply heat and an electric field simultaneously by bringing the photoreceptor into contact with the entire surface of the recording medium. Moreover, a cooling device using a brass roller was provided next.

The heating device was set in order that the surface temperature of the recording medium was not lower than the solation temperature of the dispersion medium of the thermoreversible gelling agent contained therein. To the photoreceptor, there are provided a scrotoron to charge the photoreceptor, an irradiator to form a latent electrostatic image thereon, and a discharging device to erase the latent electrostatic image in this sequence. In addition, a counter electrode having a roller-like form was arranged at a position facing the photoreceptor with the recording medium therebetween.

The recording medium was set in the image recording device and heated by the heating device to a temperature higher than the solation temperature of the dispersion medium to liquidize the dispersion medium. Thereafter, the entire surface of the recording medium was positively charged and cooled down to the gelation temperature of the dispersion medium or lower by the cooling device. As a result, in the recording medium, the white particles migrated to the surface side while the black particles migrated to the rear side to record a white solid image on the entire of the recording medium, meaning that the image was erased.

Next, the recording medium was set in the image recording device and heated by the heating device to a temperature higher than the solation temperature of the dispersion medium to liquidize the dispersion medium. At the same time, a latent electrostatic image of a checker pattern was formed on the charging device by negative charging. Keeping this state, the charging device was brought into contact with the recording medium. Thereafter, the entire surface of the image recording area was cooled down to the gelation temperature of the dispersion medium or lower by the cooling device. In the recording medium, the white portion of the checker pattern remained unchanged and the black particles migrated to the black portion of the surface side to record the checker pattern of black and white.

Example 15

Black ferrite particles having a surface treated with silicone oil serving as magnetophoretic particles were mixed with isoparaffin-based hydrocarbon solvent (Isopar G, manufactured by Exon Chemical Co., Ltd.) followed by ultrasonic dispersion. To the thus-obtained liquid dispersion, no-migrating polyvinylnaphthalene particles as the white particles were added and stirred followed by ultrasonic dispersion. Furthermore, a thermoreversible gelling agent was added in the same manner as in Example 1 and heated to the solation temperature of the thermoreversible gelation agent followed by stirring to prepare a liquid dispersion of image recording layer.

Using the thus-obtained liquid dispersion, a microcapsule slurry was prepared in the same manner as in Example 1 to manufacture a rewritable recording medium in the same manner as in Example 1.

Evaluation by Using Image Recording Device

The remodeled image recording device of Example 1 was used as the image recording device. An electric magnet was arranged as magnetic field application device (magnetic head) on the downstream of the heating device. The recording medium was set in the image recording device and the entire surface of the image recording area was heated by the heating device to a temperature higher than the solation temperature of the dispersion medium to liquidize the dispersion medium. At the same time, the magnetic field application device applied a magnetic field to the black particles with polarity to repel them.

Thereafter, the entire surface of the image recording area was cooled down to the gelation temperature of the dispersion medium or lower by the cooling device. As a result, in the recording medium, the black particles migrated to the rear side to record a white solid image on the entire of the recording medium, meaning that the image was erased. Next, when the recording medium was set again in the image recording device, a checker pattern was input into the heating device, and a magnetic field having the reverse polarity was applied to the magnetic field application device, only the dispersion medium located in the heated area was liquidized. At the same time, a magnetic field was applied by the magnetic field application device. Thereafter, the entire surface of the image recording area was cooled down to the gelation temperature of the dispersion medium or lower by the cooling device. In the recording medium, the no-heated area remained unchanged and only the black particles in the heated area migrated to the surface side to record the checker pattern of black and white.

Example 16

Black ferrite particles having a surface treated with silicone oil serving as the magnetophoretic particles were mixed with a solution in which an oil-soluble red dye (OILRED RR, manufactured by Orient Chemical Industries Co., Ltd.) was preliminarily dissolved in an isoparaffin-based hydrocarbon solvent (Isopar G, manufactured by Exon Chemical Co., Ltd.) follow ad by ultrasonic dispersion. Next, the white electrophoretic particles obtained in Example 1 was added followed by ultrasonic dispersion. Thereafter, a thermoreversible gulling agent was added in the same manner as in Example 1 and heated to the solation temperature of the thermoreversible galling agent followed by stirring to prepare a liquid dispersion of image recording layer.

Using the thus-obtained liquid dispersion, a microcapsule slurry was prepared in the same manner as in Example 1 to manufacture is rewritable recording medium in the same manner as in Example 1.

Evaluation by Using Image Recording Device

The image recording device of Example 15 was used and evaluation was made operating the charging device. The recording medium was set in the image recording device and positively charged by the electric field application device. The entire surface of the image recording area was heated by the heating device to a temperature higher than the solation temperature of the dispersion medium to liquidize the dispersion medium. At the same time, the magnetic field application device applied a magnetic field to the black particles with polarity to repel them. Thereafter, the entire surface of the image recording area was cooled down to the gelation temperature of the dispersion medium or lower by the cooling device. As a result, in the recording medium, the while particles migrated to the surface side while the black particles migrated to the rear side to record a white solid image on the entire surface of the recording medium, meaning that the image was erased. Next, the recording medium was set again in the image recording device and negatively charged by the electric field application device. Thereafter, a checker pattern was input into the heating device to liquidize only the dispersion medium in the heated area. At the same time, a magnetic field having the reverse polarity was applied to the magnetic field application device. Thereafter, the entire surface of the image recording area was cooled down to the gelation temperature of the dispersion medium or lower by the cooling device. In the recording medium, the non-heated area remained unchanged and the black particles in the heated area migrated to the surface side and, the white particles, to the rear side, to record the checker pattern of black and white. The recording medium was positively charged by the electric field application device. The entire surface of the image recording area was heated by the heating device to a temperature higher than the solation temperature of the dispersion medium to liquidize the dispersion medium. At the same time, the magnetic field application device applied a magnetic field to the black particles with polarity to repel them. As a result, it was confirmed that the color of red was shown.

Example 17

Manufacturing of Rewritable Recording Medium Using Microcapsule

After liquid of hydrosoluble urethane resin was added to the microcapsule slurry obtained in Example 1 followed by stirring, the resultant was applied by a blade to an ITO (indium oxide.tin) film provided to a polyester substrate having a thickness of 50 μm followed by drying at 70° C. for 30 minutes in such a manner that a microcapsule layer was formed to have a thickness of about 50 μm. Since the microcapsule protruded from the hydrosoluble urethane resin, a thermocuring resin having insulation properties was applied as binder resin on the microcapsule layer in order to have a thickness as almost thick as the microcapsule layer followed by drying at 80° C. for 30 minutes to form an image recording layer. Furthermore, an electroconductive resin material (DOTITE®-550, manufactured by Fujikura Kasei Co. Ltd.) containing silver fillers having electroconductivity and heat conductivity was applied on the image recording layer by a blade in such a manner to have the same area of the image recording layer. As a result, an electroconductive substrate having a thickness of about 20 μm was formed. Furthermore, a metal foil tape was attached to the end to which the image recording layer and the binder resin were not applied so that the ITO side was exposed. Thereafter, it was folded in half to form a portion that was electrically connected to the surface of the polyester substrate, which served as an electrode. Finally, an insulation tape was attached to the area of the ITO side and the metal foil tape to manufacture a rewritable recording medium having a structure illustrated in FIG. 13.

Evaluation by Using Image Recording Device

An image recording device having structures illustrated in FIGS. 20 and 21 was made as a trial product. Namely, it was designed such that the recording medium was transferred in a straight line. The heating device using a thermal head was arranged on the side to view the recording medium and the electric field application device having a roller-like form to apply an electric field was provided contacting the electrode of the recording medium. On the other side, a platen was provided that was able to apply an electric field.

The heating device using a thermal head was set in order that the surface temperature of the recording medium was not lower than the solution temperature of the thermoreversible gelling agent contained therein. In addition, a bias voltage to be applied to a recording medium was set to be 50 V. The entire surface of the image recording area was heated by the heating device to a temperature higher than the solation temperature of the dispersion medium to liquidize the dispersion medium. At the same time, 50 V was applied to the electric field application device arranged on the side of the recording medium from which an image was viewed and, 0 V to the electric field application device arranged on the other side. A bias of 50 V was applied to the image recording layer of the recording medium.

Figure 29:
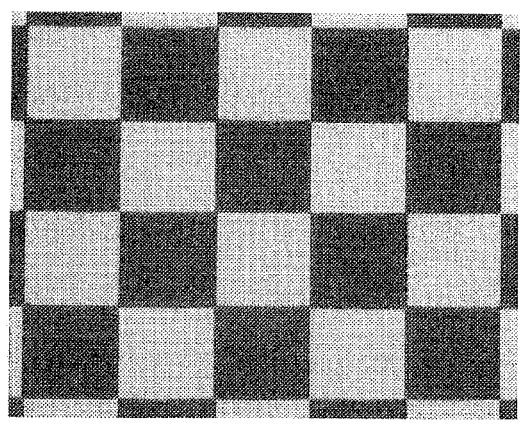
FIG. 29 is a photograph illustrating the image obtained in Example 17.

Thereafter, the entire surface of the image recording area was cooled down to the gelation temperature of the dispersion medium or lower by the cooling device. As a result, in the recording medium, the white particles migrated to the surface side while the black particles migrated to the rear side to record a white solid image on the entire surface of the recording medium, meaning that the image was erased. A checker pattern was input in the recording medium by the heating device and the heated area was heated to a temperature higher thin the solation temperature of the dispersion medium to liquidize the dispersion medium. At the same time, 0 V was applied to the electric field application device arranged on the side of the recording medium from which an image was viewed and, 50 V to the electric field application device arranged on the other side. A bias of −50 V was applied to the image recording layer of the recording medium. Thereafter, the entire surface of the image recording area was cooled down to the gelation temperature of the dispersion medium or lower by the cooling device. In the recording medium, the non-heated area remained unchanged and the black particles in the heated area migrated to the surface side and, the white particles, to the rear side, to record the checker pattern of black and white. FIG. 29 was the obtained photograph.

Example 18

Manufacturing of Rewritable Recording Medium Using Microcapsule

A thermocuring specially-modified acrylic resin (manufactured by Harima Chemicals Group, Inc.) having finger print resistance to which silicon resin particulates (TOSPEARL® 120, manufactured by Momentive Performance Materials Inc.: average particular diameter: 2.0 μm) was added was applied by a blade to the reverse side of a polyester substrate having a thickness of 50 μm which had a side on which an ITO (indium oxide.tin) was provided. The resin was heated at 80° C. for 30 minutes for curing to form a transparent first substrate having fillers on the surface. After liquid of hydrosoluble urethane resin was added to the microcapsule slurry obtained in Example 1 followed by stirring, the resultant was applied by a blade to the transparent first substrate followed by drying at 70° C. for 30 minutes in such a manner that a microcapsule layer was formed which had a thickness of about 40 μm. Since the microcapsule protruded from the hydrosoluble urethane resin, a thermocuring resin having insulation properties was applied as binder resin on the microcapsule layer in order to have thickness as almost thick as the microcapsule layer to form an image recording layer. Thereafter, a polyester substrate having a thickness of 50 μm on which another ITO layer was formed was attached to the image recording layer with the ITO side therebetween. Thereafter, it was pressed by a roller followed by curing by drying at 80° C. for 30 minutes. Furthermore, a metal foil tape was attached to the end to which the image recording layer and the binder resin were not applied so that the ITO side was exposed.

Thereafter, it was folded in half to form a portion that was electrically connected to the surface of the polyester substrate, which served as an exterior electrode. Another exterior electrode was formed on the rear side in the same manner. Finally, an insulation tape was attached to prevent electric connection between the ITO and the metal foil tape to form a rewritable having a structure illustrated in FIG. 11.

Evaluation by Using Image Recording Device

Evaluation was made using the prototype image recording device of Example 17.

The properties of the recording media of Examples and Comparative Examples were measured and evaluated according to the following. The results are shown in Table 1.

Image Quality

With regard to the image quality of the recording medium, the black and white portions of the checker pattern were C: Surface friction coefficient was increased by addition of filler Evaluation Criteria of Properties (Visibility, Transferability, Handling Property) in Table 1

A: Good properties with no problem

B: Slightly inferior but causing no practical problem

C: Clearly inferior, causing problems

D: Significantly inferior, unable to demonstrate properties

TABLE 1

| Examples and Comparative Examples | Filler | | | Density at white portion | Density at black portion | Visibility | Transferability | Handling property |
|---|---|---|---|---|---|---|---|---|
| | Electro-conductivity | Heat conductivity | Lublicity | | | | | |
| Example 1 | A | A | B | 0.31 | 0.88 | A | B | B |
| Example 2 | A | A | B | 0.30 | 0.91 | A | B | B |
| Example 3 | A | B | B | 0.35 | 0.79 | A | B | B |
| Example 4 | A | A | B | 0.33 | 0.84 | A | B | B |
| Example 5 | A | A | B | 0.31 | 0.87 | A | B | B |
| Example 6 | A | A | A | 0.34 | 0.83 | A | B | B |
| Comparative Example 1 | C | C | B | 0.44 | 0.63 | C | B | C |
| Comparative Example 2 | C | C | C | 0.46 | 0.60 | C | C | C |
| Comparative Example 3 | C | C | B | 0.45 | 0.58 | C | B | C |
| Example 7 | A | A | A | 0.33 | 0.82 | A | A | B |
| Example 8 | A | A | A | 0.31 | 0.88 | A | A | B |
| Example 9 | A | A | A | 0.30 | 0.91 | A | A | B |
| Example 10 | A | A | B | 0.36 | 0.80 | A | B | B |
| Example 11 | A | A | B | 0.33 | 0.83 | A | B | B |
| Example 12 | A | A | B | 0.37 | 0.76 | B | B | B |
| Example 13 | A | A | B | 0.28 | 0.90 | A | B | B |
| Comparative Example 4 | A | A | B | — | 0.91 | Unable to record | B | B |
| Comparative Example 5 | A | A | B | — | 0.96 | Unable to record | B | B |
| Comparative Example 6 | A | A | B | 0.52 | 0.64 | C | B | B |
| Example 14 | A | A | B | 0.39 | 0.71 | B | B | B |
| Example 15 | A | A | B | 0.40 | 0.73 | B | B | B |
| Example 16 | A | A | B | 0.42 | 0.71 | B | B | B |
| Example 17 | A | A | B | 0.19 | 1.25 | A | B | A |
| Example 18 | A | A | B | 0.18 | 1.24 | A | A | A | measured for comparison by using a portable spectrometer (X-Rite 939, manufactured by X-Rite, incorporated). Five points of the recording medium were measured and the average thereof was calculated. Furthermore, a sensory test was conducted about the visibility of an image when the recording medium was held in hand and the handling property of the recording medium when it was statically charged.

The properties of the filler in Table 1 were evaluated according to the following criteria.

Evaluation Criteria of Electroconductivity of Filler

A: Volume resistivity was less than 10 Ω·cm

B: Volume resistivity was less than $10^5$ Ω·cm

C: Volume resistivity was $10^5$ Ω·cm or higher

Evaluation Criteria of Electroconductivity of Filler

A: heat conductivity was 100 W/(m·K) or more

B: heat conductivity was 10 W/(m·K) or more

C: heat conductivity was less than 10 W/(m·K)

Evaluation Criteria of Lubricity of Filler

A: Surface friction coefficient was decreased by addition of filler

B: Surface diction coefficient was little decreased by addition filler

As seen in Table 1, the present disclosure of the present disclosure had high contrast and the image quality was excellent. Since the thermoreversible gelling agent is contained in the present disclosure, the responsiveness to the solation or gelation temperature is extremely high, which made is possible to print quality images using a thermal head. In addition, since it is possible to conduct solation and gelation of a dispersion medium most optimal in terms of migration of electrophoretic particles or magnetophoretic particles, particles can maintain high dispersability when they are solated. These are advantageous to improve the image quality.

The recording medium of the present disclosure is found to have good visibility or handling properties by adding fillers to the substrate of the recording medium. By using fillers having high electroconductivity, it is possible to subdue the decrease of the intensity of the electric field due to the substrate, the contrast was ameliorated, thereby improving the visibility.

In addition, the static electricity in the recording medium is reduced even immediately after recording and the handling properties are improved.

Since the heat diffusion property of the substrate is improved, fillers having a high electroconductivity have a high responsiveness to the temperature of sol-gel transfer, which contributes to improvement of contrast. In addition, since the responsiveness to the temperature of gelation is improved, the change of image density and blurring of an image occurring immediately after printing can be reduced.

In addition, it was found that expressiveness was improved by using a colored and unclear substrate as the second substrate on the rear side. Furthermore, when lubricative fillers are contained, damage to the surface of a recording medium is prevented and the transferability of the recording medium is improved.

Furthermore, it was also found that the finger print resistance and the reflection prevention of the surface of the recording medium was obtained by selection of fillers or resins.

Furthermore, by providing an electroconductive layer or an electroconductive substrate above and below the image recording layer and electrically connecting these with the exterior electrode of the recording medium, an electric field can be directly applied to the image recording layer so that a high contrast can be obtained by an extremely low drive voltage. Moreover, by providing these electroconductive layer and the electroconductive substrate, it is possible to completely reduce static electricity applied to the recording medium, thereby significantly improving the handling property of the recording medium.

On the other hand, if fillers are not contained in a substrate at all, contrast deteriorates and visibility is degraded. In addition, strong static electricity is applied to a recording medium, which degrades the handling properties of the recording medium.

Additionally, if a thermoreversible gelling agent is not contained, the entire surface is reversed black, thereby failing to form a checker pattern image. Moreover, if wax is used instead of a thermoreversible gelling agent, it is difficult to conduct solation sufficiently during transfer of a recording medium. In fact, images are never or little formed.

Rewritability

With the recording medium, image erasing and image recording were repeated 50 times as described above, counting the image erasing and image recording as one set. Thereafter, the visibility of an image and the deterioration degree of the appearance thereof were evaluated as follows: Furthermore, with regard to Examples 17 and 18, the image erasing and image recording were repeated 200 times more (250 time in total) before evaluation. The results are shown in Tables 2 and 3.

[Evaluation Criteria]

A: Good visibility and appearance of image

B: Slight change in visibility and appearance but causing no practical problem

C: Visibility and appearance clearly degraded

D: Image not possible to distinguish, appearance significantly degraded

Image Retentiveness

Image recording was conducted on the recording medium as described above and immediately the recording medium was positively charged by a corona charger five times.

The blurring (disturbance of image and the change of density of the black portion were evaluated according to the following criteria. The results are shown in Table 2.

Evaluation Criteria

A: No change of image density recognized

B: Slight change of image density but causing no practical problem

C: Significant change of image density, causing problems

D: Unable to distinguish images

TABLE 2

| Examples and Comparative Examples | Rewritability (50 times in total) | | Image retentitveness | |
|---|---|---|---|---|
| Example 1 | A | Good image quality, slight damage on surface | A | No change, good image retentiveness |
| Example 2 | A | Good image quality, slight damage on surface | A | No change, good image retentiveness |
| Example 3 | A | Good image quality, slight damage on surface | A | No change, good image retentiveness |
| Example 4 | A | Good image quality, slight damage on surface | A | No change, good image retentiveness |
| Example 5 | A | Good image quality, slight damage on surface | A | No change, good image retentiveness |
| Example 6 | A | Good image quality, slight damage on surface | A | No change, good image retentiveness |
| Comparative Example 1 | C | Large density change, slight damage on surface | A | No change, good image retentiveness |
| Comparative Example 2 | D | Large density change, bad transferability | A | No change, good image retentiveness |
| Comparative Example 3 | C | Large density change, slight damage on surface | A | No change, good image retentiveness |
| Example 7 | A | Good image quality, no damage on surface | A | No change, good image retentiveness |
| Example 8 | A | Good image quality, no damage on surface | A | No change, good image retentiveness |
| Example 9 | A | Good image quality, no damage on surface | A | No change, good image retentiveness |
| Example 10 | B | No problem with image quality, slight damage on surface | A | No change, good image retentiveness |
| Example 11 | A | Good image quality, slight damage on surface | A | No change, good image retentiveness |
| Example 12 | A | Good image quality, slight damage on surface | A | No change, good image retentiveness |
| Example 13 | A | Good image quality, slight damage on surface | A | No change, good image retentiveness |

TABLE 2-continued

| Examples and Comparative Examples | | Rewritability (50 times in total) | | Image retentitveness |
|---|---|---|---|---|
| Comparative Example 4 | D | Image not recordable, slight damage on surface | D | No image retentiveness recognized |
| Comparative Example 5 | D | Image not recordable, slight damage on surface | D | No image retentiveness recognized |
| Comparative Example 6 | C | Large density change, slight damage on surface | C | Image disturbance recognized |
| Example 14 | B | No problem with image quality, slight damage on surface | A | No change, good image retentiveness |
| Example 15 | A | Good image quality, slight damage on surface | A | No change, good image retentiveness |
| Example 16 | A | Good image quality, slight damage on surface | A | No change, good image retentiveness |
| Example 17 | A | Good image quality, slight damage on surface | A | No change, good image retentiveness |
| Example 18 | A | Good image quality, no damage on surface | A | No change, good image retentiveness |

TABLE 3

| Examples and Comparative Examples | | Rewritability (250 times in total) |
|---|---|---|
| Example 17 | B | Good image quality, damage on surface |
| Example 18 | A | Good image quality, no damage on surface |

As seen in Tables 2 and 3, rewritability remained good so that the image and the appearance of the recording medium were good even after rewriting the recording medium 50 times. As the number of repetition of rewriting images on the recording image, some samples had low density when reversed black. However, the difference was too slight to distinguish by visual confirmation. Also the density was confirmed to be back while the image was left. Therefore, such low density caused no problem.

Moreover, the recording media of Examples 17 and 18 in which an electroconductive layer or an electroconductive substrate were provided above and below the image recording layer were continuously evaluated until 250 times. The image quality remained good, which confirmed that the repetitive durability was excellent. These good results are considered to be obtained by applying an electric field to the image recording layer of a recording medium.

In addition, when a curable resin having no fillers was used on the side from which an image was viewed, scratches were slightly made on the surface of a recording, medium. Also, as the number of repeating image recording increased, the damage made by the scratches became significant. However, if filers were contained, forming scratches was subdued, meaning that the recording medium of the present disclosure is suitable to improve the durability thereof.

On the other hand, in the cased in which no filler was used in a substrate, visibility deteriorated after repetitive image recording. In addition, it was recognized that the image density clearly changed by repetitive image recording, and the entire of the recording medium was statically charged to a high degree, thereby degrading the handling property.

In addition, when a thermoreversible gelling agent was not contained, no image was recorded so that naturally no repetitive rewriting was possible. Furthermore, in the case in which wax was used instead of a thermoreversible gelling agent, it took a time to fix the image, which made is difficult to rewrite images.

As seen in Table 2, there is no problem about the recording medium of the present disclosure about image retentiveness. In the case in which fillers having a high heat conductivity were used, since heat discharging property was high, gelation was conducted quick, thereby improving image retentiveness.

On the other hand, in the case in which no fillers were used at all, due to deterioration of discharging property and static electricity applied to the substrate, it was clearly seen that the image density of the image changed between image recording and gelation. It was noted that no image density change was seen after gelation. In the case in which no thermoreversible gelling agent was contained, the entire surface of the recording medium was reversed white by charging by the charger. As a result, no image was discernable.

Furthermore, in the case in which wax was used instead of the thermoreversible gelling agent, it took a time to fix the image and the image was only slightly recognized but not discernable.

Example 19

A rewritable recording medium was manufactured in the same manner as in Example 17 to obtain a roll screen type image recording set illustrated in FIG. 26. A flexible sheet that had flexibility as a screen was used in order to be rolled up. A hole was preliminarily made on the flexible sheet to attach it to the recording medium and an electrically connected portion was formed. To the rear side of the flexible sheet was attached an electroconductive tape. An electroconductive adhesive was put in the electrically connected portion in order that the electroconductive substrate formed on the rear side of the recording medium was electrically connected with the electroconductive tape attached to the rear side of the flexible sheet through this electrically connected portion. A long pipe was fixed on the upper end of the thus-obtained flexible sheet. Gears were attached to both ends of the long pipe in order to roll up and release the flexible sheet at a constant speed by an electric motor. In addition, a long pipe was attached to the lower end of the flexible sheet to prevent the flexible sheet from twisting. A heating device and an electric field application device were provided around the roll-up portion of the flexible sheet. A line thermal head serving as heating device and an electroconductive brush serving as an electric field application device were provided to the side of the flexible sheet on which the recording medium was provided to have a structure in which the electroconductive brush was brought into contact with the electrode formed on the surface of the recording medium. On the rear side of the flexible sheet, an electroconductive platen roller serving as electric field application device was arranged at the position facing the thermal head. The electroconductive platen roller was brought into contact with the electroconductive tape formed on the rear side of the flexible sheet. The electroconductive brush and the electroconductive platen roller were set in order to be arbitrarily electrically connected to a power source or grounded, thereby providing a desired electric field to the image recording layer of the recording medium 30. In addition, the speed of rolling up and releasing the flexible sheet was adjusted by meeting the speed of the electroconductive platen roller and that of the electric motor.

The thus-manufactured flexible screen type image recording set was used to conduct a print test.

After the flexible sheet was released, the entire surface of the image recording area of the recording medium was heated by the heating device to a temperature higher than the solation temperature of the dispersion medium to liquidize the dispersion medium while the flexible sheet was being rolled up. At the same time, a bias of 60 V was applied to the image recording layer of the recording medium by the electric field application device. Thereafter, the flexible sheet was released. The entire surface of the recording medium was reversed white, meaning that the image was erased.

Next, while rolling up the flexible sheet, a lattice pattern was input by the heating device. Thereafter, the heated area was heated to a temperature higher than the solation temperature of the dispersion medium to liquidize the dispersion medium. At the same time, a bias of −60 V was applied to the image recording layer of the recording medium by the electric field application device. Thereafter, the flexible sheet was released. The non-heated area of the recording medium remained unchanged white and only the heated area was reversed black. As a result, the lattice pattern of black was clearly recorded in the white background.

Again, as in the same manner as described above, the entire surface of the image recording area of the recording medium was heated while rolling up the flexible sheet. At the same time, when a bias of 60 V was applied to the image recording layer of the recording medium, the entire surface was turned white to find that the lattice pattern was erased. Next, as in the same manner as described above, a checker pattern was input by the heating device while rolling up the flexible sheet. At the same time, when a bias of −60 V was applied to the image recording layer of the recording medium, the non-heated area of the recording medium remained unchanged white and only the heated area was turned black. As a result, the checker pattern of black and white was clearly recorded to confirm that rewriting was possible.

The recording medium of the present disclosure was rewritable by a printer. Also, it can be used as a rewritable roll-screen type image recording set. When a flexible sheet to which a recording medium is provided is rolled up, due to static electricity produced by contact and friction between the flexible sheet and the recording medium, the image may become disturbed in a case in which no thermoreversible gelling agent is contained.

However, in the present disclosure, since the migration of the particles is subdued by gelation of the recording medium, the image is not disturbed by static electricity. Similarly, when magnetophoretic particles are used, image stability is excellent because the image is free from the magnetic field outside.

In addition, by adding fillers to at least one of the first substrate and the second substrate, a flexible electroconductive layer can be provided to the rear side of the recording medium so that it can be attached to a screen and rolled up. In addition, by addition of fillers, the releasability of the surface of a recording medium is possibly improved. As a result, attachment of the recording medium is prevented when rolling up a screen so that roll-up and release of the screen is repeatedly possible. In addition, since the durability of the surface of a recording medium is improved by fillers added to the substrate thereof the recording medium is prevented from deterioration even when the recording medium is rolled up and released repetitively, thereby prolonging the working life of the recording medium.

Furthermore, by addition of fillers, reflection of an image is prevented, which is advantageous to use the recording medium of the present disclosure for signage in terms of visibility.

Having now fully described embodiments of the present invention, it will be apparent to one of ordinary skill in the art that many changes and modifications can be made thereto without departing from the spirit and scope of embodiments of the invention as set forth herein.

What is claimed is:

1. A recording medium comprising:
   a first substrate;
   a second substrate; and
   an image recording layer provided between the first substrate and the second substrate,
   wherein the image recording layer has insulating properties and multiple cells or microcapsules, each of which encapsulates at least one of electrophoresis particles or magnetophoresis particles, a dispersion medium having a transition temperature ranging from 40° C. to 80° C., and a thermoreversible gelling agent,
   wherein at least one of the first substrate or the second substrate comprises a filler.

2. The recording medium according to claim 1, wherein the filler comprises at least one of a metal, a metal oxide, a metal nitride, or a carbon compound.

3. The recording medium according to claim 1, wherein the filler has an anisotropic form.

4. The recording medium according to claim 1, wherein the filler comprises multiple mixtures.

5. The recording medium according to claim 1, wherein a mixture of the dispersion medium and the thermoreversible gelling agent has a solation temperature higher than a gelation temperature.

6. The recording medium according to claim 1, wherein the first substrate or the second substrate is electroconductive.

7. The recording medium according to claim 1, further comprising:
   an electroconductive layer provided between the first substrate and the image recording layer or between the second substrate and the image recording layer; and
   an electrode provided at an exterior of the recording medium,
   wherein the electroconductive layer and the electrode are electrically connected.

8. The recording medium according to claim 1, further comprising:
   a first electric conductive layer between the first substrate and the image recording layer; and
   a first electrode at an exterior of the recording medium,
   wherein the second substrate is electroconductive,
   wherein the first electroconductive layer and the first electrode are electrically connected.

9. The recording medium according to claim 1, further comprising:
   a first electroconductive layer between the first substrate and the image recording layer;
   a second electroconductive layer between the second substrate and the image recording layer; and
   a first electrode at an exterior of the recording medium; and
   a second electrode at an exterior of the recording medium,
   wherein the first electroconductive layer and the first electrode are electrically connected,
   wherein the second electroconductive layer and the second electrode are electrically connected.

10. An image recording set comprising:
   a recording medium comprising:
      a first substrate;
      a second substrate; and
      an image recording layer provided between the first substrate and the second substrate, and
   an image recording device to record an image, comprising:
      a heating device to heat the image recording layer; and
      at least an electric field application device to apply an electric field to the image recording layer or a magnetic field application device to apply a magnetic field to the image recording layer,
   wherein the image recording layer has insulating properties and multiple cells or microcapsules, each of which encapsulates at least one of electrophoresis particles or magnetophoresis particles, a dispersion medium having a transition temperature ranging from 40° C. to 80° C., and a thermoreversible gelling agent,
   wherein at least one of the first substrate or the second substrate comprises a filler.

11. The image recording set according to claim 10, wherein the heating device is a thermal head.

12. The image recording set according to claim 10,
   wherein the first substrate or the second substrate is electroconductive,
   wherein the electric field application device is electrically connected with the first substrate when the first substrate is electroconductive or the second substrate when the second substrate is electroconductive to apply the electric field to the image recording layer.

13. The image recording set according to claim 10,
   wherein the image recording medium further comprises:
   an electroconductive layer provided between the first substrate and the image recording layer or between the second substrate and the image recording layer; and
   an electrode provided at an exterior of the recording medium,
   wherein the electroconductive layer and the electrode are electrically connected,
   wherein the electric field application device is electrically connected with the electrode to apply the electric field to the image recording layer.

14. The image recording set according to claim 10,
   wherein the recording medium further comprises:
   a first electric conductive layer between the first substrate and the image recording layer; and
   a first electrode at an exterior of the recording medium,
   wherein the second substrate is electroconductive,
   wherein the first electroconductive layer and the first electrode are electrically connected,
   wherein the electric field application device is electrically connected with at least one of the first electrode or the second substrate to apply the electric field to the image recording layer.

15. The image recording set according to claim 10,
   wherein the recording medium further comprises:
   a first electroconductive layer between the first substrate and the image recording layer;
   a second electroconductive layer between the second substrate and the image recording layer; and
   a first electrode at an exterior of the recording medium; and
   a second electrode at an exterior of the recording medium,
   wherein the first electroconductive layer and the first electrode are electrically connected,
   wherein the second electroconductive layer and the second electrode are electrically connected,
   wherein the electric field application device is electrically connected with at least one of the first electrode or the second electrode to apply the electric field to the image recording layer.

16. The image recording set according to claim 10, further comprising an image erasing device to erase an image recorded on the recording medium by applying heat and at least one of an electric field or a magnetic field to the recording medium.

17. An image recording set comprising:
   a recording medium comprising:
      a first substrate;
      a second substrate; and
      an image recording layer provided between the first substrate and the second substrate,
      wherein at least one of the first substrate or the second substrate comprises a filler, and
   an image recording device to record an image, comprising:
      a heating device to heat the image recording layer; and
      at least an electric field application device to apply an electric field to the image recording layer or a magnetic field application device to apply a magnetic field to the image recording layer,
      wherein the image recording layer has insulating properties and multiple cells or microcapsules, each of which encapsulates at least one of electrophoresis particles or magnetophoresis particles, a dispersion medium, and a thermoreversible gelling agent,
   a screen; and
   a drive unit to roll up and release the screen;
   wherein the recording medium is provided to the screen.

* * * * *